US012732046B2

(12) United States Patent
de Swardt et al.

(10) Patent No.: US 12,732,046 B2
(45) Date of Patent: Sep. 8, 2026

(54) TRANSPOSITION COILS HAVING A PLURALITY OF CONDUCTOR TURNS HAVING CONFIGURATIONS FOR CONDUCTOR STACKS

(71) Applicant: Timken Gears & Services Inc., King of Prussia, PA (US)

(72) Inventors: Jan de Swardt, Eustis, FL (US); Martyn Widdowson, Dronfield (GB)

(73) Assignee: Timken Gears & Services Inc., King of Prussia, PA (US)

( * ) Notice: Subject to any disclaimer, the term of this patent is extended or adjusted under 35 U.S.C. 154(b) by 490 days.

(21) Appl. No.: 18/450,890

(22) Filed: Aug. 16, 2023

(65) Prior Publication Data

US 2024/0063673 A1 Feb. 22, 2024

Related U.S. Application Data

(60) Provisional application No. 63/399,573, filed on Aug. 19, 2022.

(51) Int. Cl.

*H02K 3/04* (2006.01)
*H02K 3/34* (2006.01)
*H02K 15/043* (2025.01)

(52) U.S. Cl.

CPC ................. *H02K 3/04* (2013.01); *H02K 3/34* (2013.01); *H02K 15/0431* (2025.01)

(58) Field of Classification Search

CPC ......... H02K 3/04; H02K 3/34; H02K 15/0431
USPC ......................................................... 310/208
See application file for complete search history.

(56) References Cited

U.S. PATENT DOCUMENTS

| | | | | | |
|---|---|---|---|---|---|
| 2,201,845 | A * | 5/1940 | Wieseman | H02K 3/32 310/208 | |
| 2,821,641 | A * | 1/1958 | Ringland | H02K 3/14 310/213 | |
| 3,010,038 | A * | 11/1961 | Manni | H02K 3/24 310/72 | |
| 3,780,325 | A * | 12/1973 | Frankenhauser | H02K 3/48 310/214 | |
| 4,308,476 | A * | 12/1981 | Schuler | H02K 3/40 310/213 | |
| 6,856,053 | B2 * | 2/2005 | LeFlem | H02K 3/47 310/194 | |
| 9,196,392 | B2 * | 11/2015 | Hasegawa | H01B 5/08 | |
| 2016/0285333 | A1 * | 9/2016 | Haldemann | H02K 3/24 | |
| 2017/0033629 | A1 * | 2/2017 | Haldemann | H02K 15/064 | |
| 2017/0033631 | A1 * | 2/2017 | Conley | H02K 15/04 | |
| 2022/0376577 | A1 * | 11/2022 | de Swardt | H01B 19/00 | |
| 2022/0393539 | A1 * | 12/2022 | de Swardt | H02K 15/105 | |
| 2024/0063673 | A1 * | 2/2024 | de Swardt | H02K 3/04 | |
| 2024/0063698 | A1 * | 2/2024 | de Swardt | H02K 15/0431 | |

* cited by examiner

*Primary Examiner* — Rashad H Johnson
(74) *Attorney, Agent, or Firm* — Michael Best & Friedrich LLP

(57) ABSTRACT

Transposition coils and insulation for transposition coils. One example provides a transposition coil including a plurality of conductor turns arranged in at least two separate stacks and an outer main wall insulation that encircles the at least two separate stacks. Each of the at least two separate stacks are provided with dedicated main wall insulation that encircles exactly one of the at least two separate stacks.

20 Claims, 77 Drawing Sheets

TRANSPOSITION COILS HAVING A PLURALITY OF CONDUCTOR TURNS HAVING CONFIGURATIONS FOR CONDUCTOR STACKS

CROSS-REFERENCE TO RELATED APPLICATIONS

This application claims priority to U.S. Provisional Patent Application No. 63/399,573, filed on Aug. 19, 2022, the entire contents of which are incorporated by reference herein.

BACKGROUND

Motor refers to an electric motor or an electric generator. Core refers to a stator or rotor core. Winding refers to a stator or rotor winding. To create flux density in a core of a motor, a number of turns composed of conductors are wound into the slots of a core. The set of turns wound together in a slot is referred to as a coil. The number of turns per each coil is calculated based on the supply voltage, the winding configuration (e.g., number of parallel circuits, winding pitch, winding connection, i.e., star or delta, etc.), the number of poles, and the motor rating. A stack refers to the combination of all the turns together.

However, there are physical constraints on how the coils can be constructed. FIG. 1 provides an example stator core 10 having a plurality of slots 11. The coils must fit into the slots 11 in the core 10. The available space for the coils is comprised of the slot width 12 to the slot depth 13 and slot depth under a wedge 14. The larger the slot size, the larger the size of the coil that can fit into the respective slot 11. However, a larger coil leaves less area available for the core 10. The magnetic flux goes through the core teeth (the core portion between the slots). For the calculation of the tooth flux density, ⅓ of the tooth width 15 is typically used. This section is ⅓ of the slot depth down from the core ID 16. As the slots 11 are not parallel, the tooth width 15 varies from the slot ID 16 to the slot depth 13.

The density of the core flux (also referred to as the flux density) is proportional to the flux value and inversely proportional to the available core area. Thus, as the slot size increases, the core tooth area decreases and the core flux density increases. As the core flux density increases, the losses in the core increase as well. These losses are primarily generated in the form of heat, but may also be generated in the form of core vibrations.

The current that flows in the conductors also generate losses that are dependent on the current density. The current density is proportional to the current flowing in the conductor and inversely proportional to the area of the conductor. The losses in the conductor are proportional to the square of the current and proportional to the resistance of the conductor. The resistance of the conductor is inversely proportional to the cross sectional area of the conductor. Accordingly, losses in the conductor are inversely proportional to the cross sectional area of the conductor.

Accordingly, stator cores need balance between core area and conductor size. A larger core area reduces the core losses (due to reduced flux density) but increases the conductor losses (due to smaller slot sizes and reduced conductor area). A smaller core area increases the core losses (due to an increase in flux density) but decreases conductor losses (due to a larger slot and increased conductor area).

Additional constraints include the slot widths being large enough to be mechanically strong to avoid breakage and resonance vibrations. Traditionally, the ratio of the width of the conductor to the thickness of the conductor is limited to (a) not more than 4:1 for a conductor between 1 and 2 mm thick, (b) not more than 5:1 for a conductor thicker than 2 mm, and (c) not less than 1.5:1. When the conductor width to thickness ratio is too large, the conductor insulation may become damaged during manufacturing, or the conductor may deform during manufacturing. When the conductor is too close to a square, manufacturing of the coils becomes difficult, and the conductors tend to twist.

It is typical that the leg of two different coils are inserted into the same slot. Thus, the available slot height under the wedge is consumed by the total of the two coils. Additionally, each conductor is insulated using either one layer of insulation or a combination of multiple layers of insulation. This insulation is referred to herein as conductor insulation.

SUMMARY

In one aspect, the present disclosure provides a transposition coil including a plurality of conductor turns arranged in at least two separate stacks and an outer main wall insulation that encircles the at least two separate stacks. Each of the at least two separate stacks is provided with dedicated main wall insulation that encircles exactly one of the at least two separate stacks.

In some instances, the at least two separate stacks include a first stack having n number of turns and a second stack having n+1 number of turns. In some instances, the plurality of conductor turns are arranged in exactly two stacks, and the total number of conductor turns is odd. In some instances, the total number of conductor turns is 27. In some instances, the total number of conductor turns is 35. In some instances, a width of each conductor of the plurality of conductors is less than or equal to approximately 10 millimeters, and a height of each conductor of the plurality of conductors is greater than or equal to approximately 0.5 millimeters. In some instances, each conductor turn of the plurality of conductor turns is independently insulated. In some instances, the plurality of conductor turns are arranged in exactly three separate stacks. In some instances, the exactly three separate stacks includes a first stack having n number of turns, a second stack having n number of turns, and a third stack having n−1 number or n+1 number of turns. In some instances, the total number of conductor turns is 34. In some instances, the total number of conductor turns is 36.

In another aspect, the present disclosure provides a transposition coil including a plurality of turns arranged in three or more separately-insulated stacks. The three or more stacks are cooperatively insulated with an outer main wall insulation that encircles the three or more separate stacks.

In some instances, the number of turns per stack is different among the three or more separate stacks. In some instances, the three or more separate stacks includes a first stack having n number of turns, a second stack having n number of turns, and a third stack having n−1 number or n+1 number of turns. In some instances, the plurality of conductor turns are arranged in exactly three stacks, and the total number of conductor turns is odd. In some instances, the total number of conductor turns is 35. In some instances, the total number of conductor turns is 34. In some instances, the total number of conductor turns is 36. In some instances, a width of each conductor of the plurality of conductors is less than or equal to approximately 10 millimeters, and a height of each conductor of the plurality of conductors is greater than or equal to approximately 0.5 millimeters.

In another aspects, the present disclosure provides a method of manufacturing a transposition coil stack. The method includes providing a conductor and forming a first turn of the transposition coil stack. Forming the first turn includes defining, by bending the conductor, a start of a loop, winding a first straight portion of the conductor toward a first looping pin, wherein the first straight portion extends substantially along a first axis, winding a first loop portion of the conductor around the first looping pin, winding a second straight portion of the conductor toward a second looping pin located on an opposite side of the loop from the first looping pin, winding a second loop portion of the conductor around the second looping pin, and winding a third straight portion of the conductor toward the start of the loop, wherein the third straight portion extends substantially along the first axis.

In some instances, the method includes forming a bend in the conductor. In some instances, forming the bend includes bending a first bend portion of the conductor on a conductor edge at an angle of approximately 45 degrees to the first axis and bending a second bend portion of the conductor on the conductor edge such that a portion of the conductor extends along a second axis parallel to the first axis. In some instances, the method includes forming a second turn. In some instances, the method includes bending a third bend portion of the conductor upwards along a y-axis and bending a fourth bend portion of the conductor downwards along the y-axis, wherein a bottom of the conductor is in contact with a top of the conductor, and wherein the third bend portion and the fourth bend portion extend along the first axis or the second axis. In some instances, the method includes bending a first bend portion of the conductor on a conductor edge at an angle of approximately 45 degrees to a second axis and bending a second bend portion of the conductor on the conductor edge such that a portion of the conductor extends along the first axis and the first axis is parallel to the second axis. In some instances, the method includes bending the conductor on a conductor edge in an S shape such that a first bend portion of the conductor extends across the first axis and a second bend portion of the conductor extends across a second axis. In some instances, the method is repeated until a total of six turns are created. In some instances, the method includes forming a plurality of subsequent turns.

In another aspects, the present disclosure provides a method of manufacturing a transposition coil stack. The method includes providing a conductor, forming, by bending the conductor, six turns of the transposition coil stack, calculating a volts per turn value, determining, using the calculated volts per turn value, a thickness of turn insulation to be used in the transposition coil stack, and applying the turn insulation to the transposition coil stack.

In another aspect, the present disclosure provides a method of manufacturing a transposition coil. The method includes providing a first conductor and a second conductor in at least two separate stacks, wherein the first conductor extends along a first axis and the second conductor extends along a second axis, forming a double stack, forming a bridge connection between the at least two separate stacks, providing each of the two separate stacks with a dedicated main wall insulation that encircles exactly one of the at least two separate stacks, and providing an outer main wall insulation that encircles the at least two separate stacks.

In some instances, the method includes insulating the bridge connection. In some instances, the bridge connection is a double series stack top to bottom side bridge design. In some instances, forming the bridge connection includes bending a first end portion of the second conductor on a conductor edge substantially 90 degrees away from the first conductor such that at least part of the first end portion extends along an axis orthogonal to the first axis, bending a second end portion of the second conductor substantially 90 degrees downward along a y-axis such that the second end portion is in contact with the conductor edge, and bending a bottom end portion such that the second end is bent at substantially 90 degrees toward the first conductor, wherein the bottom end portion is configured to pass across a first turn of the second conductor and the bottom end portion is in contact with a bottom of the second conductor. In some instances, the method includes winding the at least two separate stacks in opposite directions. In some instances, the bridge connection includes connecting a top of one stack to a bottom of a separate stack. In some instances, the method includes forming a plurality of turns. In some instances, the method includes forming an odd number of turns. In some instances, forming the bridge connection includes extending a turn of the first conductor around the stack of the second conductor, and connecting the turn of the first conductor to a flipped-over stack of the second conductor. In some instances, forming the bridge connection includes extending a turn of the second conductor around a turn of the first conductor and connecting the turn of the second conductor to a flipped-over turn of the first conductor.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
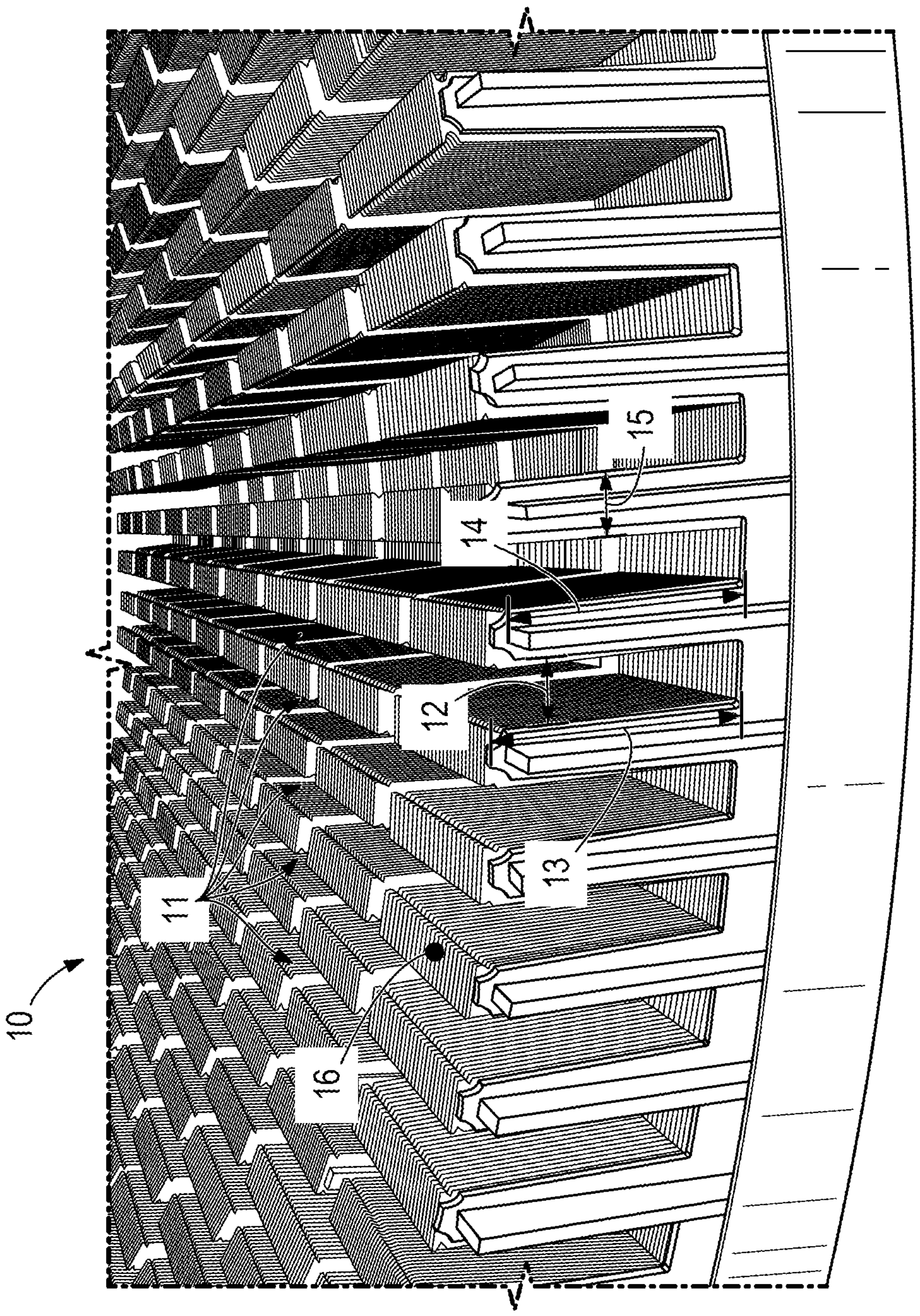
FIG. 1 illustrates a perspective view of example stator core sections.
Figure 2:
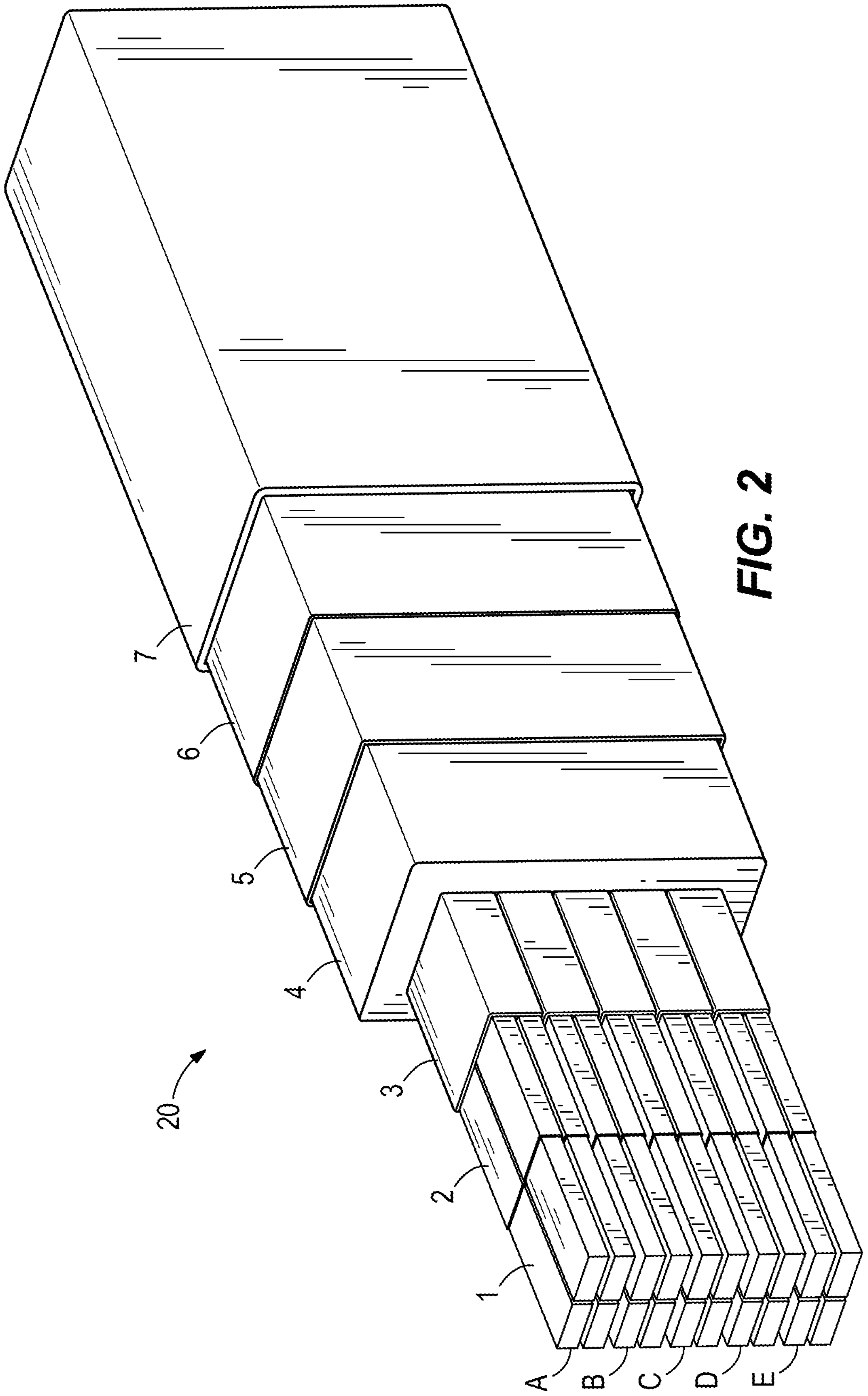
FIG. 2 illustrates a perspective view of a coil for an electric machine winding, the coil having sequential cutaways showing the various sections or layers thereof.

Before the method is described, it is noted that FIG. 2 illustrates an exemplary layout for a coil 20. At the center of the coil 20 is a conductor 1. The conductor 1 is made from a conductive material such as copper or aluminum for example. The conductor 1 is annealed to ensure ductility and excellent formability during the coil manufacturing process. The conductor 1 has smooth radiused edges to reduce high field concentrations. Covering the conductor 1 is an insulating layer, referred to as conductor insulation 2. The conductor insulation 2 may include multiple coats of a type of resin of modified polyester layers and/or polyamide-imide layers and/or polyimide layers and/or layers of glass yarn and resin and/or multiple layers of mica paper reinforced with glass cloth, polyester film, or polyester mat. Depending on the machine design, the conductors 1 with the conductor insulation 2, which form insulated conductors, are arranged together in multiple parallel sets. Each parallel set together forms a turn A, B, C, D, E. FIG. 1 illustrates two conductors 1 in the width and two conductors 1 in the height to together form four conductors 1 in parallel per turn. The conductor 1 may include a conductor edge 91, a top 92, and a bottom 93. FIG. 2 illustrates one coil 20 wound with 5 turns A-E, or 5 turns per coil. However, it will be appreciated that the disclosure may be applicable to other arrangements.

Depending on the machine design, a dedicated turn insulation 3 may be applied. For example, each turn A-E is covered with one or more layers of mica paper reinforced with glass cloth, polyester film, or polyester mat that constitute the turn insulation 3. The turn insulation 3 extends around the collection of insulated conductors 1 in the turn, rather than around the individual insulated conductors 1. Main wall insulation 4 is provided outside the turn insulation 3, if present, and includes several layers of tape, that may include one or more layers of mica paper reinforced with glass cloth, polyester film, or polyester mat, and polyimide film, one or more layers of layers of mica paper reinforced with glass cloth, polyester film, and one or more layer of aramid-backed mica tape reinforced with glass or polyester. The main wall insulation 4 is wrapped around the turns A-E of the coil collectively, rather than wrapped around the turns individually like the turn insulation 3. Furthermore, a corona shield tape 5 can be provided outside the main wall insulation 4. The corona shield tape 5 is a low resistivity tape (e.g., 300 to 1000 Ohm/cm) including glass fabric, impregnated with an electrically conductive varnish, and optionally nano particles, to improve electrical and thermal properties as well as erosion resistance.

A stress grading tape 6 can be provided outside the corona shield tape 5. The stress grading tape 6 is a voltage variable resistivity tape including woven polyester fabric tape with selvage, impregnated with an electrically semi conductive varnish. A sealing tape 7 can be provided outside the stress grading tape 6. The sealing tape 7 forms an outer layer that is smooth (reducing build-up of surface contaminants) and waterproof surface finish. The sealing tape 7 can be a glass or polyester fabric tape impregnated with a thermosetting epoxy resin.

Table 1 provides an example calculation of a possible conductor size for a 1×1 conductor (e.g., one conductor in the width and one conductor in the height, per turn). The turn size is provided as 1×(11.96×2.02)×1, meaning (from left to right) one conductor in width, with a width of 11.96 by a thickness of 2.02, and one conductor in weight, per turn. As shown in Table 1, the resulting conductor ratio is larger than the desired maximum ratio of 5:1.

TABLE 1

Conductor size calculations for a 1 × 1 conductor section

| Description | | Size | Unit |
|---|---|---|---|
| Slot | Width | 14.60 | mm |
| Slot | Depth | 62.84 | mm |
| Required Turns | | 13 | |
| Conductor Insulation | (per side) | 0.10 | mm |
| Main Wall Insulation | (per side) | 1.22 | mm |
| Depth ÷ 2 | | 31.42 | mm |
| Available for stack | Width | 12.16 | mm |
| Available for stack | Depth | 28.98 | mm |
| Number of conductors | in Width | 1 | |
| | in Depth | 1 | |
| Max insulated conductor | Width | 12.16 | mm |
| Max insulated conductor | Thickness | 2.22 | mm |
| Max bare conductor | Width | 11.96 | mm |
| Max bare conductor | Thickness | 2.02 | mm |
| Ratio | W/Th | 5.92 | |

In some instances, the conductor may be split into two or more parallel conductors in the direction of the width. Table 2 provides an example calculation of a possible conductor size with a 2×1 split (e.g., two conductors in the width and one conductor in the height, per turn). The turn size is provided as 2×(5.88×2.02)×1. As shown in Table 2, a 2×1 conductor section has the desired width to thickness ratio (less than 5:1).

TABLE 2

Conductor size calculations for a 2 × 1 conductor section

| Description | | Size | Unit |
|---|---|---|---|
| Slot | Width | 14.60 | mm |
| Slot | Depth | 62.84 | mm |
| Required Turns | | 13 | |
| Conductor Insulation | (per side) | 0.10 | mm |
| Main Wall Insulation | (per side) | 1.22 | mm |
| Depth ÷ 2 | | 31.42 | mm |
| Available for stack | Width | 12.16 | mm |
| Available for stack | Depth | 28.98 | mm |
| Number of conductors | in Width | 2 | |
| | in Depth | 1 | |
| Max insulated conductor | Width | 6.08 | mm |
| Max insulated conductor | Thickness | 2.22 | mm |
| Max bare conductor | Width | 5.88 | mm |
| Max bare conductor | Thickness | 2.02 | mm |
| Ratio | W/Th | 2.91 | |

Figure 3:
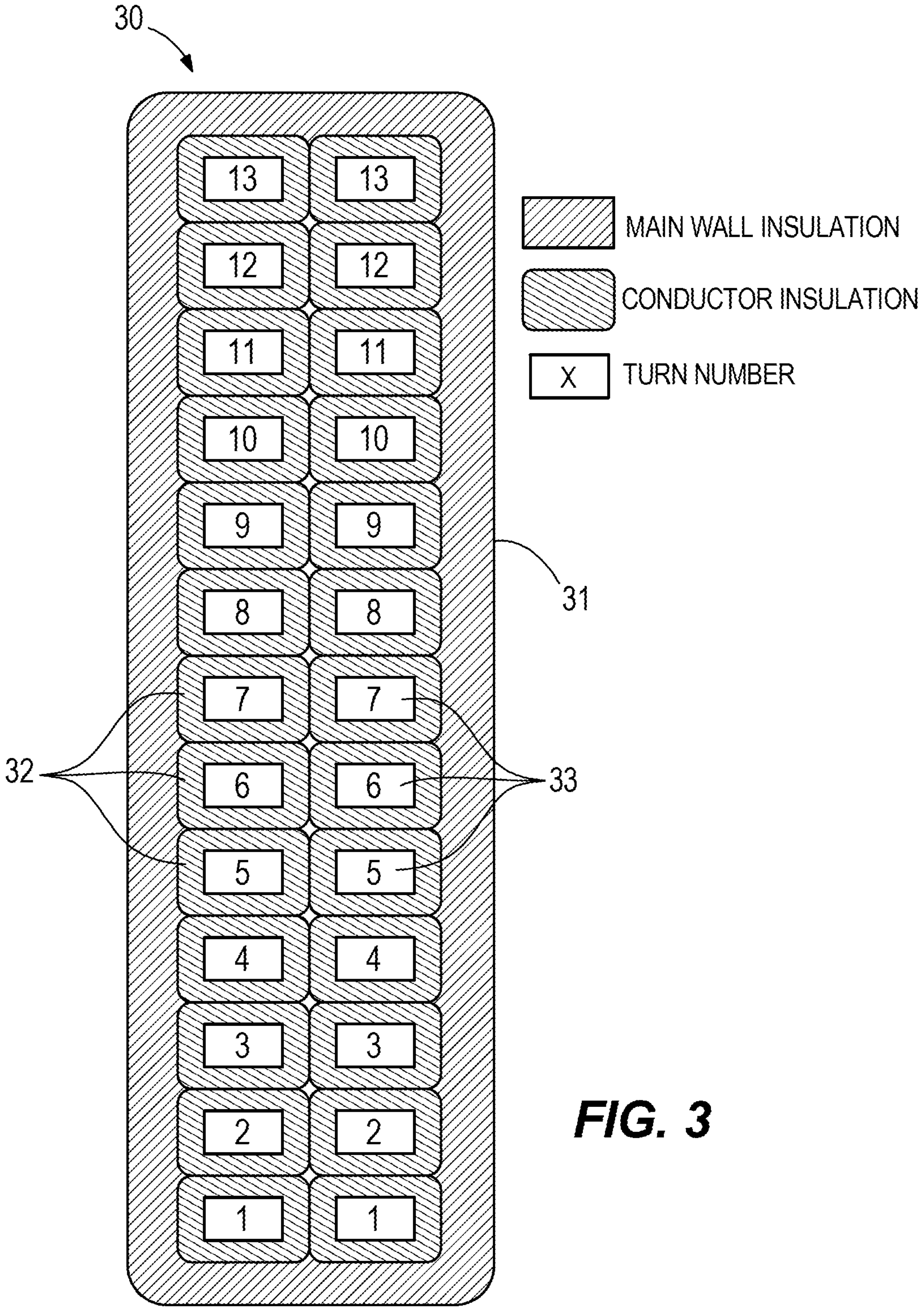
FIG. 3 illustrates a cross sectional view of a thirteen turn coil, according to one embodiment.

FIG. 3 illustrates a cross-sectional view of an example coil 30 having main wall insulation 31, conductor insulation 32, and a plurality of turns 33 (specifically, thirteen turns). The plurality of turns 33 and the conductors (indicated by the conductor insulation 32) are in parallel, forming a 2×1 conductor section. Coils having conductors in parallel may henceforth be referred to as parallel conductor coils, regardless of how many conductors are in parallel per turn. In example coil 30, the number of turns may force the conductor thickness to become smaller than desired. For example, as shown in Table 3, a conductor configuration of 2×(5.88 mm×0.83 mm)×1 (or conductors having a thickness of 0.83 mm) may be impractical.

TABLE 3

Conductor size calculations for a 2 × 1 conductor section with 28 turns

| Description | | Size | Unit |
|---|---|---|---|
| Slot | Width | 14.60 | mm |
| Slot | Depth | 62.84 | mm |
| Required Turns | | 28 | |
| Conductor Insulation | (per side) | 0.10 | mm |
| Main Wall Insulation | (per side) | 1.22 | mm |
| Depth ÷ 2 | | 31.42 | mm |
| Available for stack | Width | 12.16 | mm |
| Available for stack | Depth | 28.98 | mm |
| Number of conductors | in Width | 2 | |
| | in Depth | 1 | |
| Max insulated conductor | Width | 6.08 | mm |
| Max insulated conductor | Thickness | 1.03 | mm |
| Max bare conductor | Width | 5.88 | mm |
| Max bare conductor | Thickness | 0.83 | mm |
| Ratio | W/Th | 7.08 | |

Alternatively, conductors may be in series instead of in parallel, thereby doubling the number of turns per slot. Coils having conductors in series may henceforth be referred to as a terrace coil or a transposition coil. In a terrace or transposition coil, the windings may be configured to be two conductors in width and one conductor in height. However, the two conductors in width are connected in series, and the one conductor in height is singular. Effectively, half the number of turns is achieved by each of the two vertical sets of conductors. Table 4 provides an example calculation for terrace coils.

TABLE 4

Conductor size calculations for a terrace conductor section with 28 turns

| Description | | Size | Unit |
|---|---|---|---|
| Slot | Width | 14.60 | mm |
| Slot | Depth | 62.84 | mm |
| Required Turns | | 28 | |
| Conductor Insulation | (per side) | 0.10 | mm |
| Main Wall Insulation | (per side) | 1.22 | mm |
| Depth ÷ 2 | | 31.42 | mm |
| Available for stack | Width | 12.16 | mm |
| Available for stack | Depth | 28.98 | mm |
| Number of conductors | in Width | 1 | |
| | in Depth | 1 | |
| Series conductors | in Width | 2 | |
| Max insulated conductor | Width | 6.08 | mm |
| Max insulated conductor | Thickness | 2.07 | mm |
| Max bare conductor | Width | 5.88 | mm |
| Max bare conductor | Thickness | 1.87 | mm |
| Ratio | W/Th | 3.14 | |

Embodiments described herein provide manufacturing methods for terrace coils. Conductors are not always cut until the coil is complete, but figures and embodiments provided herein may illustrate cut sections for illustrative purposes only. Dotted arrows are provided to illustrate the direction of looping of the coils.

Figure 4:
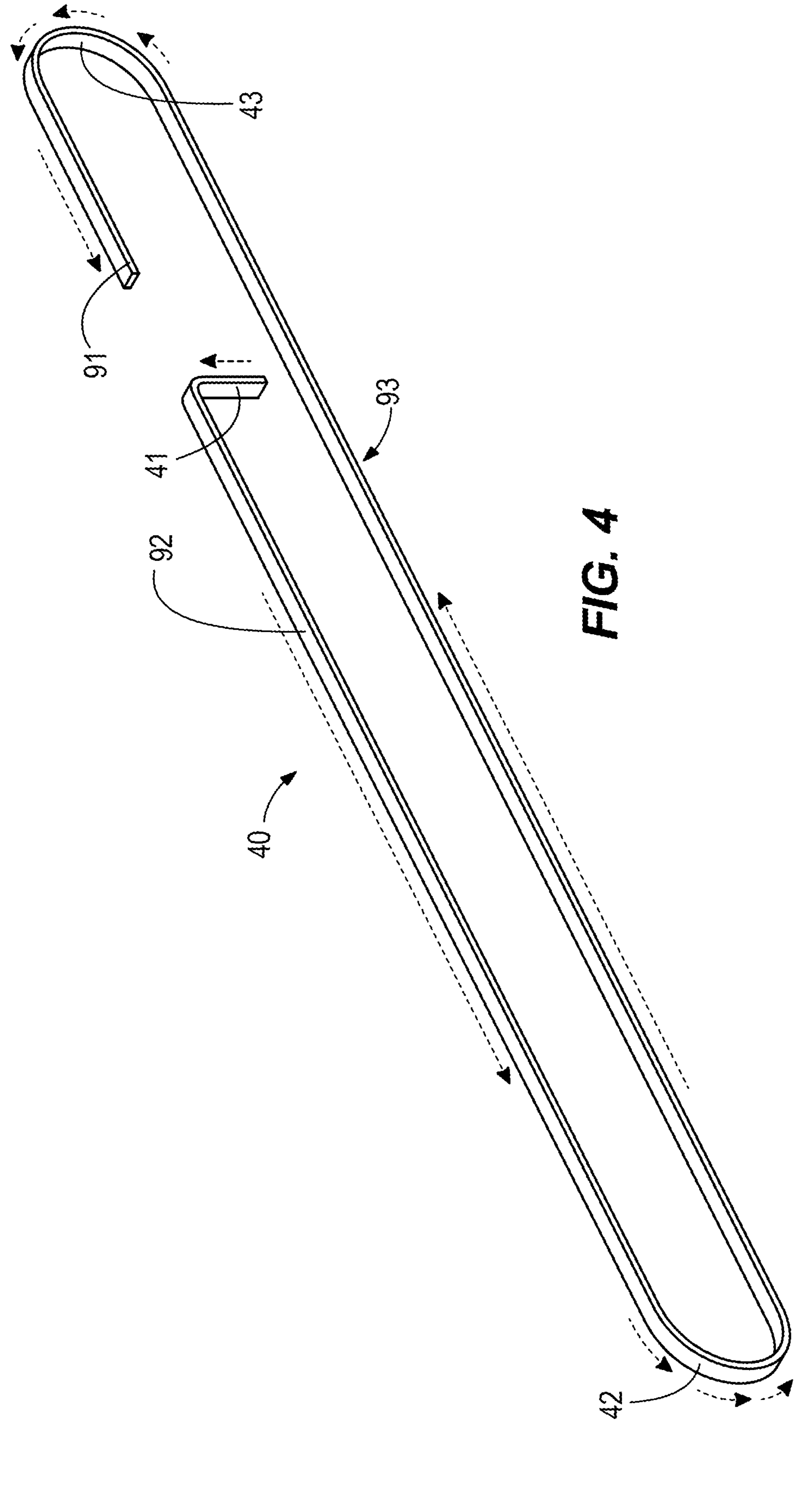
FIG. 4 illustrates a first step in manufacturing a Zig-Zag-Then-Step coil.

One method of manufacturing provides for the manufacturing of a "Zig-Zag-Then-Step" coil. For example, FIG. 4 illustrates an example conductor 40. In the example of FIG. 4, the conductor 40 is a terrace conductor. Looping of the coil 40 begins with a bend 41 bending the beginning of the conductor 40 towards the center of the loop. In some instances, the bend 41 may bend away from the center of the loop. A first straight portion 94 of the conductor 40 is wound in a straight line to a first looping pin 42. The first straight portion 94 extends substantially along a first axis 95 (see FIG. 5B). A first loop portion 96 of the conductor 40 is then wound around first looping pin 42 to form a half circle. A second straight portion 97 of the conductor 40 is wound towards a second looping pin 43 on the opposite side of the loop from the first looping pin 42. A second loop portion 98 of the conductor 40 is wound around second looping pin 43 to form a half circle. A third straight portion 99 of the conductor 40 is then wound back towards the start of the loop at the bend 41, forming the first turn of a coil. In instances where the conductor 40 is a parallel conductor coil (not shown), two conductors are side-by-side in width and looped together. Subsequent turns are wound on top of the previous turns.

Figure 5A:
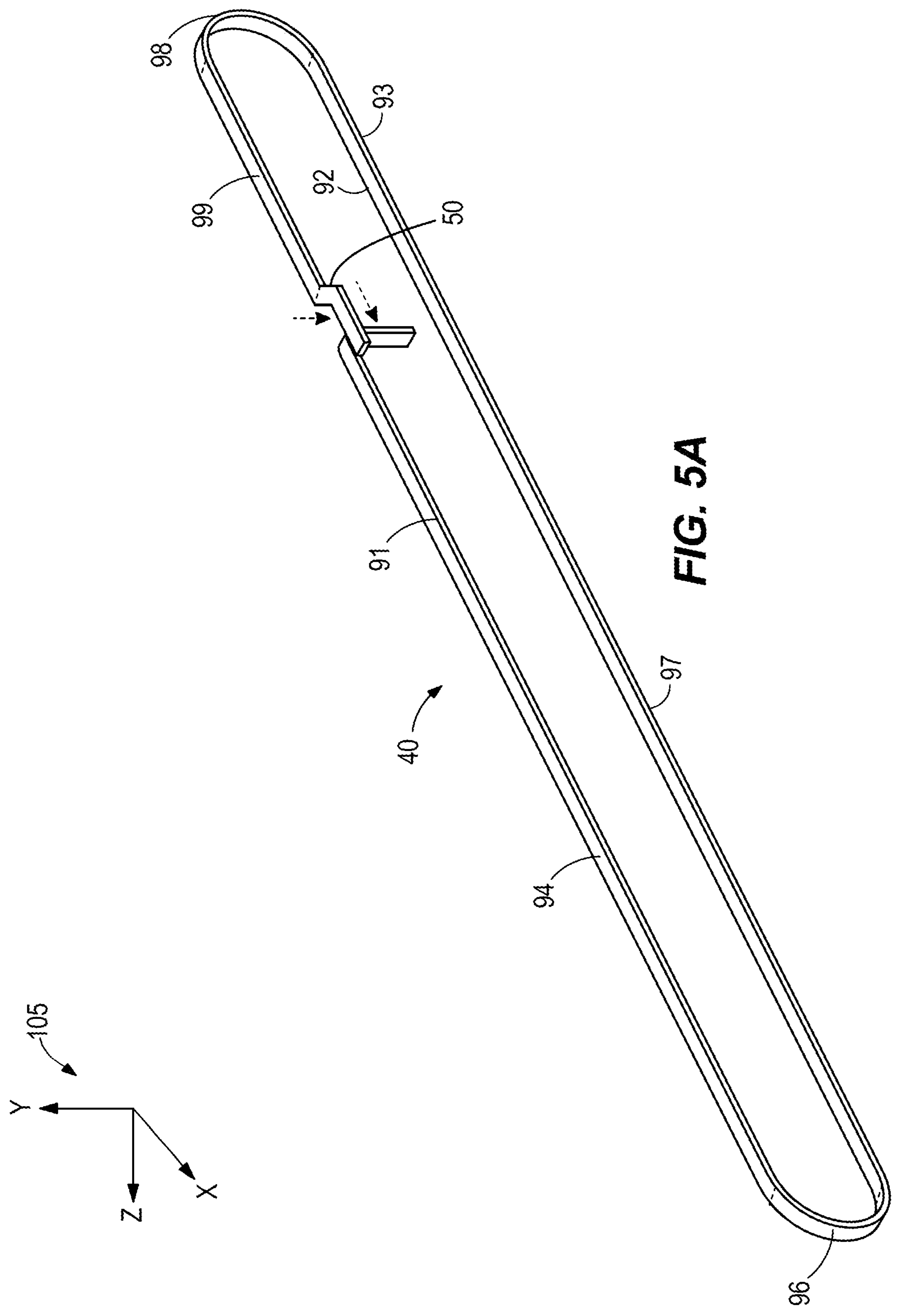
FIGS. 5A-5C illustrate a second step in manufacturing a Zig-Zag-Then-Step coil.
Figure 5C:
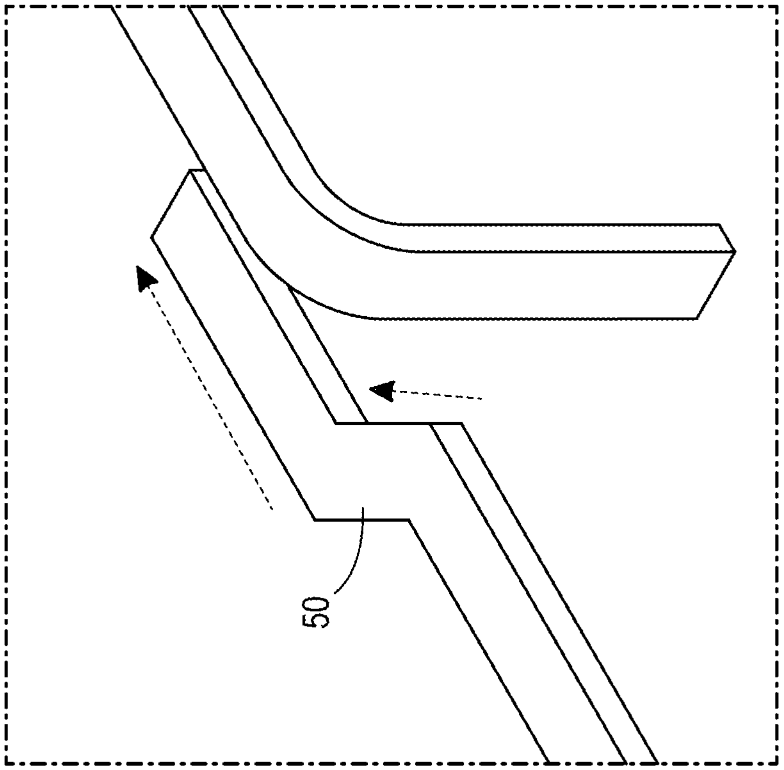
Figure 5B:
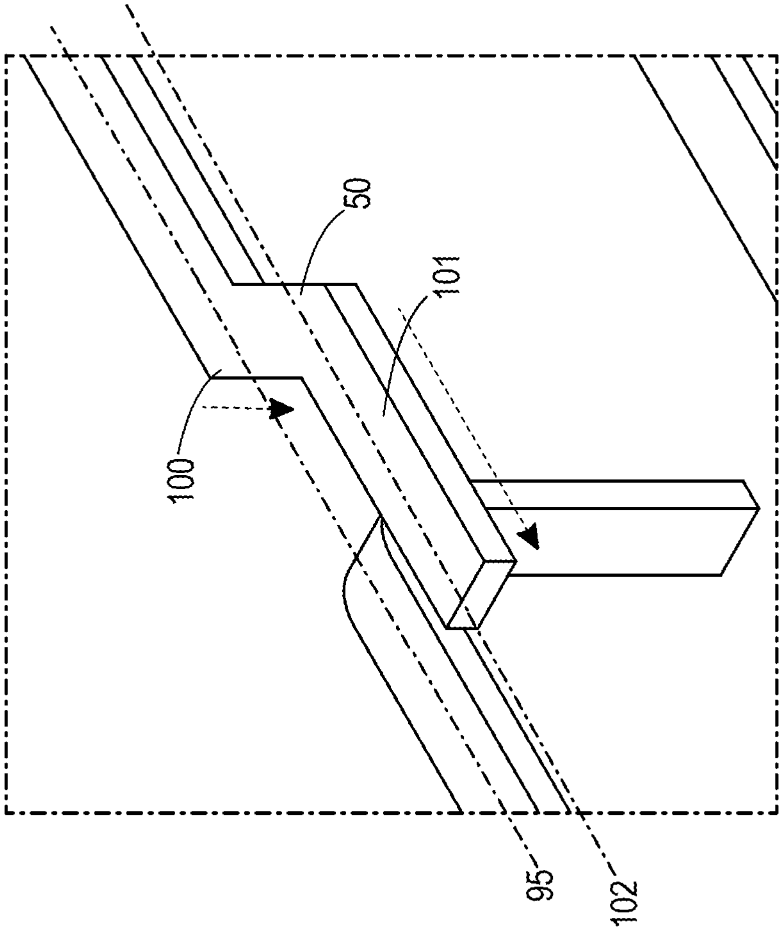

FIG. 5A illustrates the conductor 40 following the bending illustrated in FIG. 4. In FIG. 5A, a first bend portion 100 of the conductor 40 is bent (at bend 50) on the conductor edge 91 to the side (approximately 45° to the first axis 95) and a second bend portion 101 of the conductor is bent to straight again to be in a position that a second loop, parallel conductor would be in (see FIG. 5B). Bending of the second bend portion 101 causes a portion of the conductor to extend along a second axis 102 parallel to the first axis 95. This back-and-forth bend shown by bend 50 may henceforth be referred to as a "zig-zag" portion 50. The zig-zag portion 50 of the conductor 40 is insulated with additional insulation (not shown) to prevent turn-to-turn shorts between coil turns. FIG. 5B illustrates the zig-zag portion 50 magnified for clarity. FIG. 5C illustrates the zig-zag portion 50 from a reverse angle.

Figure 6:
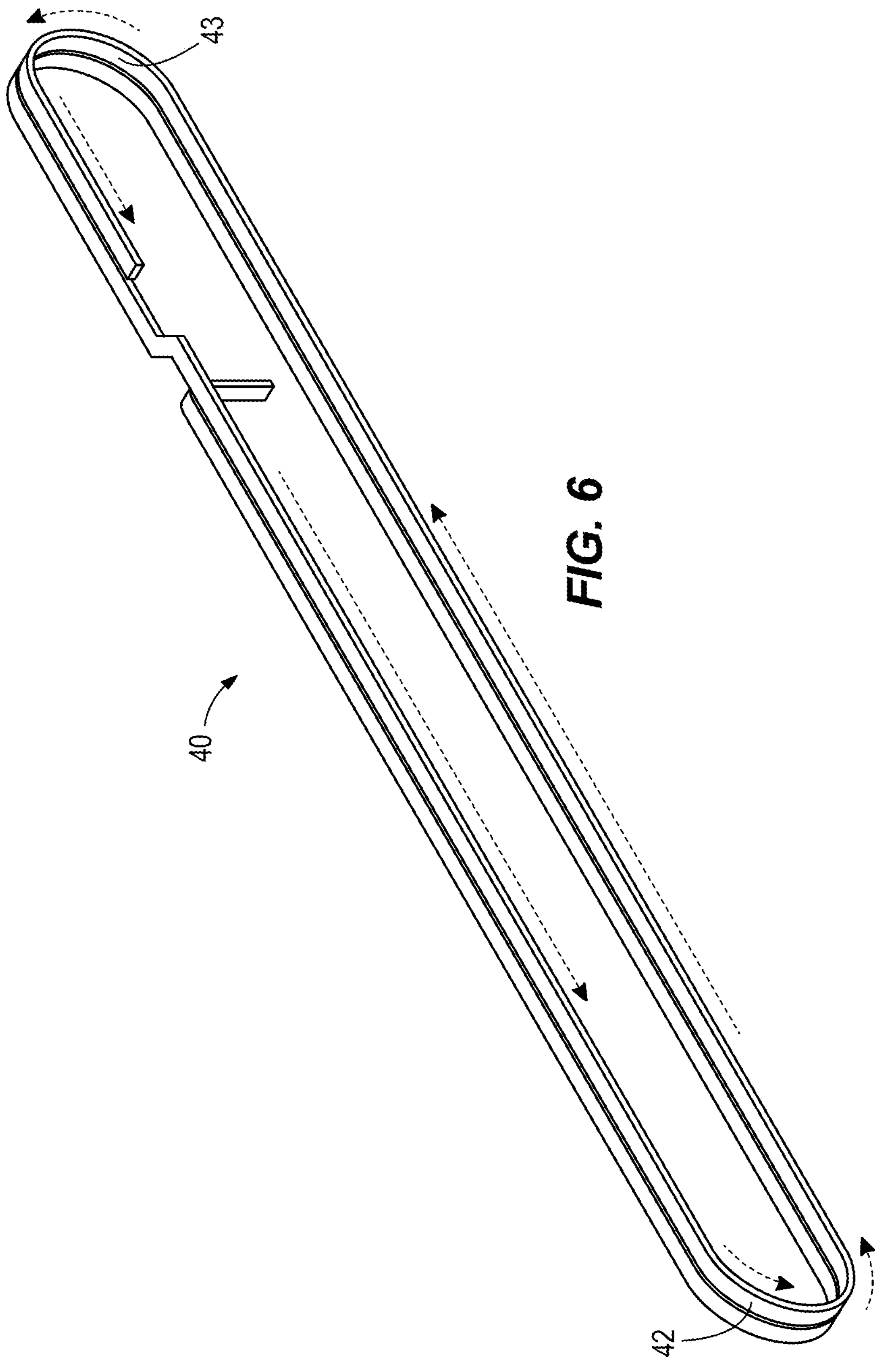
FIG. 6 illustrates a third step in manufacturing a Zig-Zag-Then-Step coil.

FIG. 6 illustrates the conductor 40 following the bending illustrated in FIGS. 5A-5C. In FIG. 6, the looping of the conductor 40 continues to the first looping pin 42. The conductor 40 is then wound around first looping pin 42 to form a half circle, and continues to the second looping pin 43 on the opposite side of the loop from the first looping pin 42. The conductor 40 is then bent back towards the start of the loop, forming the second turn of the coil.

Figure 7A:
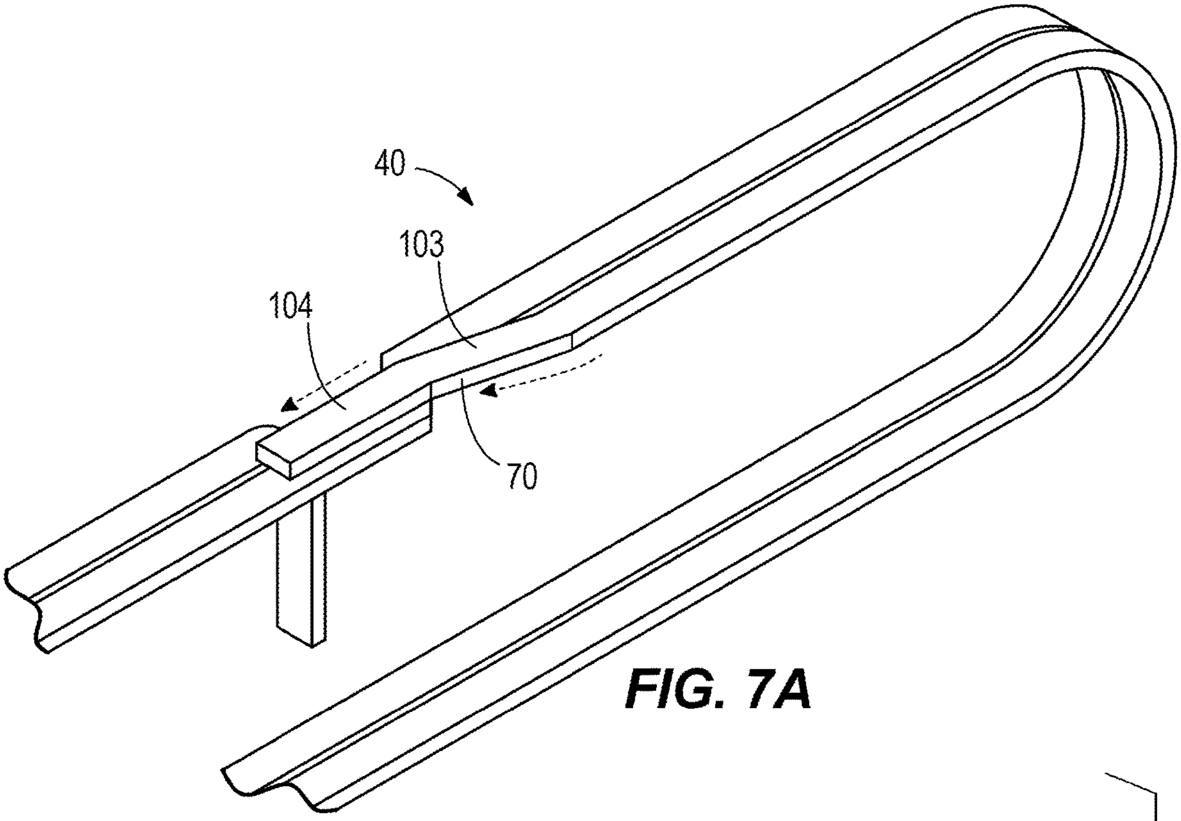
FIGS. 7A-7B illustrate a fourth step in manufacturing a Zig-Zag-Then-Step coil.
Figure 7B:
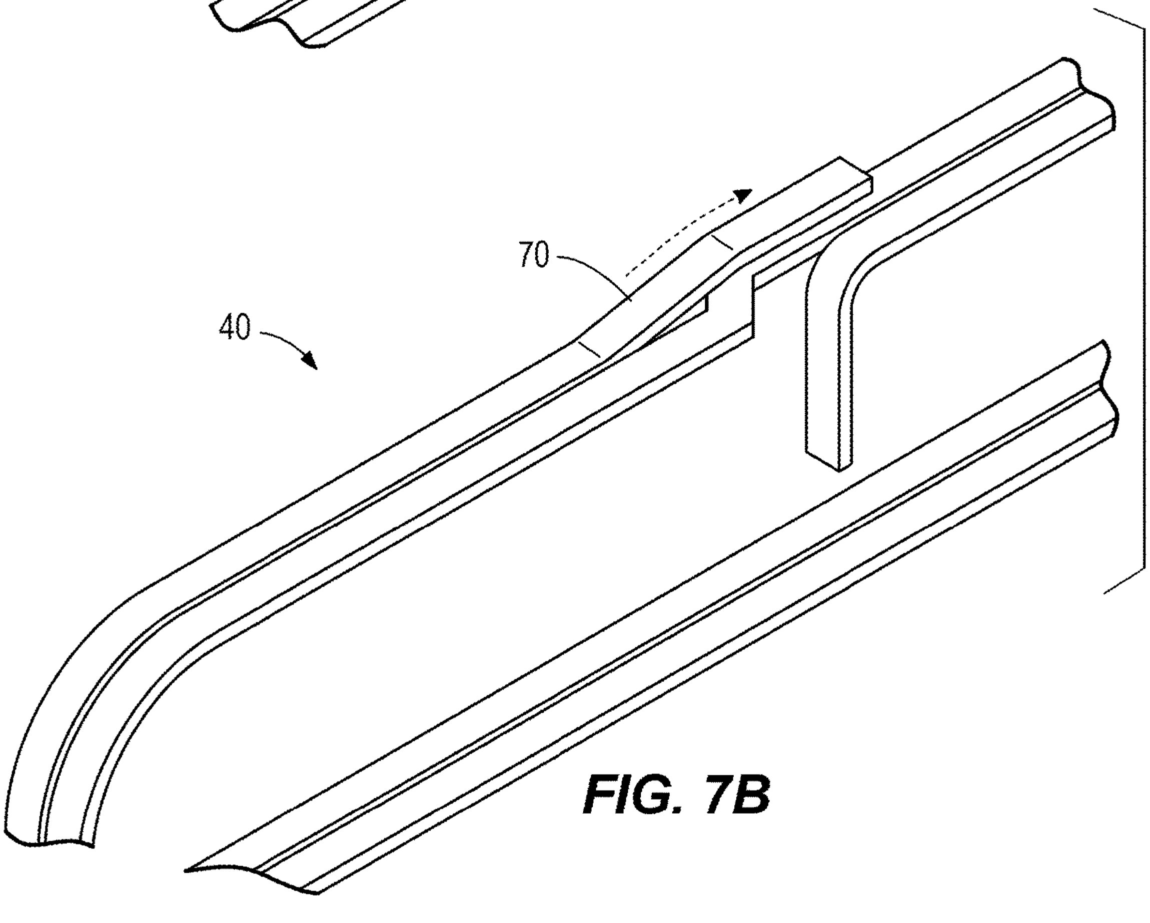

FIG. 7A illustrates the conductor 40 following the bending illustrated in FIG. 6. In FIG. 7A, a third bend portion 103 of the conductor 40 is bent upwards (at bend 70) along a y-axis 105 and a fourth bend portion 104 of the conductor 40 is bent back downwards along the y-axis 105 such that the loop is on top of the previous turn and parallel to the previous turn. When the loop is on top of the previous turn, the bottom 93 of the conductor 40 is in contact with the top 92 of the conductor 40 of the previous turn. The third bend portion 103 extends substantially along the second axis 102 and the fourth bend portion 104 extends substantially along the second axis 102. In some instances, the third bend portion 103 may extend substantially along different axes. This upwards and downwards bend 70 may henceforth be referred to as step 70. FIG. 7B illustrates the step 70 from a reverse angle. FIGS. 7A-7B illustrate a spacing shown between the turns in the width direction and on top of each other. However, in some instances, the conductors 40 forming the loops are laid directly next to and on top of each other such that each turn contacts subsequent turns.

Figure 8:
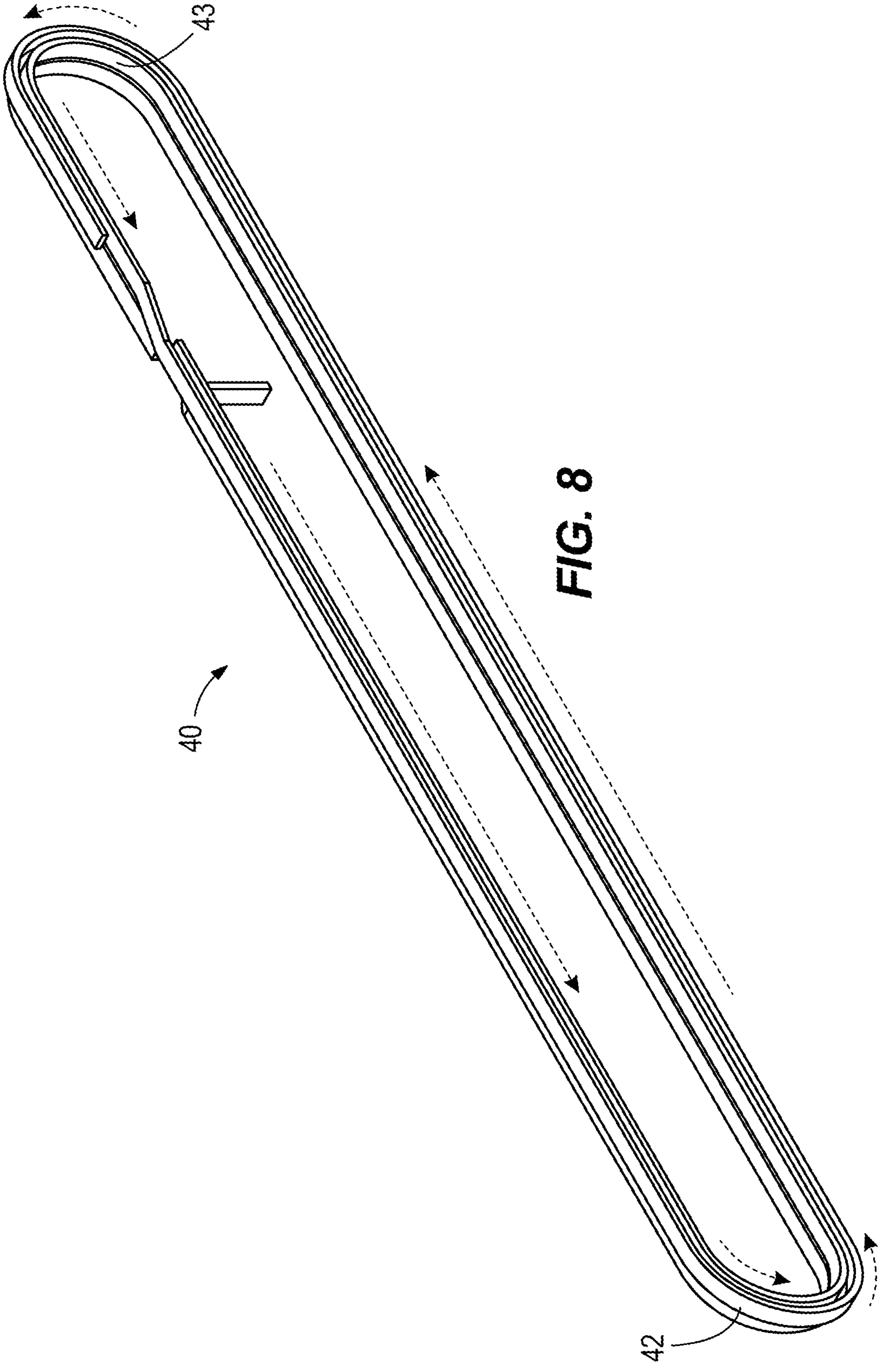
FIG. 8 illustrates a fifth step in manufacturing a Zig-Zag-Then-Step coil.

FIG. 8 illustrates the conductor 40 following the bending illustrated in FIGS. 7A-7B. In FIG. 8, the looping of the conductor 40 continues to the first looping pin 42. The loop is then wound around the first looping pin 42 to form a half circle. The loop is wound to the second looping pin 43 on the opposite side of the loop, and is wound around the second looping pin 43 and towards the start of the loop. This forms the third turn of the coil.

Figure 9A:
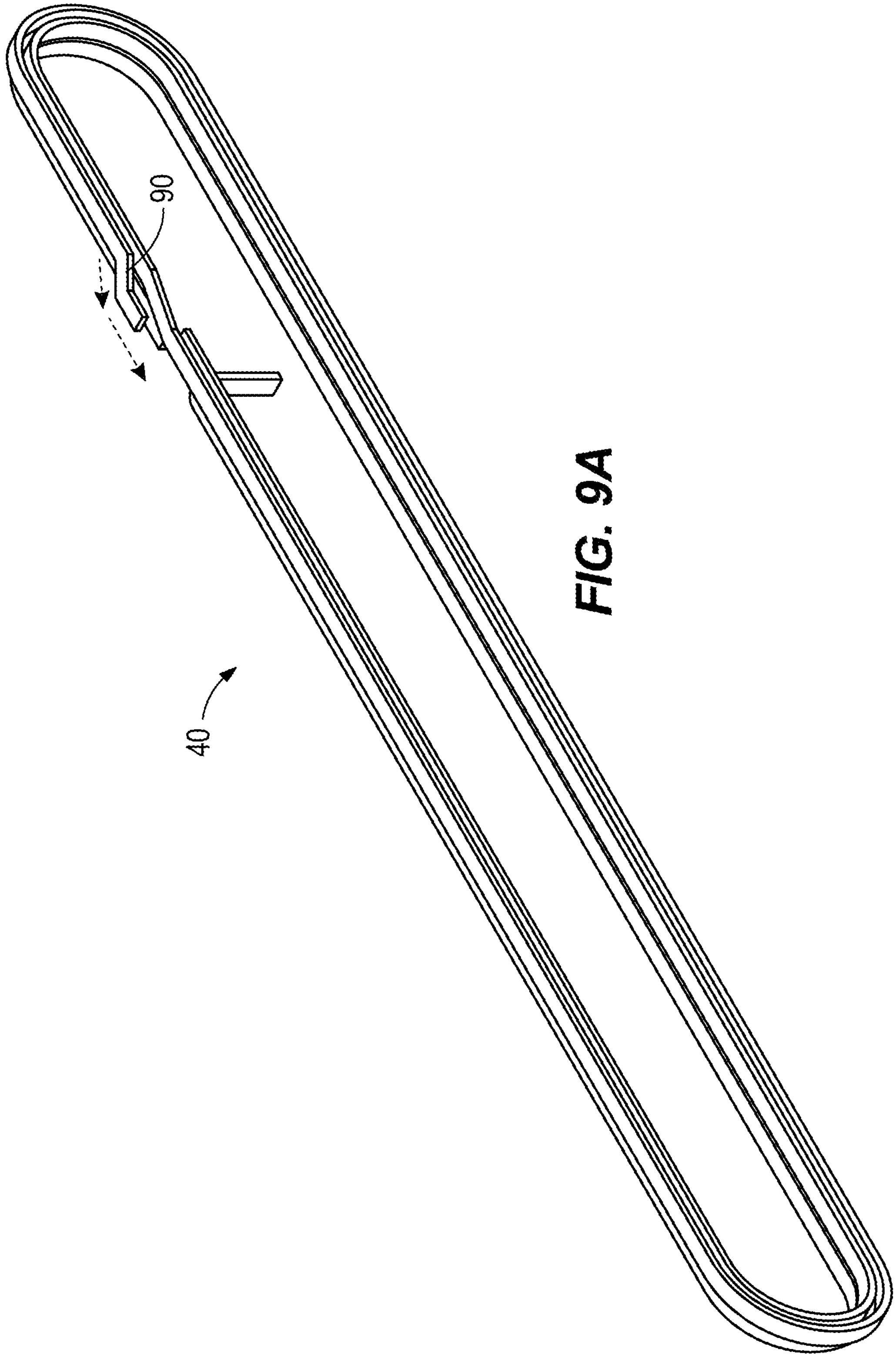
FIGS. 9A-9C illustrate a sixth step in manufacturing a Zig-Zag-Then-Step coil.
Figure 9B:
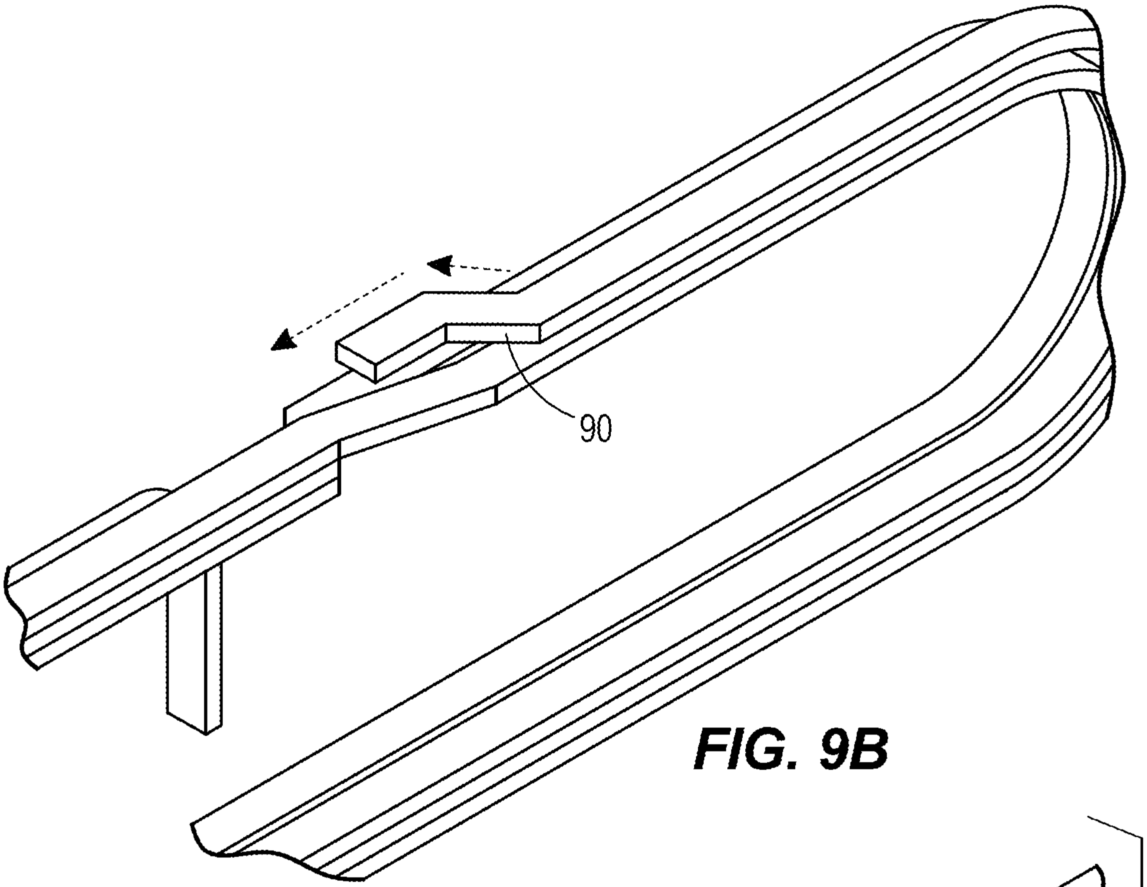
Figure 9C:
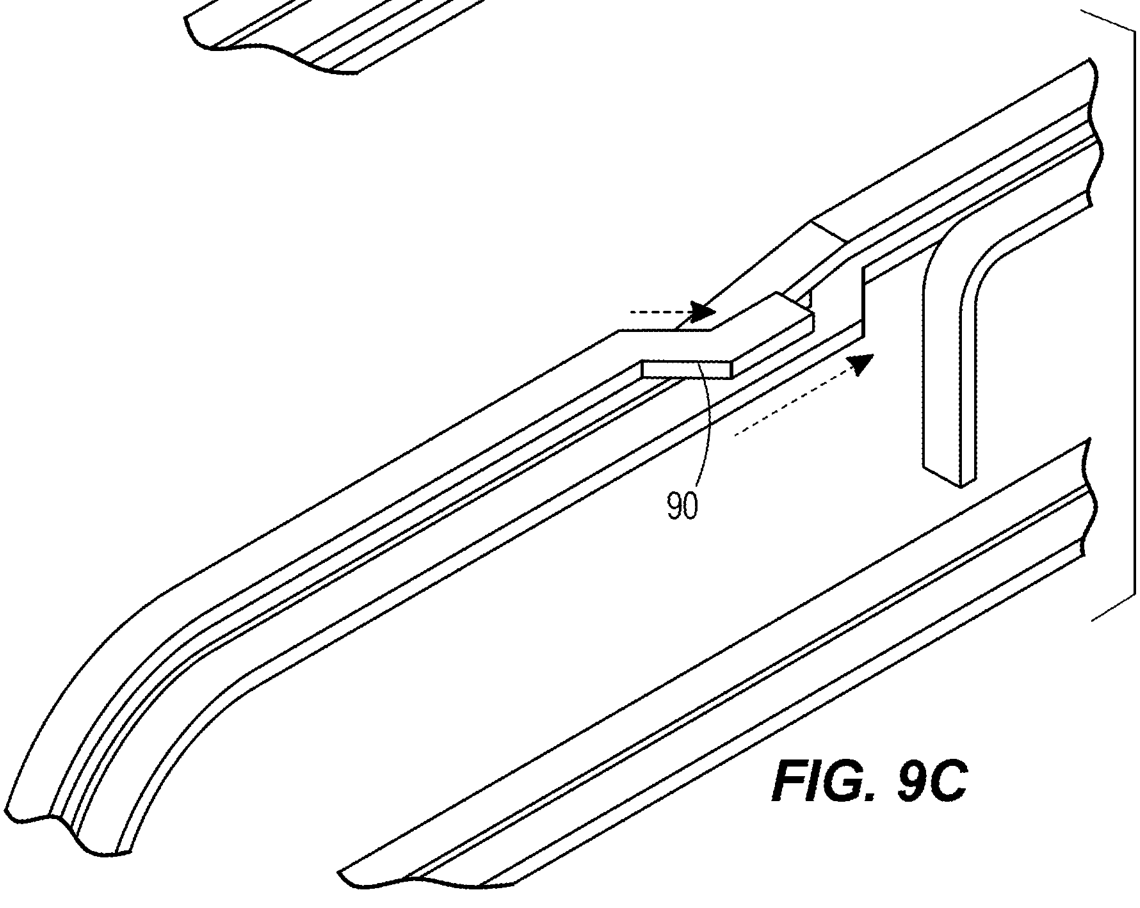

FIG. 9A illustrates the conductor 40 following the bending illustrated in FIG. 8. In FIG. 9A, the conductor 40 is bent (at bend 90) on edge to the side (approximately 45°) and then back straight again to be in the position of the first loop. FIG. 9B illustrates the bend 90 magnified for clarity. FIG. 9C illustrates the bend 90 from a reverse angle.

Figure 10:
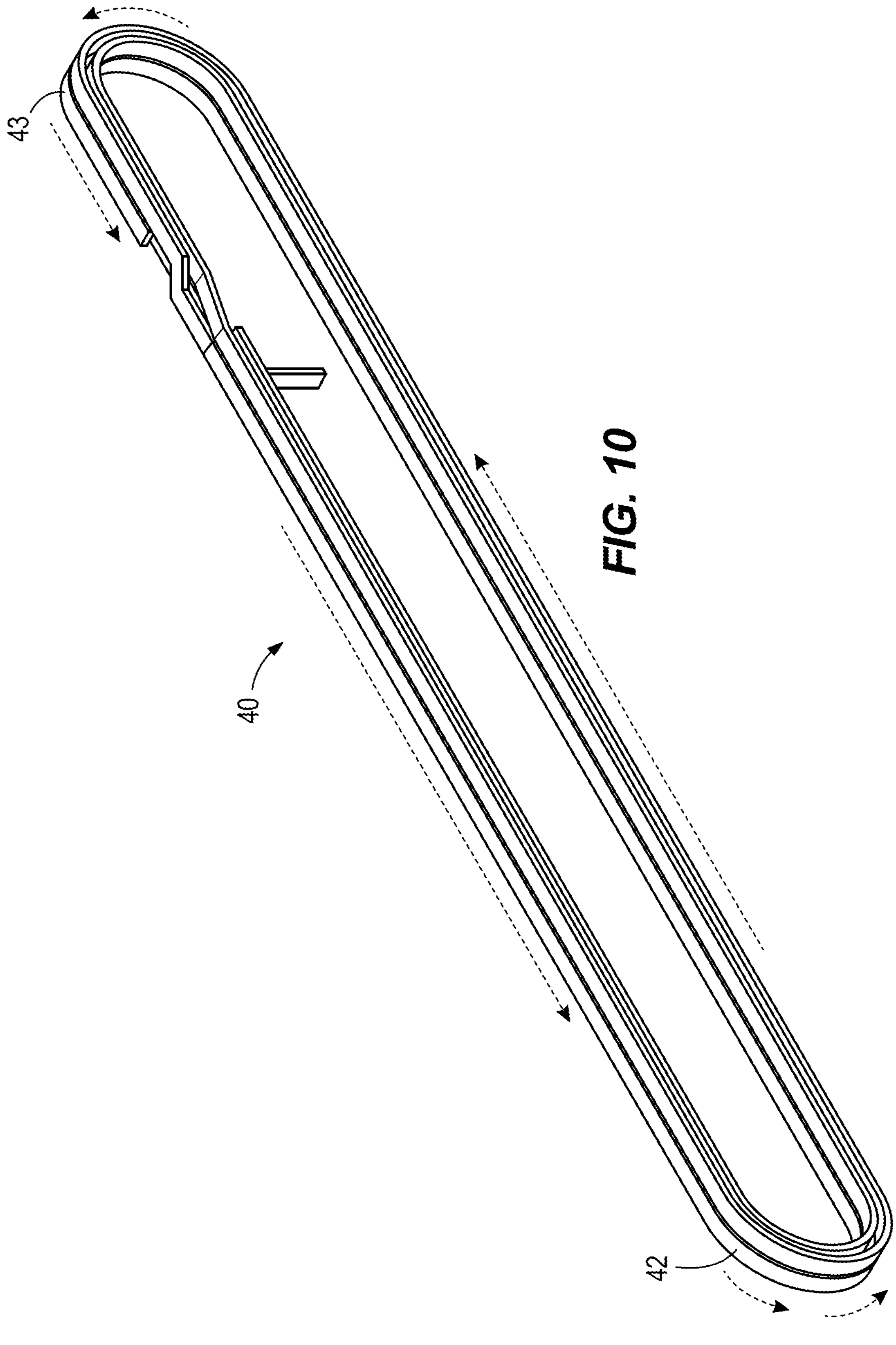
FIG. 10 illustrates a seventh step in manufacturing a Zig-Zag-Then-Step coil.

FIG. 10 illustrates the conductor 40 following the bending illustrated in FIGS. 9A-9C. In FIG. 10, the looping of the conductor 40 continues to the first looping pin 42. The loop is then wound around the first looping pin 42 to form a half circle. The loop is wound to the second looping pin 43 on the opposite side of the loop, and is wound around the second looping pin 43 and towards the start of the loop. This forms the fourth turn of the coil.

Figure 11A:
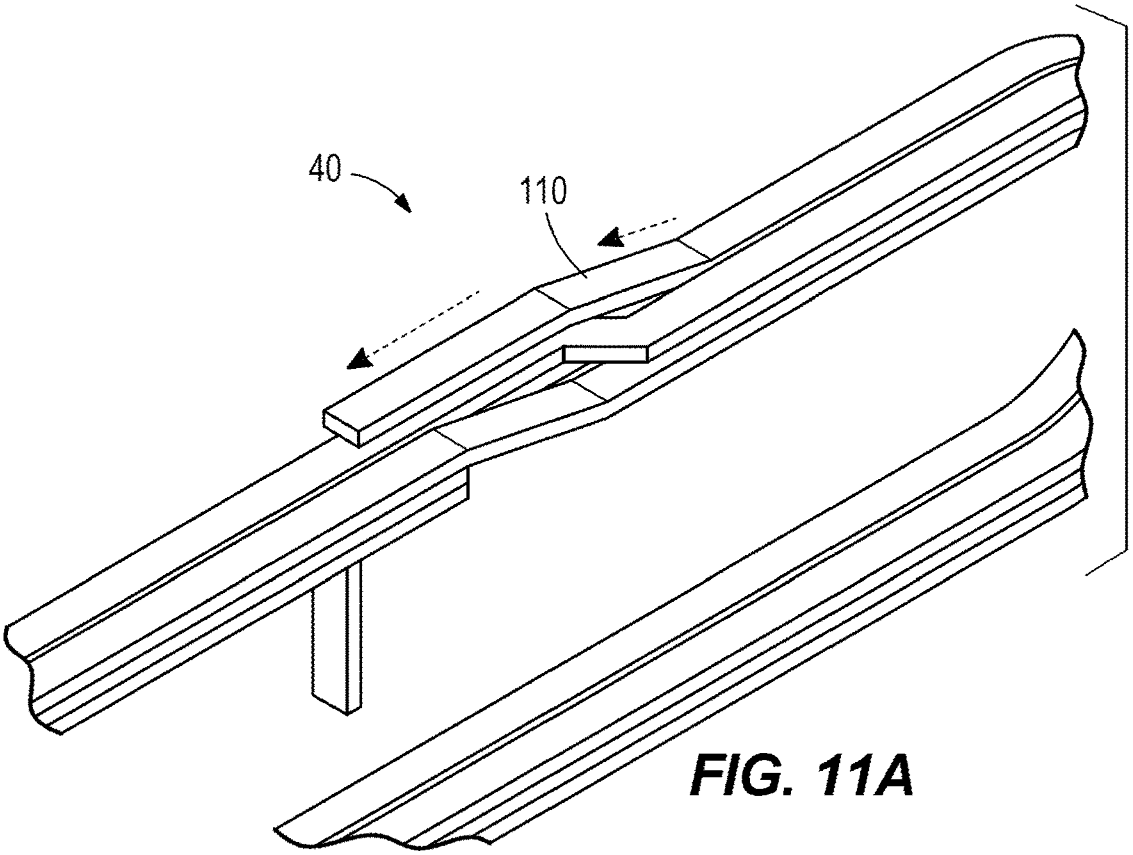
FIGS. 11A-11B illustrate an eighth step in manufacturing a Zig-Zag-Then-Step coil.
Figure 11B:
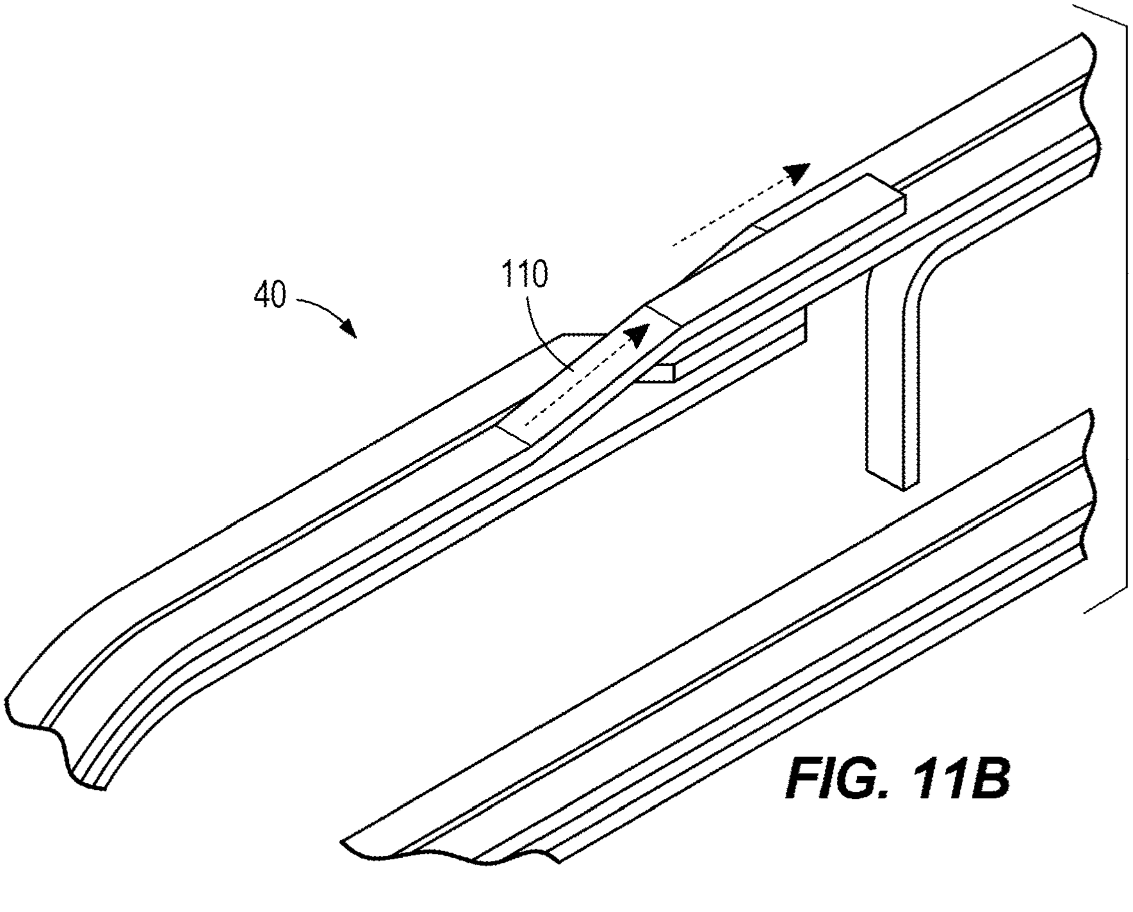

FIG. 11A illustrates the conductor 40 following the bending illustrated in FIG. 10. In FIG. 11A, the conductor 40 is bent upwards (at bend 110) and then bent back downwards to be on top of the previous turn and parallel to the previous turn. FIG. 11B illustrates the bend 110 from a reverse angle.

Figure 12:
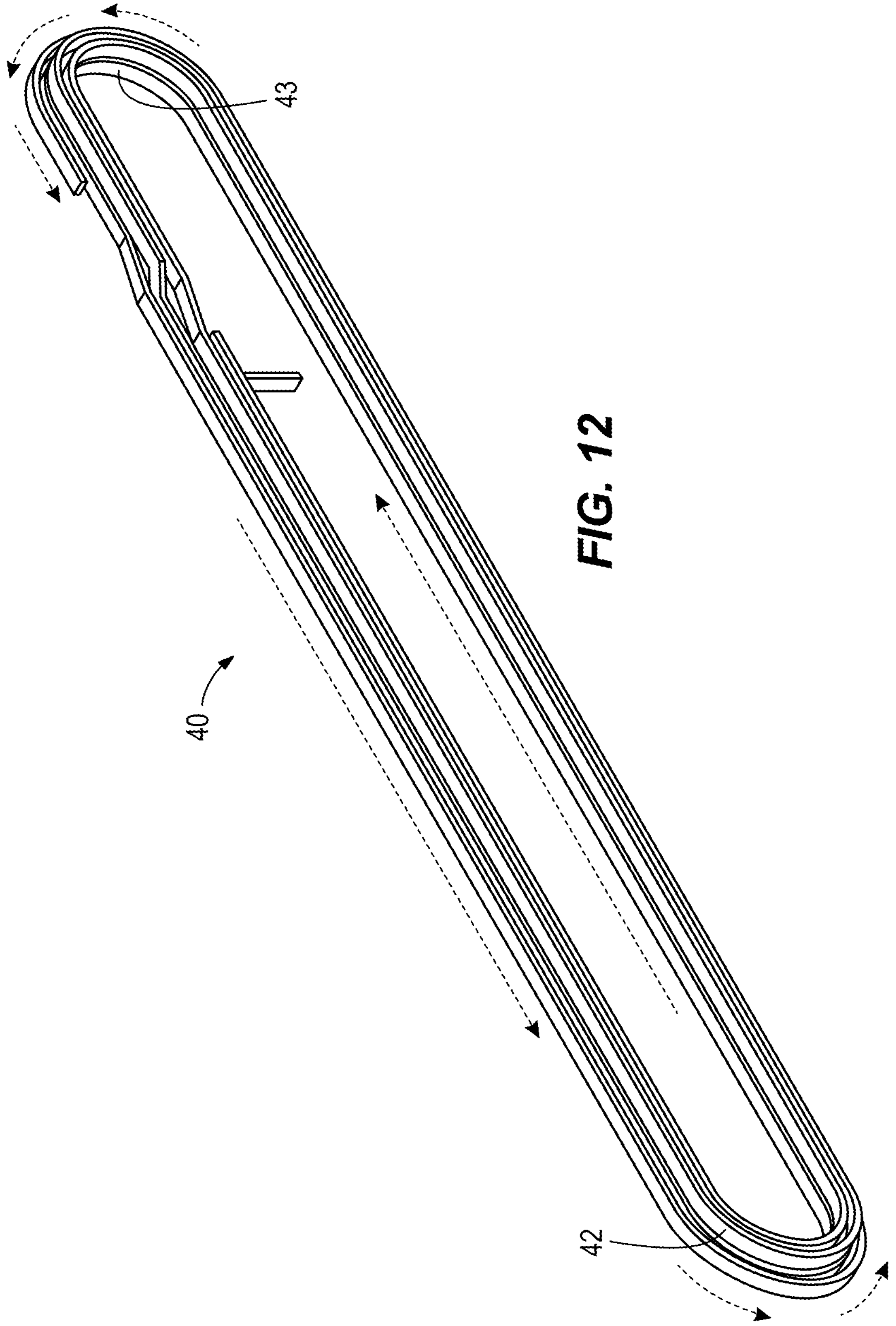
FIG. 12 illustrates a ninth step in manufacturing a Zig-Zag-Then-Step coil.

FIG. 12 illustrates the conductor 40 following the bending illustrated in FIGS. 11A-11B. In FIG. 12, the looping of the conductor 40 continues to the first looping pin 42. The loop is then wound around the first looping pin 42 to form a half circle. The loop is wound to the second looping pin 43 on the opposite side of the loop, and is wound around the second looping pin 43 and towards the start of the loop. This forms the fifth turn of the coil.

Figure 13A:
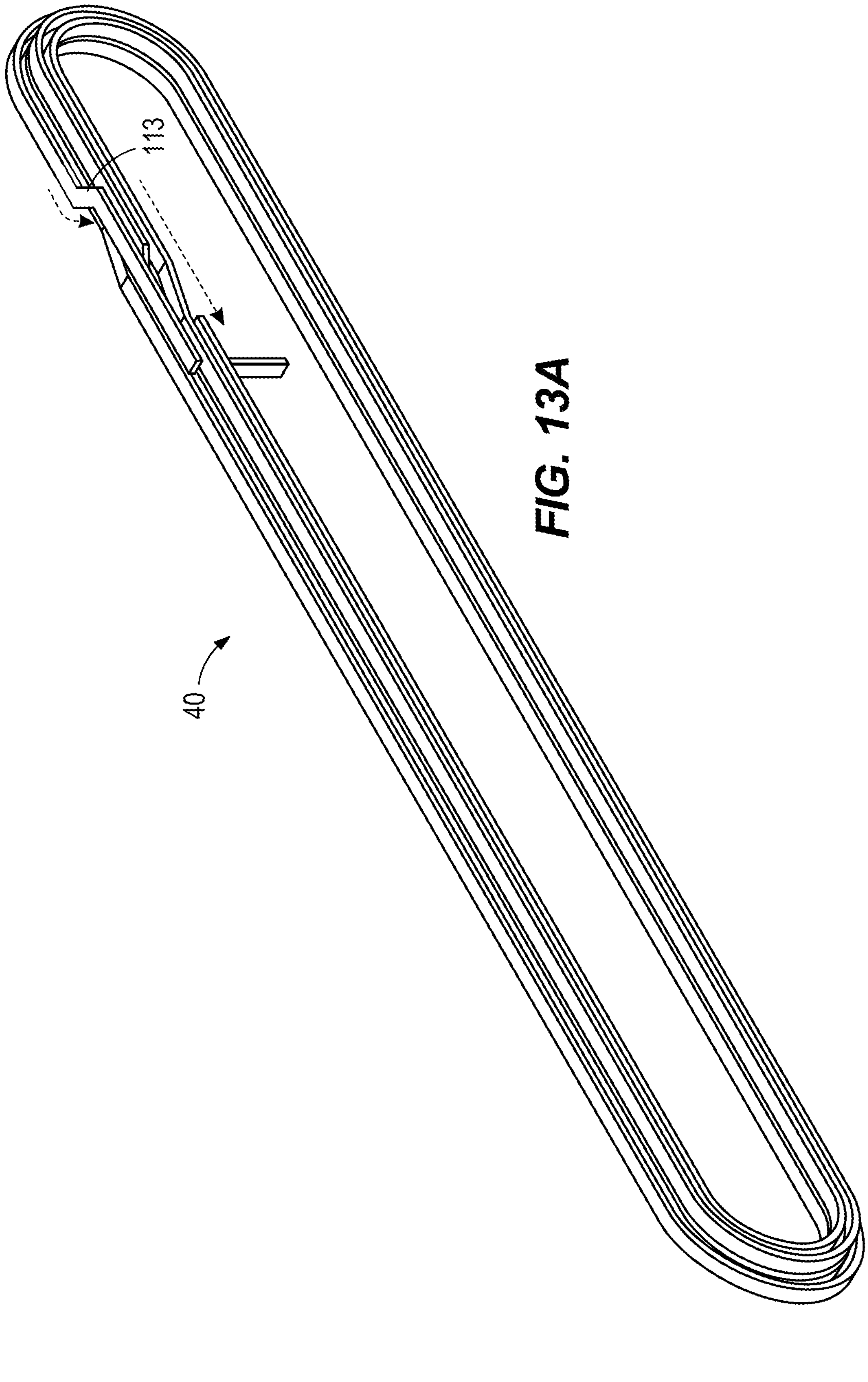
FIGS. 13A-13C illustrate a tenth step in manufacturing a Zig-Zag-Then-Step coil.
Figure 13B:
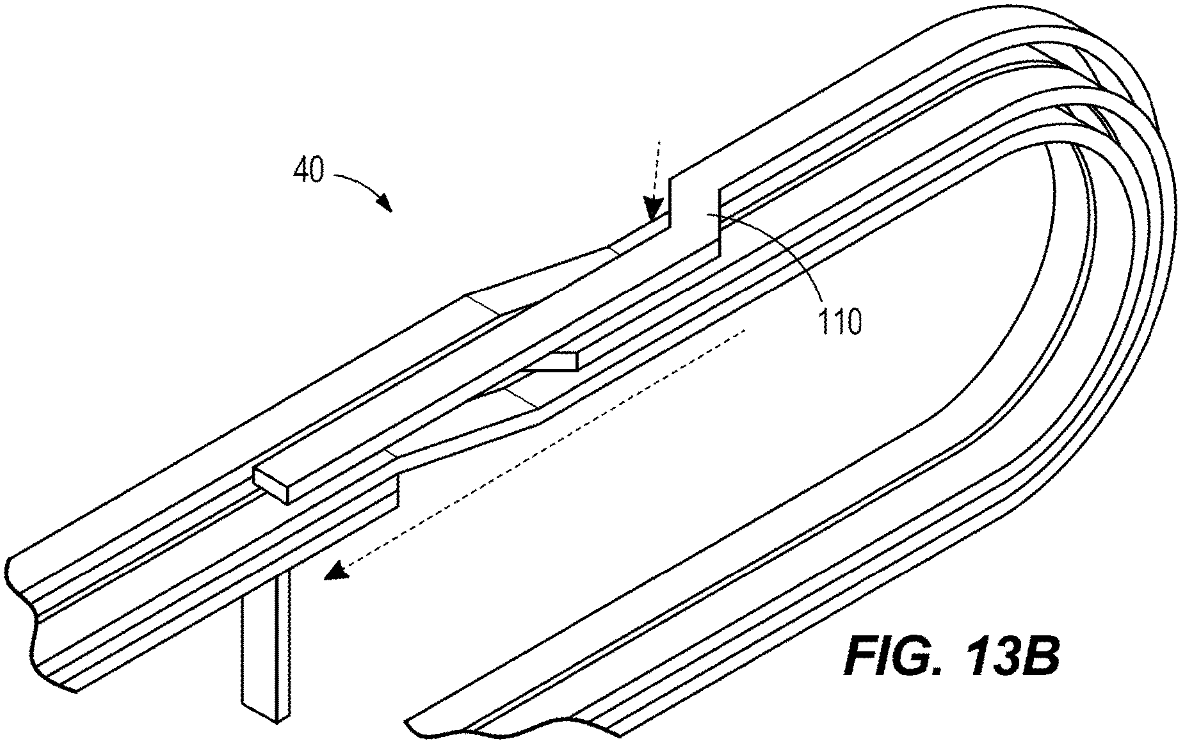
Figure 13C:
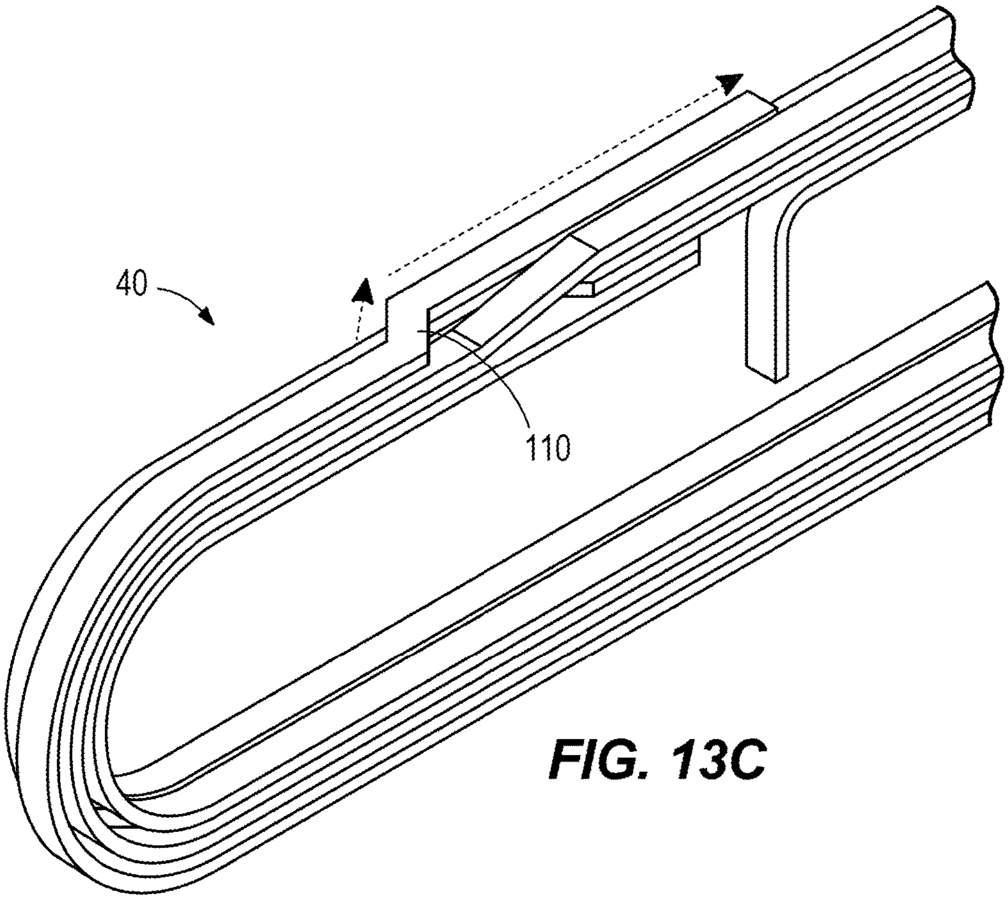

FIG. 13A illustrates the conductor 40 following the bending illustrated in FIG. 12. In FIG. 13A, the conductor 40 is bent (at bend 130) to the side (approximately 45°) then back to straight again to be in the position of the first loop. The straight section illustrated in FIG. 13A is shown as longer than in previous illustrations. However, this is for the purposes of clarity, to show that the straight section is on top of the set of turns. FIG. 13B illustrates the bend 130 magnified for clarity. FIG. 13C illustrates the bend 130 from a reverse angle.

Figure 14:
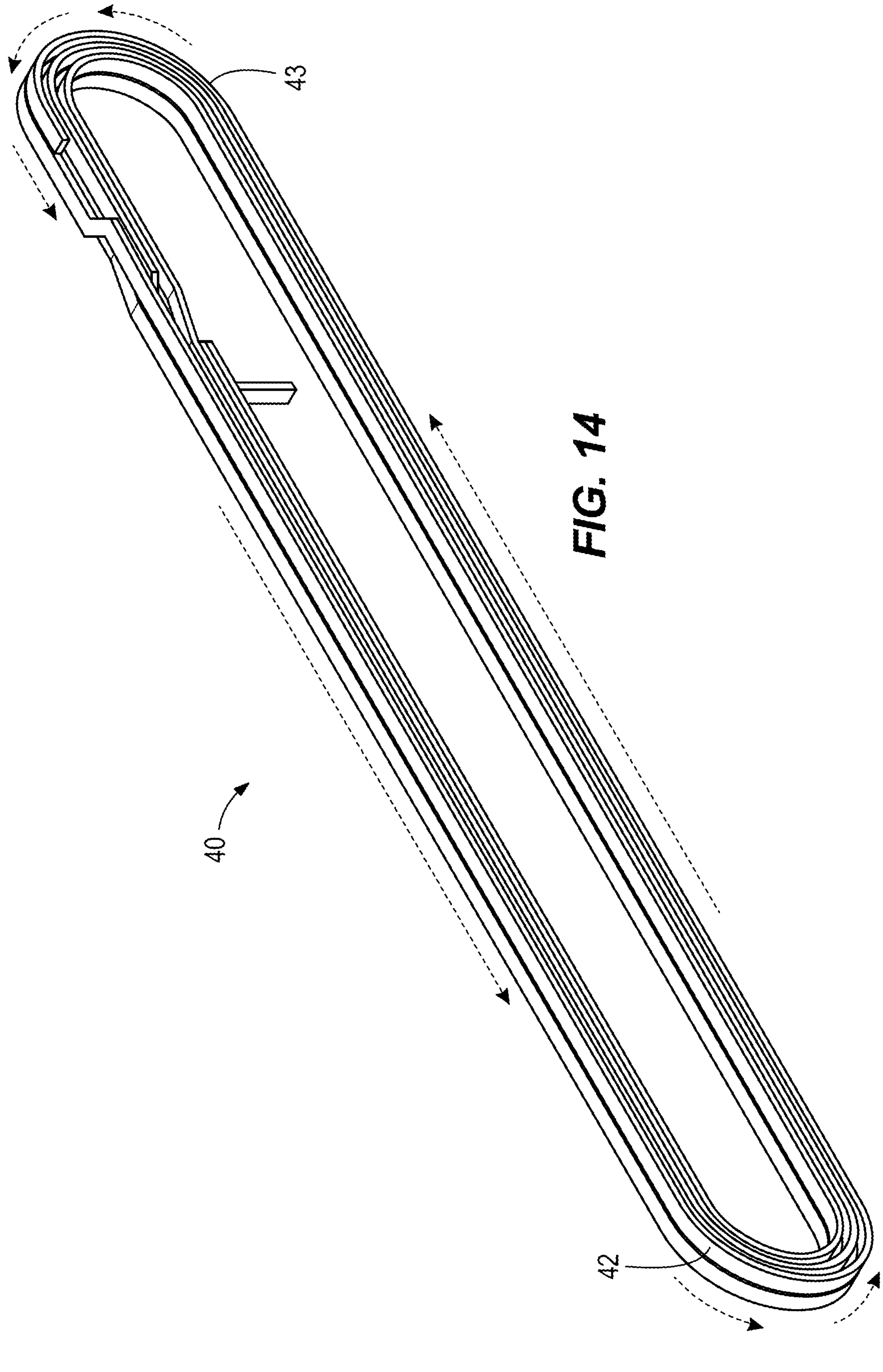
FIG. 14 illustrates an eleventh step in manufacturing a Zig-Zag-Then-Step coil.

FIG. 14 illustrates the conductor 40 following the bending illustrated in FIGS. 13A-13C. In FIG. 14, the looping of the conductor 40 continues to the first looping pin 42. The loop is then wound around the first looping pin 42 to form a half circle. The loop is wound to the second looping pin 43 on the opposite side of the loop, and is wound around the second looping pin 43 and towards the start of the loop. This forms the sixth turn of the coil.

Figure 15A:
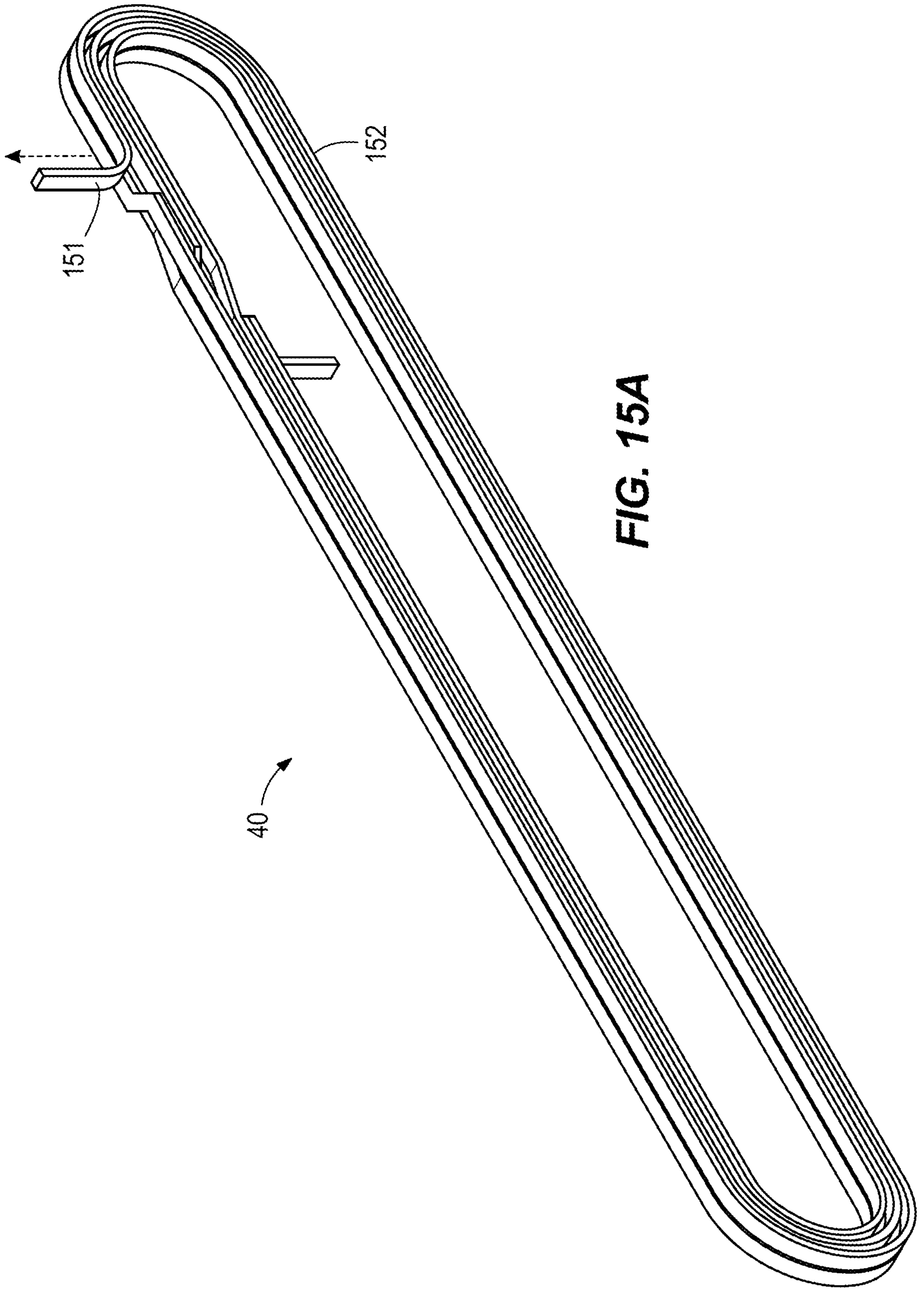
FIG. 15A illustrates a manufactured Zig-Zag-Then-Step coil.
Figure 15B:
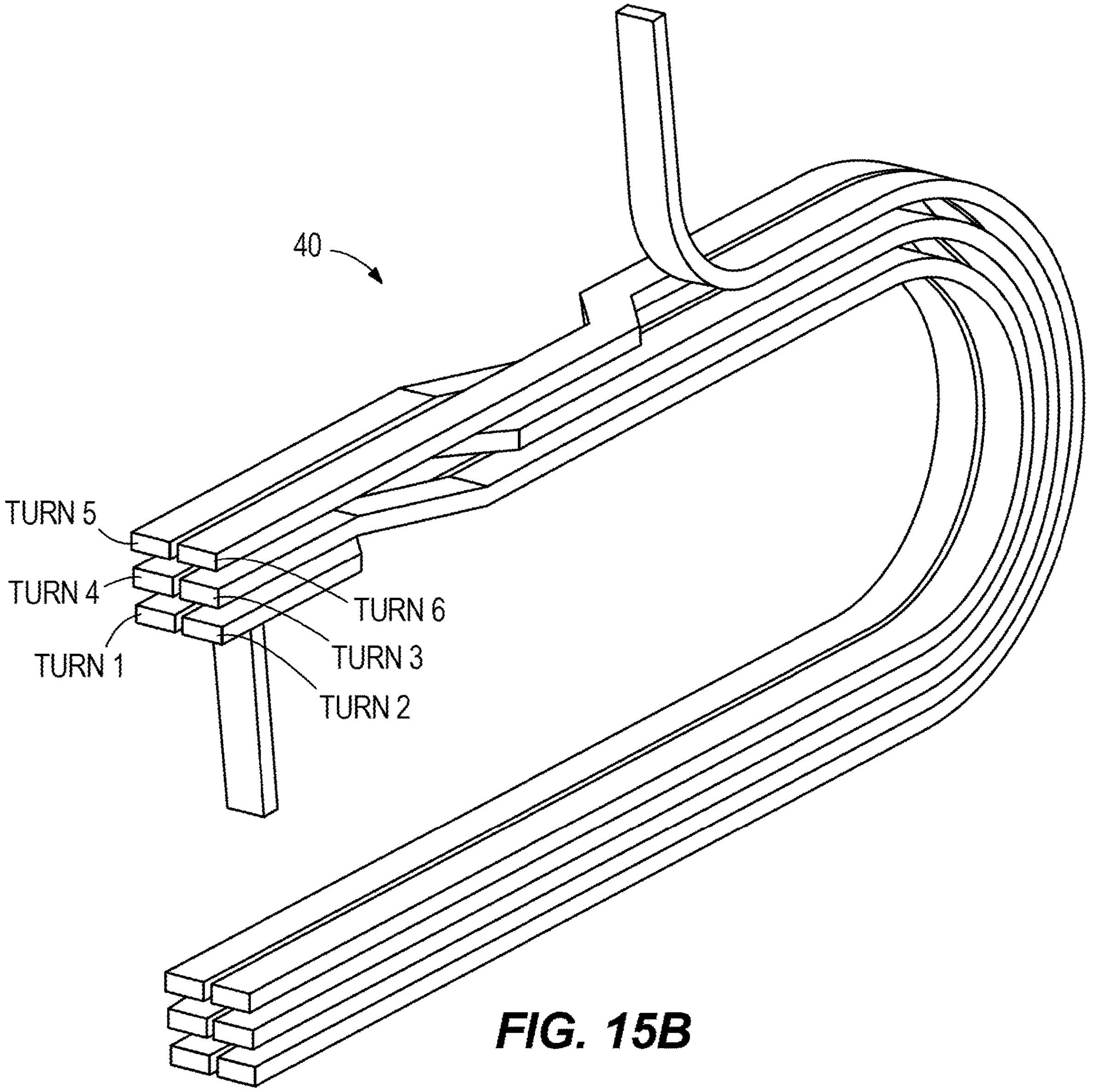
FIG. 15B illustrates a cross-sectional view of the manufactured Zig-Zag-Then-Step coil of FIG. 15A.

FIG. 15A illustrates the conductor 40 following the bending illustrated in FIG. 14. In FIG. 15A, the end of the looping is bent away from the loop at bend 151. Alternatively, in some embodiments, the end of the coil is bent away from the loop at bend 152. The start and finish of the coils may then be bent and shaped into suitable positions for the plurality of slots 11. FIG. 15B illustrates a cross-section of the conductor 40 of FIG. 15A. Accordingly, FIGS. 15A-15B illustrates a six turn, Zig-Zag-Then-Step series coil. For the example six turn, Zig-Zag-Then-Step series coil illustrated in FIGS. 15A-15B, the Simple Volt Per Turn in each coil is provided using Equation 1:

$$v_t = \frac{V_c}{t} \qquad \text{[Equation 1]}$$

Where:

$V_c$=Volts per coil;

t=Number of turns in the coil; and $v_t$=Calculated Simple Volt Per Turn (in Volts).

In a parallel conductor coil, such as that shown in FIG. 3, the Maximum Volt Per Turn is exactly equal to the calculated Simple Volt Per Turn, as shown below in Equation 2:

$$V_{tmax} = v_t = \frac{V_c}{t} \qquad \text{[Equation 2]}$$

Where:

$V_c$=Volts per coil;

t=Number of turns in the coil;

$v_t$=Calculated Simple Volt Per Turn (in Volts); and $V_{tmax}$=Calculated Maximum Volt Per Turn (in Volts).

This calculated Maximum Volt Per Turn value impacts the determination of the type and thickness of turn insulation to be used in the parallel conductor coil, and may impact the overall size of the insulated coil. For terrace coils, however the Maximum Volt Per Turn is not necessarily equal to the Simple Volt Per Turn. For example, the Maximum Volt Per Turn for the terrace coil of FIG. 15A is provided by Equation 3:

$$V_{tmax.zzts} = 3 \cdot v_t = 3 \cdot \frac{V_c}{t} \qquad \text{[Equation 3]}$$

Where:

$V_c$=Volts per coil;

t=Number of turns in the coil;

$v_t$=Calculated Simple Volt Per Turn (in Volts); and $V_{tmax.zzts}$=Calculated Maximum Volt Per Turn for Zig-Zag-Then-Step coil (in Volts).

Accordingly, by comparing Equations 2 and 3, one can see that conductor insulation may be significantly thicker or of a different material for the Zig-Zag-Then-Step coil compared to a parallel conductor coil in order to compensate for the higher Maximum Volt Per Turn.

Figure 16:
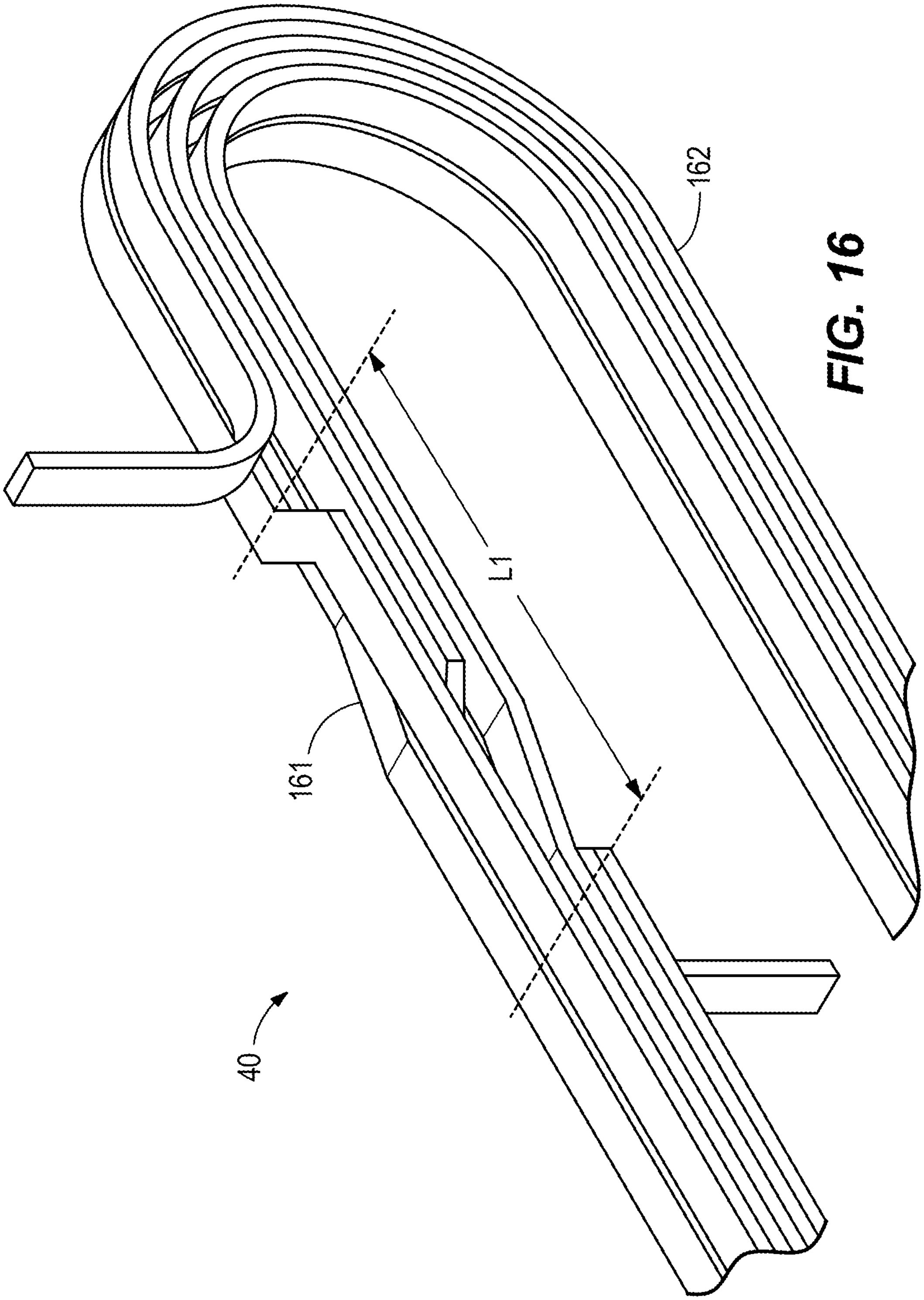
FIG. 16 illustrates a perspective view of the manufactured Zig-Zag-Then-Step coil of FIG. 15A.

Additionally, as the number of turns increase, the length required for these transitions increases proportionally, limiting how many turns can be manufactured onto the overhang portion of the coil. The overhang portion is, for example, a portion of the winding that is longer than the stator core length, and therefore "hangs" past the stator core. In some instances, the transitions of the turns may be distributed around the conductor 40 to increase the number of turns that may be accommodated. For example, FIG. 16 provides a perspective view of the completed conductor 40, where the turn transitions have a length L1. To increase the number of turns that may be accommodated, some turn transitions may be manufactured on a first side 161 of the conductor 40, and other transitions may be manufactured on a second side 162 of the conductor 40. The Zig-Zag-Then-Step method of manufacturing the terrace coils provides reduced risk of pinch points in the insulation, as the "Zig-Zag" transitions and the "Step" transitions are manufactured separately. Additionally, the Zig-Zag-Then-Step method introduces less physical stress on the conductor 40, thereby reducing risk of stress fractures and hairline cracks, and reducing risk of inter-turn failures.

Figure 17:
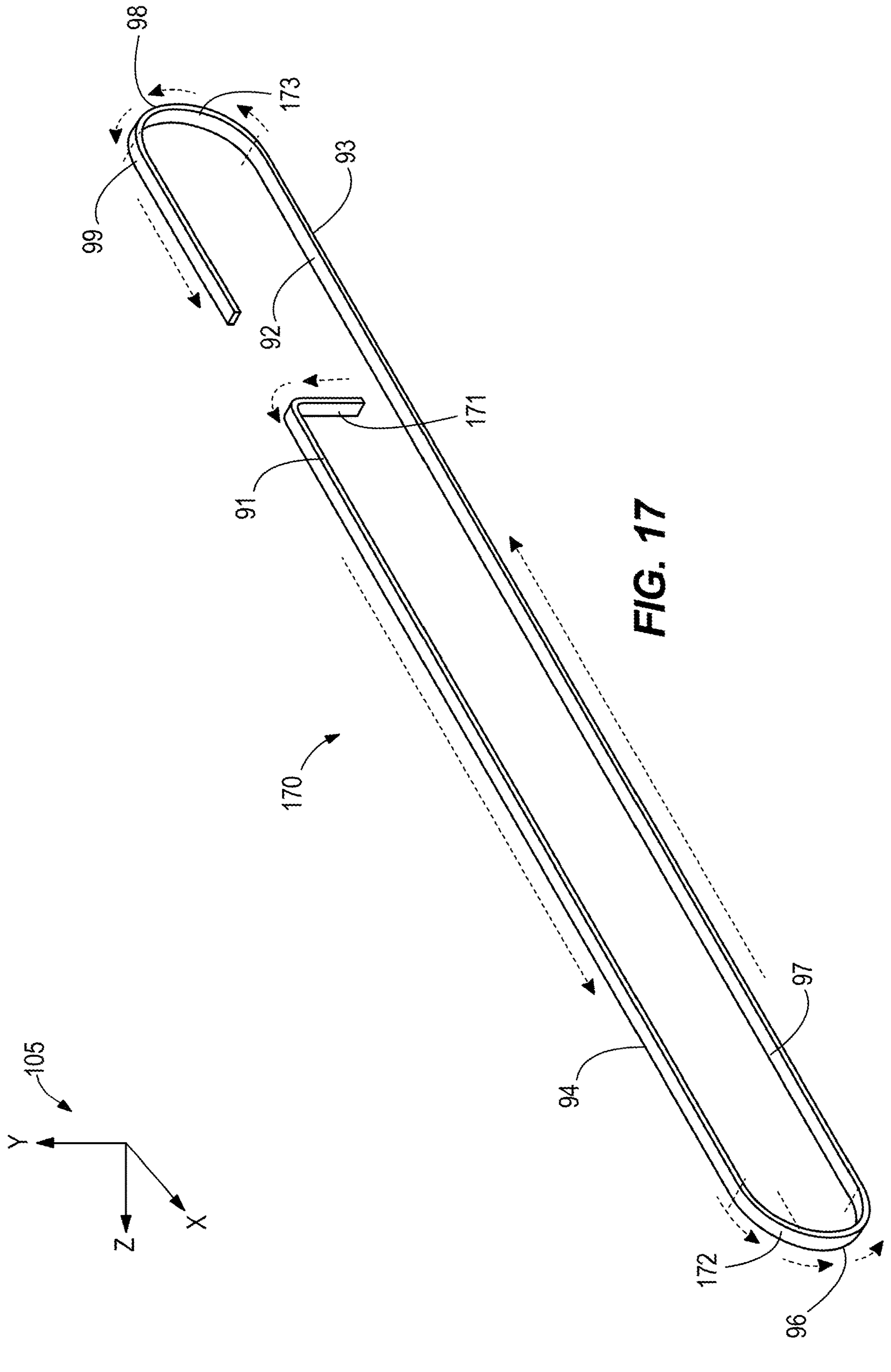
FIG. 17 illustrates a first step in manufacturing an ƐS -Then-Step-Zig-Zag coil.

Another method of manufacturing described herein provides for an "ƐS-Then-Step-Zig-Zag" coil. For example, FIG. 17 illustrates an example conductor 170. In the example of FIG. 17, the conductor 170 is a terrace conductor. Looping of the coil 170 begins with a bend 171 bending the beginning of the conductor 170 towards the center of the loop. In some instances, the bend 171 may bend away from the center of the loop. A first straight portion 94 of the conductor 170 is wound in a straight line to a first looping pin 172. The first straight portion 94 substantially extends along a first axis 95 (see FIG. 18B). A first loop portion 96 of the conductor 170 is then wound around first looping pin 172 to form a half circle. A second straight portion 97 of the conductor 170 is wound towards a second looping pin 173 on the opposite side of the loop from the first looping pin 172. A second loop portion 98 of the conductor 170 is then wound around the second looping pin 173 to form a half circle. A third straight portion 99 of the conductor 170 is then wound back towards the start of the loop at the bend 171, forming the first turn of a coil. In instances where the conductor 170 is a parallel conductor coil (not shown), two conductors are side-by-side in width and looped together. Subsequent turns are wound on top of the previous turns.

Figure 18A:
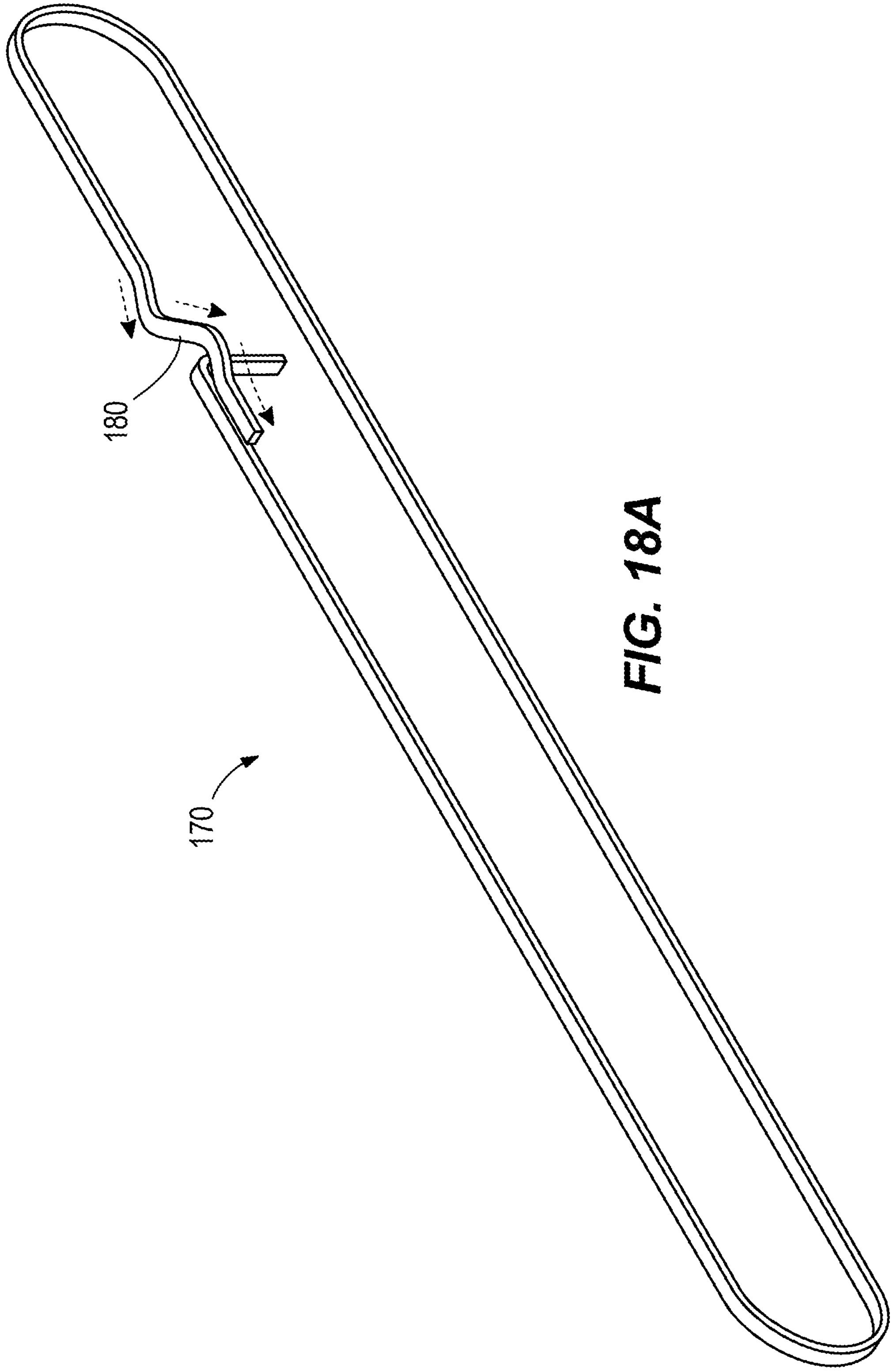
FIGS. 18A-18D illustrate a second step in manufacturing an ƐS -Then-Step-Zig-Zag coil.
Figure 18B:
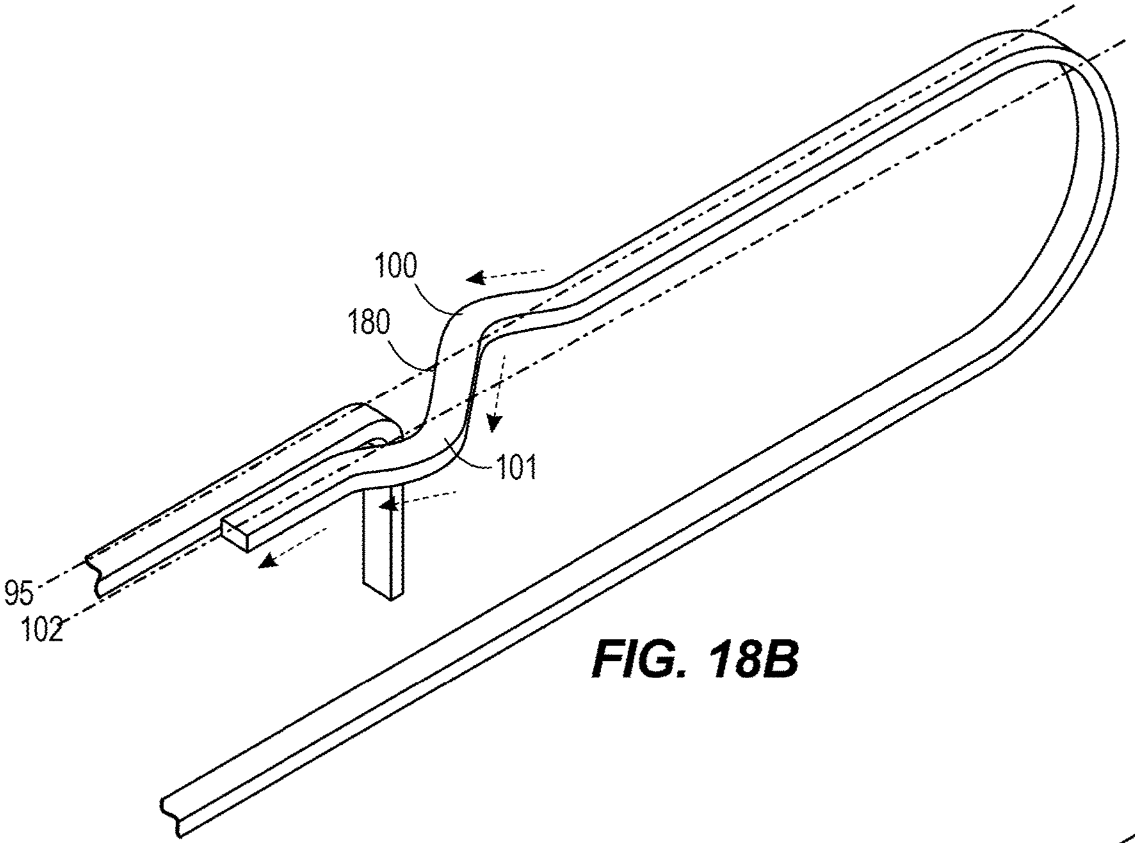
Figure 18C:
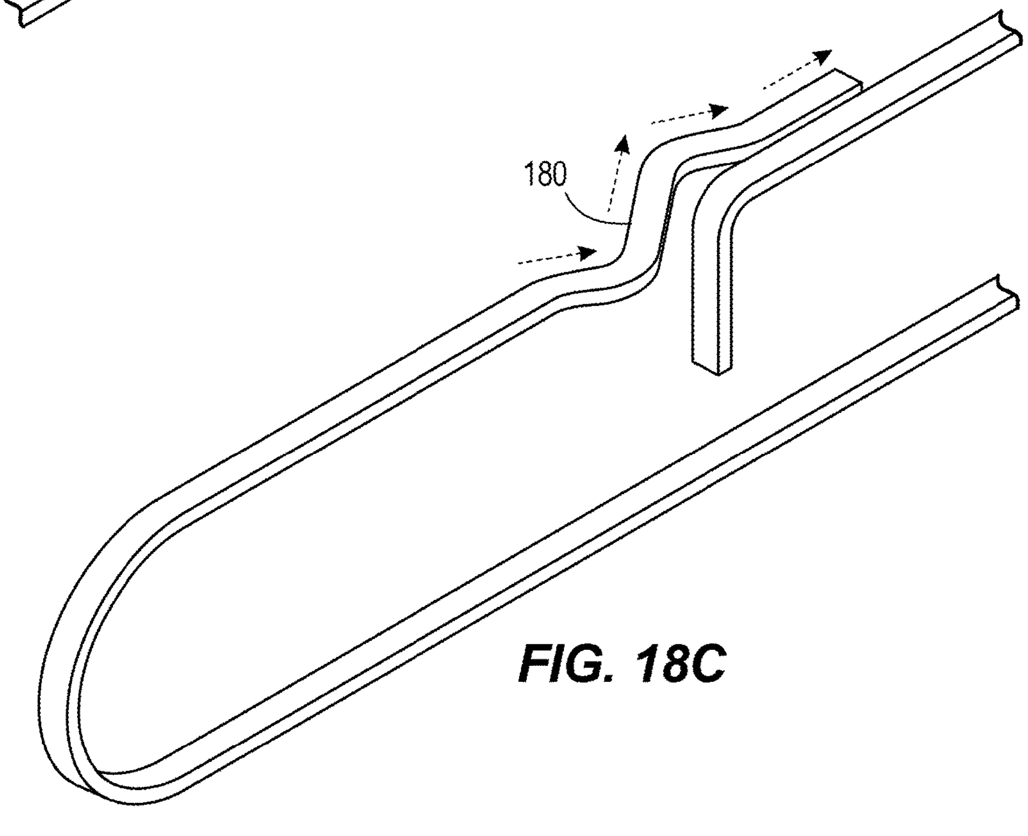
Figure 18D:
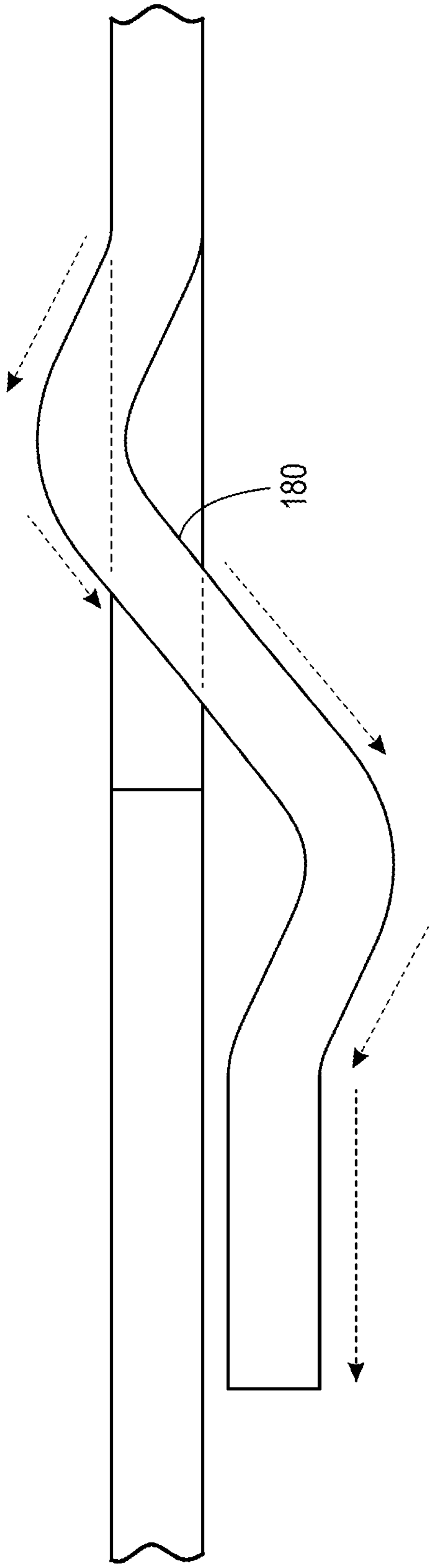

FIG. 18A illustrates the conductor 170 following the bending illustrated in FIG. 17. In FIG. 18A, the conductor 170 is bent (at bend 180) on the conductor edge 91 in an "S" shape, consisting of: (a) to the side (approximately 45°) away from the center of the two sections of the coil; (b) back across the first section (approximately 180°) straight; (c) extending past the second section of the coil; (d) back to the second section of the coil (approximately 45°); and (e) back in parallel with the second section of the coil. A first bend portion 100 of the conductor extends at least partially along the first axis 95 and a second bend portion 101 of the conductor extends at least partially along a second axis 102. This back-and-forth bend may henceforth be referred to as an "ƐS " portion 180. The ƐS portion 180 may be insulated with additional insulation to prevent turn-to-turn shorts. FIG. 18B illustrates the ƐS portion 180 magnified for clarity. FIG. 18C illustrates the ƐS portion 180 from a reverse angle. FIG. 18D illustrates a top view of the ƐS portion 180. In some implementations, manufacturing of the ƐS -Then-Step-Zig-Zag" coil may omit this first ƐS portion 180.

Figure 19:
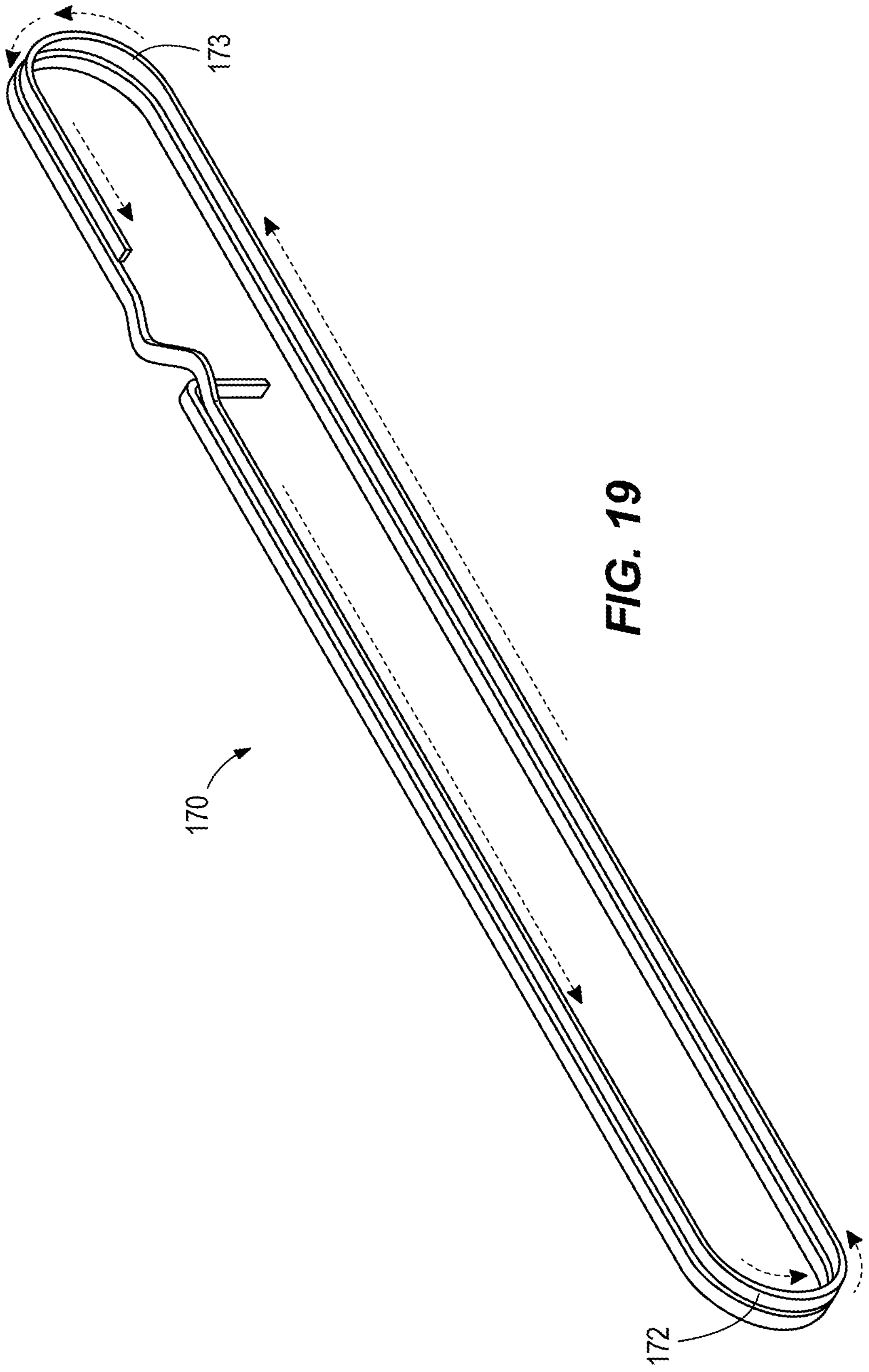
FIG. 19 illustrates a third step in manufacturing an ƐS -Then-Step-Zig-Zag coil.

FIG. 19 illustrates the conductor 170 following the bending illustrated in FIGS. 18A-18D. In FIG. 19, the looping of the conductor 170 continues to the first looping pin 172. The conductor 170 is then wound around first looping pin 172 to form a half circle, and continues to the second looping pin 173 on the opposite side of the loop from the first looping pin 172. The conductor 170 is then bent back towards the start of the loop, forming the second turn of the coil.

Figure 20A:
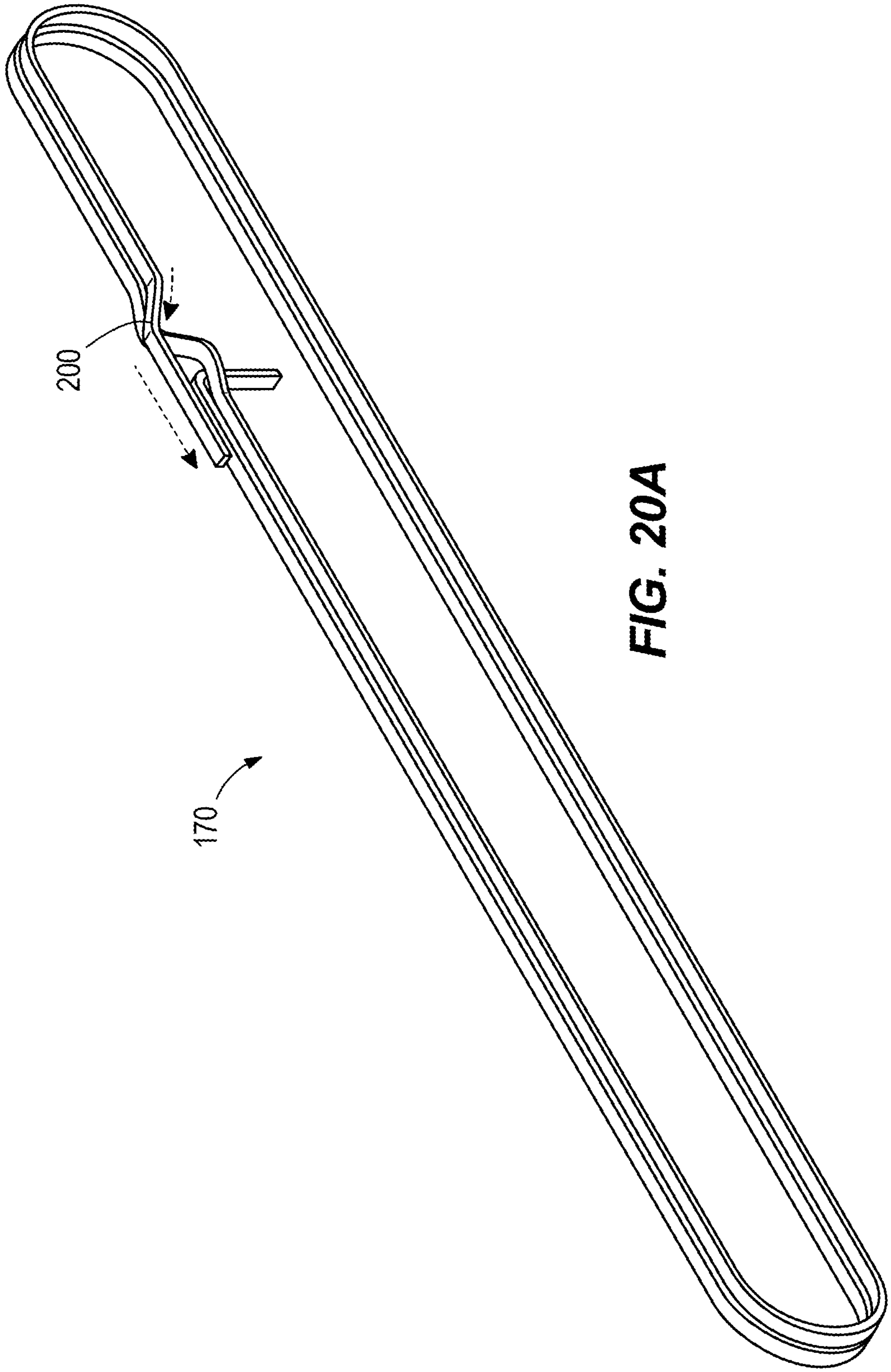
FIGS. 20A-20D illustrate a fourth step in manufacturing an ƐS -Then-Step-Zig-Zag coil.
Figure 20B:
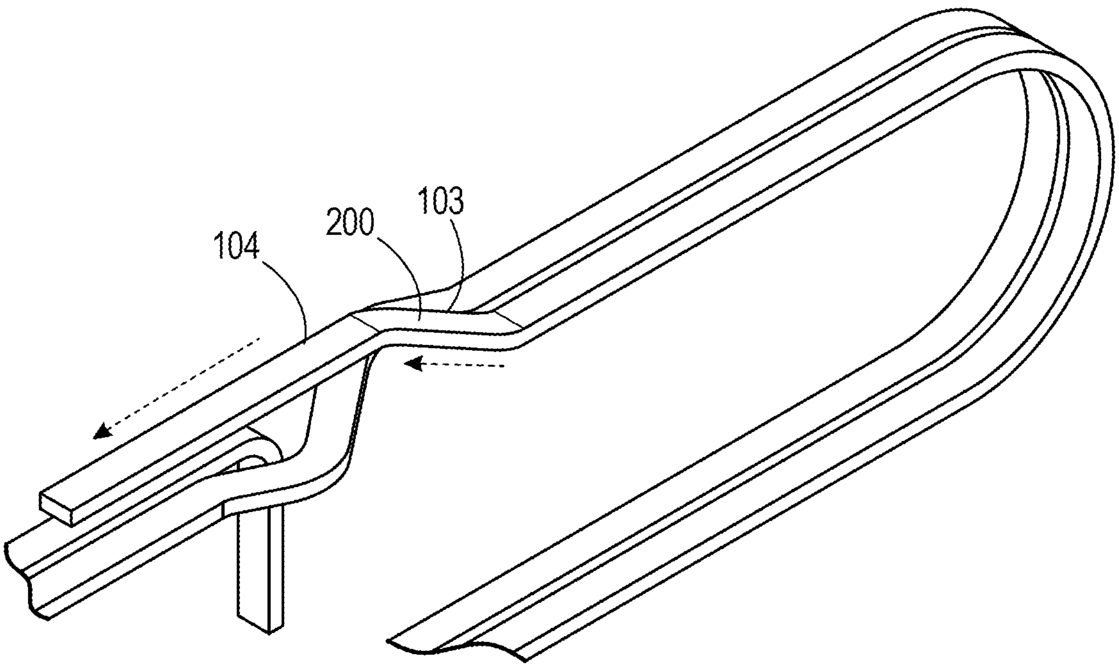
Figure 20C:
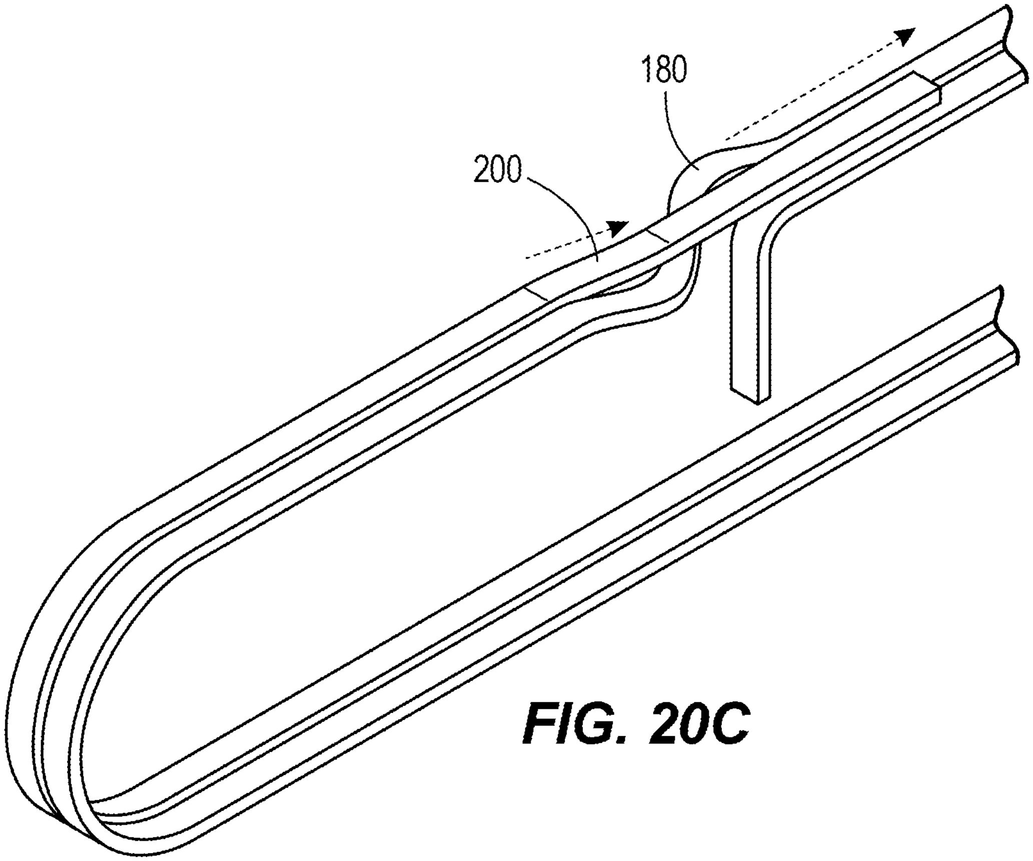
Figure 20D:
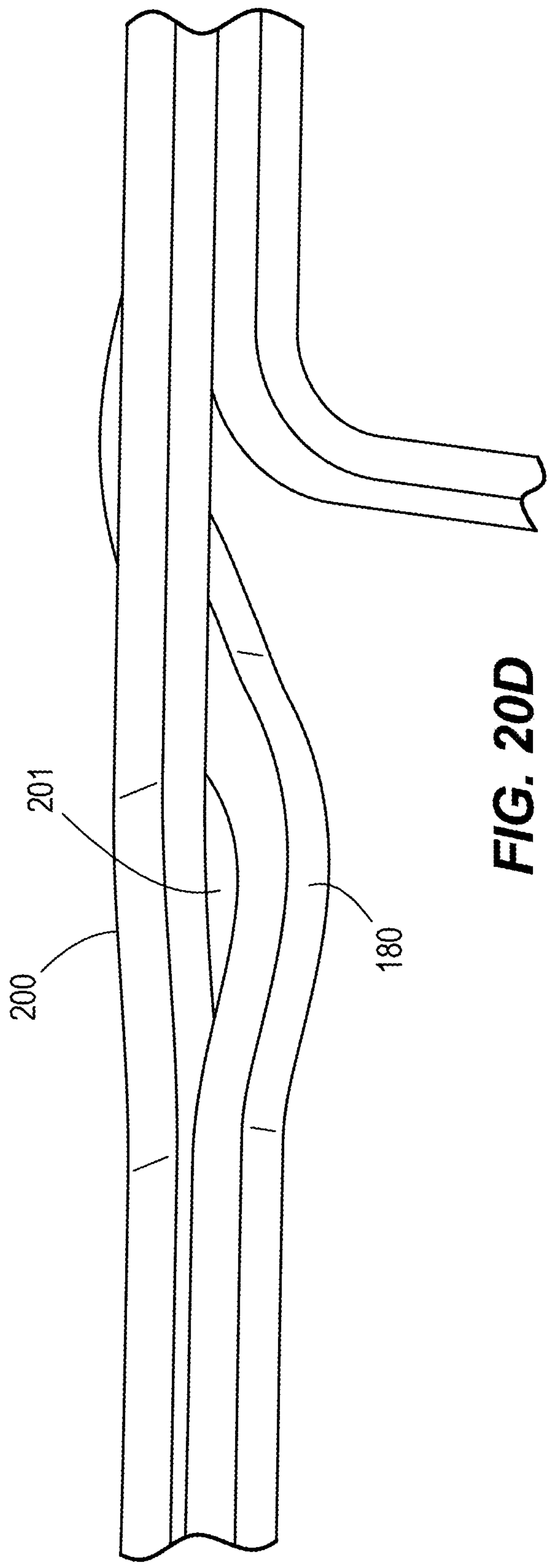

FIG. 20A illustrates the conductor 170 following the bending illustrated in FIG. 19. In FIG. 20A, a third bend portion 103 of the conductor 170 is bent upwards (at bend 200) along the y-axis 105 as well as on the conductor edge 91 to the side (approximately 45° to the first axis 95) and a fourth bend portion 104 of the conductor 170 is bent back straight again along the second axis 102 and back down along the y-axis 105 to be on top of the first section. When the loop is on top 92 of the previous turn, the bottom 93 of the conductor 170 is in contact with the top 92 of the conductor 170 of the previous turn. The third bend portion 103 extends at least partially along the first axis 95 and the fourth bend portion 104 extends substantially along the second axis 102. In some instances, the third bend portion 103 may extend substantially along the second axis 102 and the fourth bend portion 104 may extend substantially along the first axis 95. This back-and-forth bend 200 may henceforth be referred to as a "Step-Zig-Zag" portion 200. The "Step-Zig-Zag" portion 200 of the conductor 170 is insulated with additional insulation to prevent turn-to-turn shorts. FIG. 20B illustrates the Step-Zig-Zag portion 200 magnified for clarity. FIG. 20C illustrates the Step-Zig-Zag portion 200 from a reverse angle. FIG. 20D provides a top view of the Step-Zig-Zag portion 200 and the ƐS portion 180. The Step-Zig-Zag portion 200 together with the ƐS portion 180 create a spacing 201 between the different turns of the conductor 170 (shown in FIG. 20D). In some instances, the turns of the conductor 170 are laid directly next to and on top of each other.

Figure 21:
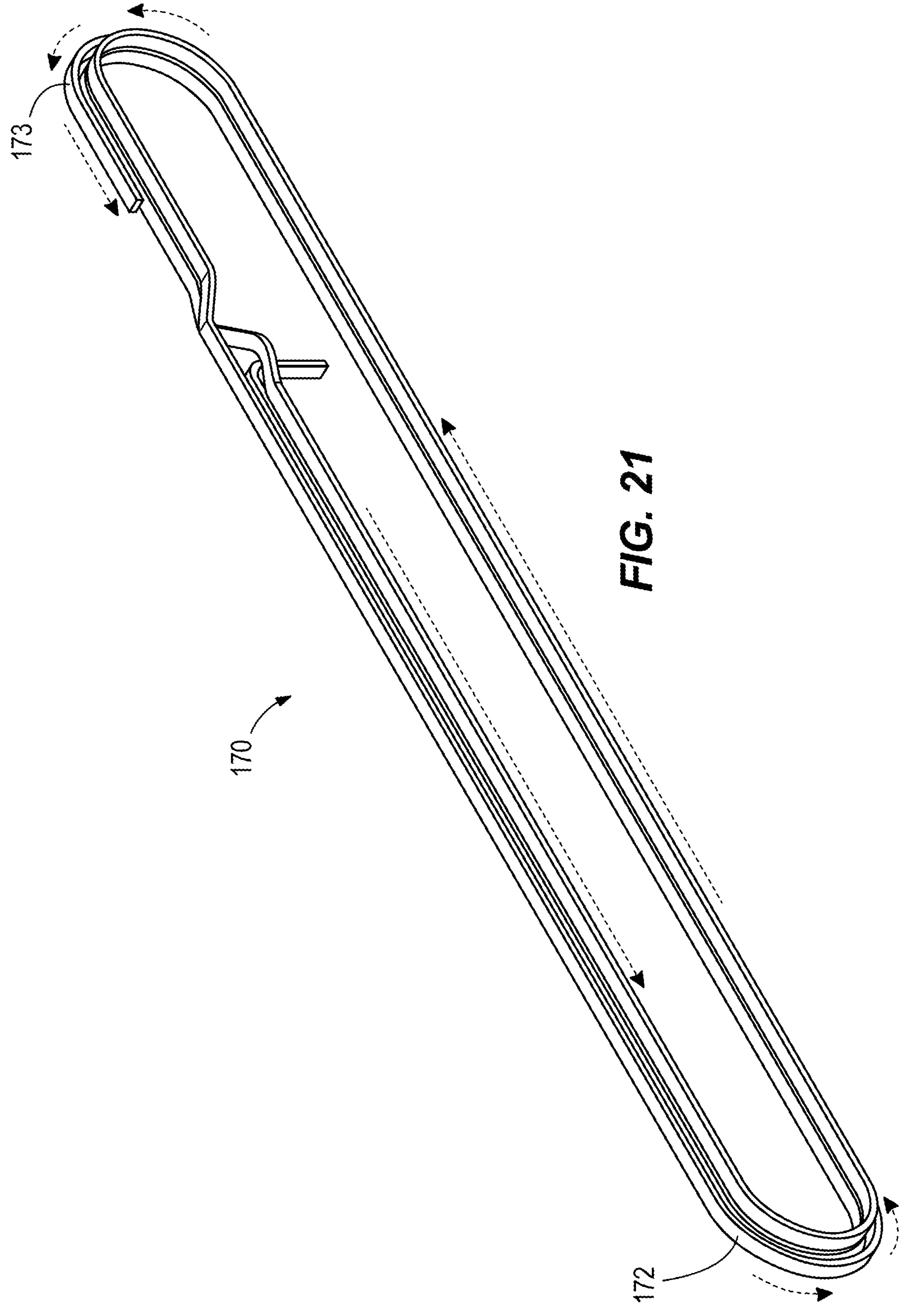
FIG. 21 illustrates a fifth step in manufacturing an ƐS -Then-Step-Zig-Zag coil.

FIG. 21 illustrates the conductor 170 following the bending illustrated in FIGS. 20A-20D. In FIG. 21, the looping of the conductor 170 continues to the first looping pin 172. The conductor 170 is then wound around first looping pin 172 to form a half circle, and continues to the second looping pin 173 on the opposite side of the loop from the first looping pin 172. The conductor 170 is then bent back towards the start of the loop, forming the third turn of the coil.

Figure 22A:
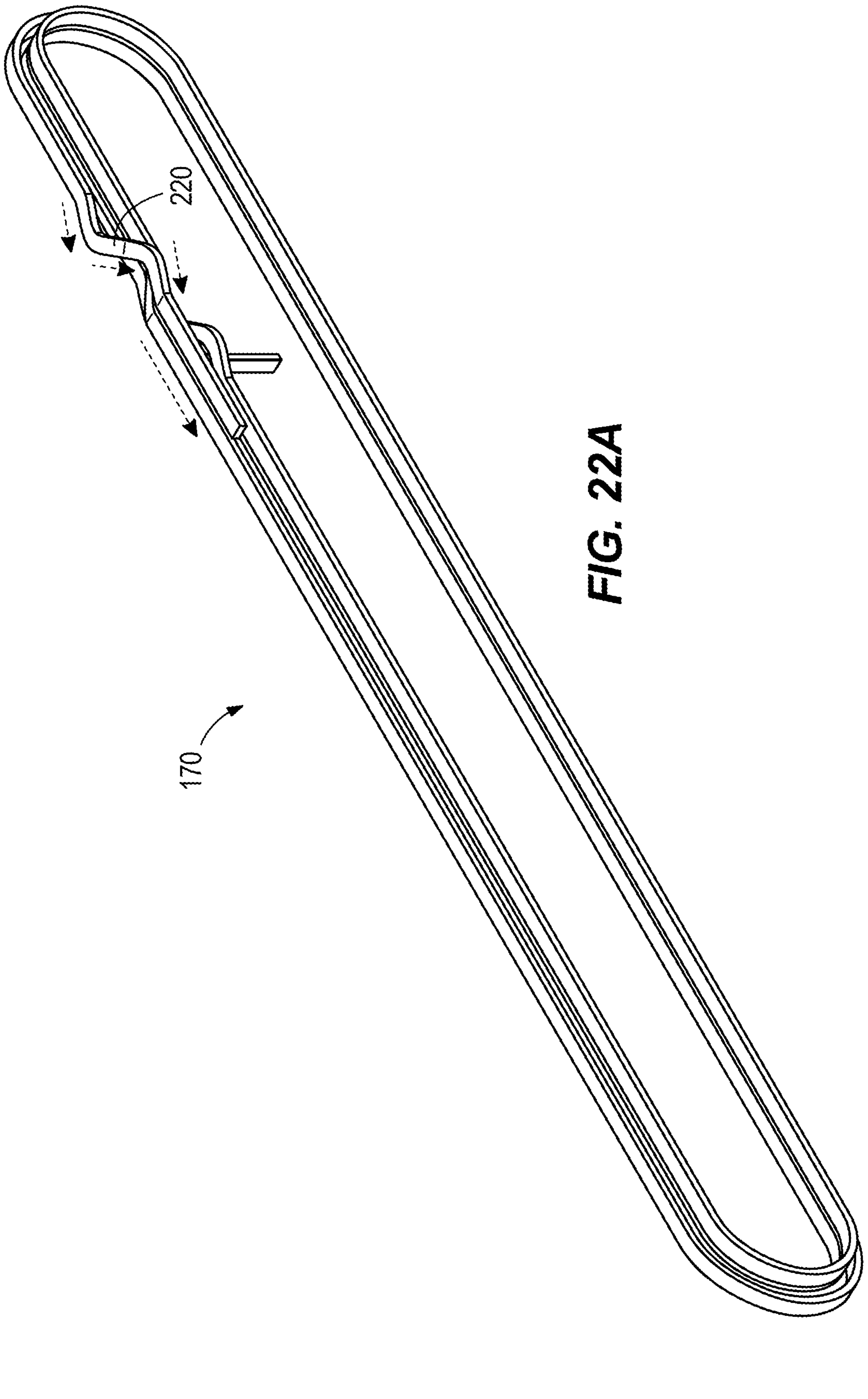
FIGS. 22A-22D illustrate a sixth step in manufacturing an ƐS -Then-Step-Zig-Zag coil.
Figure 22B:
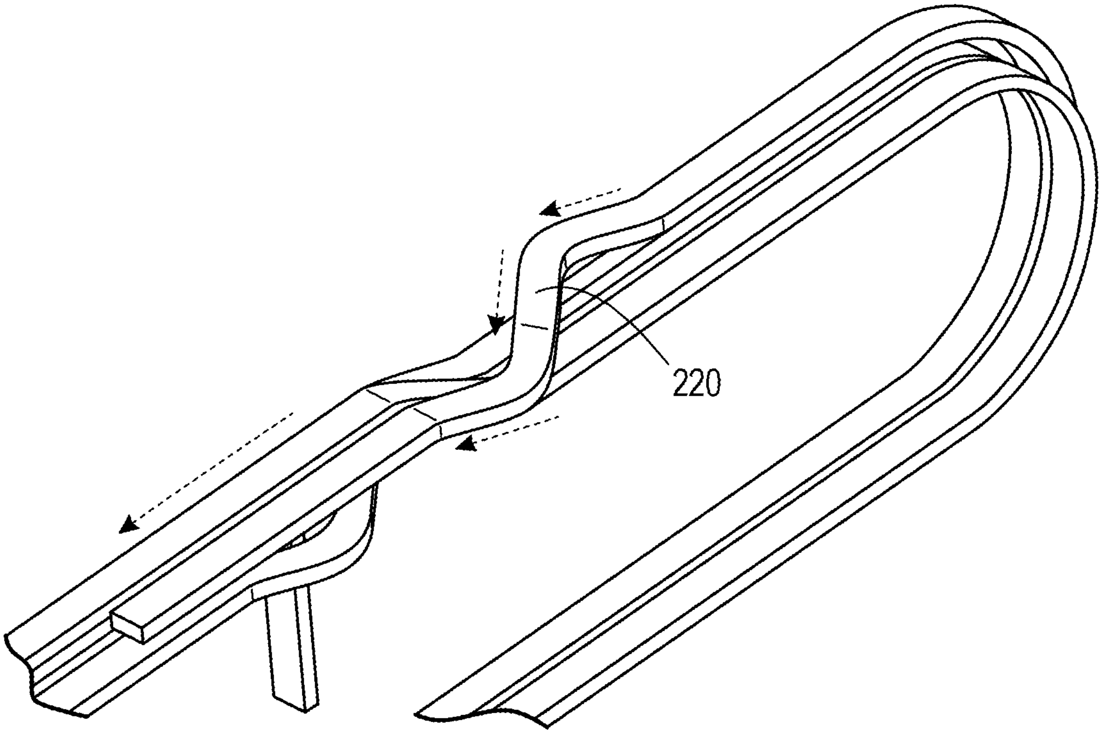
Figure 22C:
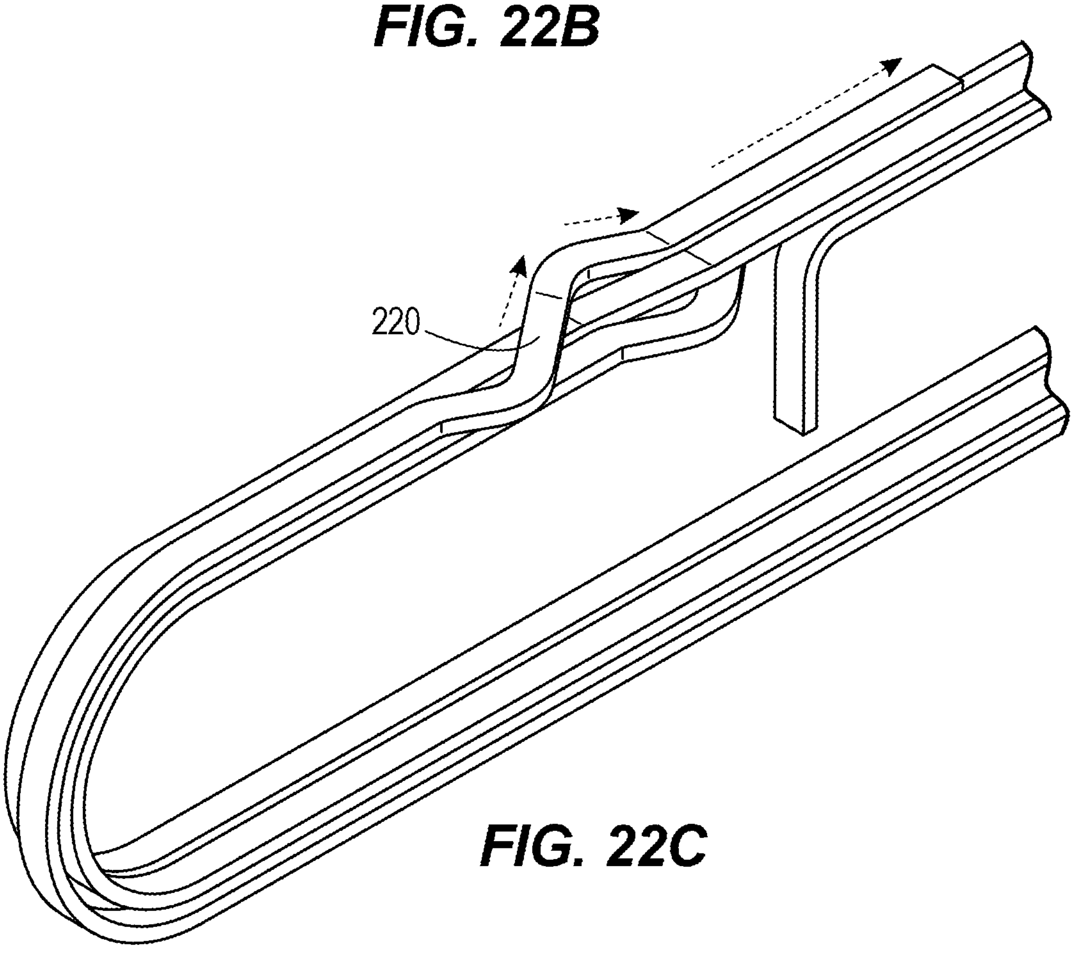
Figure 22D:
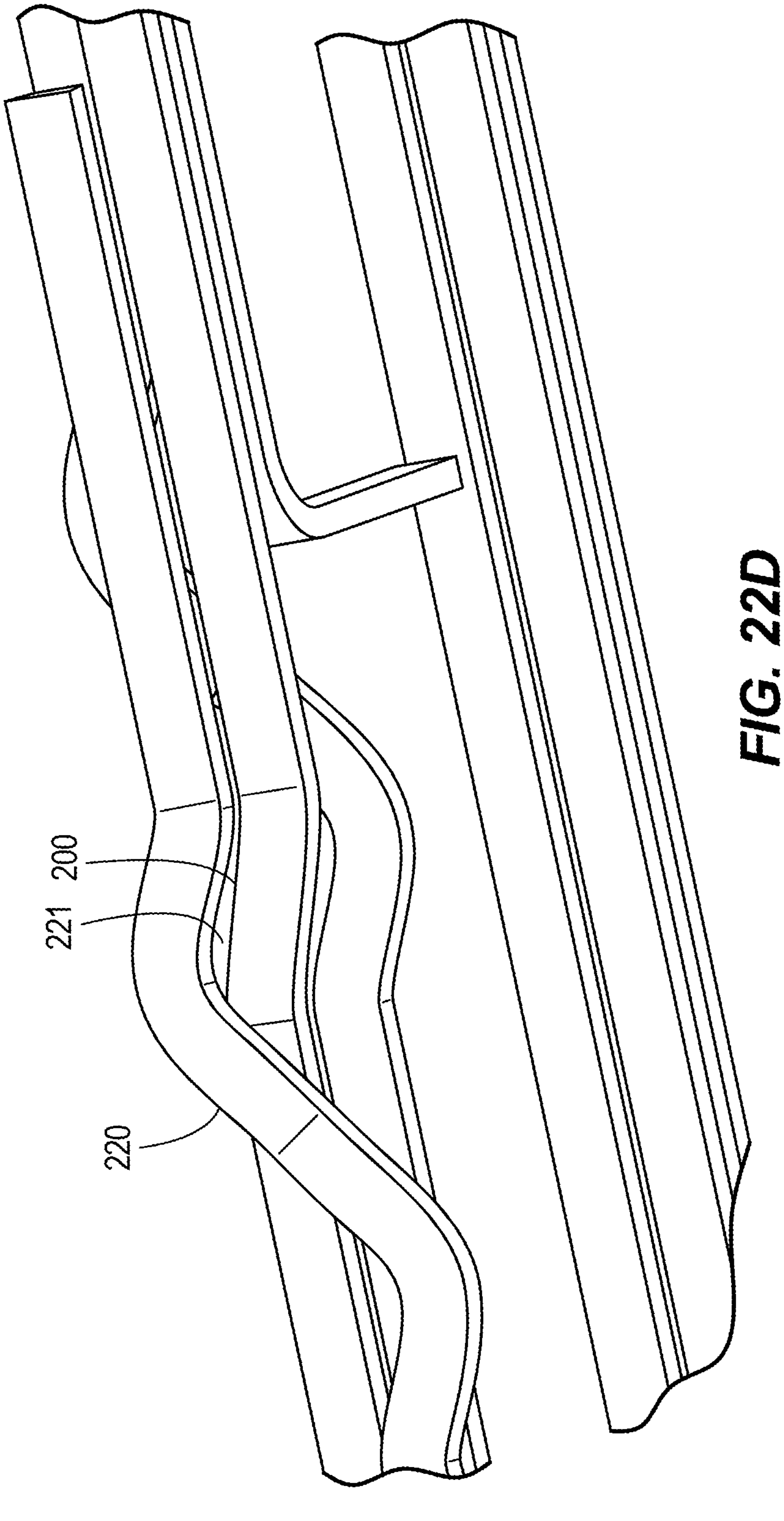

FIG. 22A illustrates the conductor 170 following the bending illustrated in FIG. 21. In FIG. 22A, the conductor 170 is bent (at bend 220) on edge in an "S" shape, consisting of: (a) to the side (approximately 45°) away from the center of the two sections of the coil; (b) back across the first section (approximately 180°) straight; (c) extending past the second section of the coil; (d) back to the second section of the coil (approximately 45°); and (e) back in parallel with the second section of the coil. These back-and-forth bends 220 may be referred to as an ƐS portion 220. The ƐS portion 220 may be insulated with additional insulation to prevent turn-to-turn shorts. FIG. 22B illustrates the ƐS portion 220 magnified for clarity. FIG. 22C illustrates the ƐS portion 220 from a reverse angle. FIG. 22D illustrates a top view of the ƐS portion 220 and the Step-Zig-Zag portion 200. The ƐS portion 220 together with the Step-Zig-Zag portion 200 create a spacing 221 between the different turns of the conductor 170 (shown in FIG. 22D).

Figure 23:
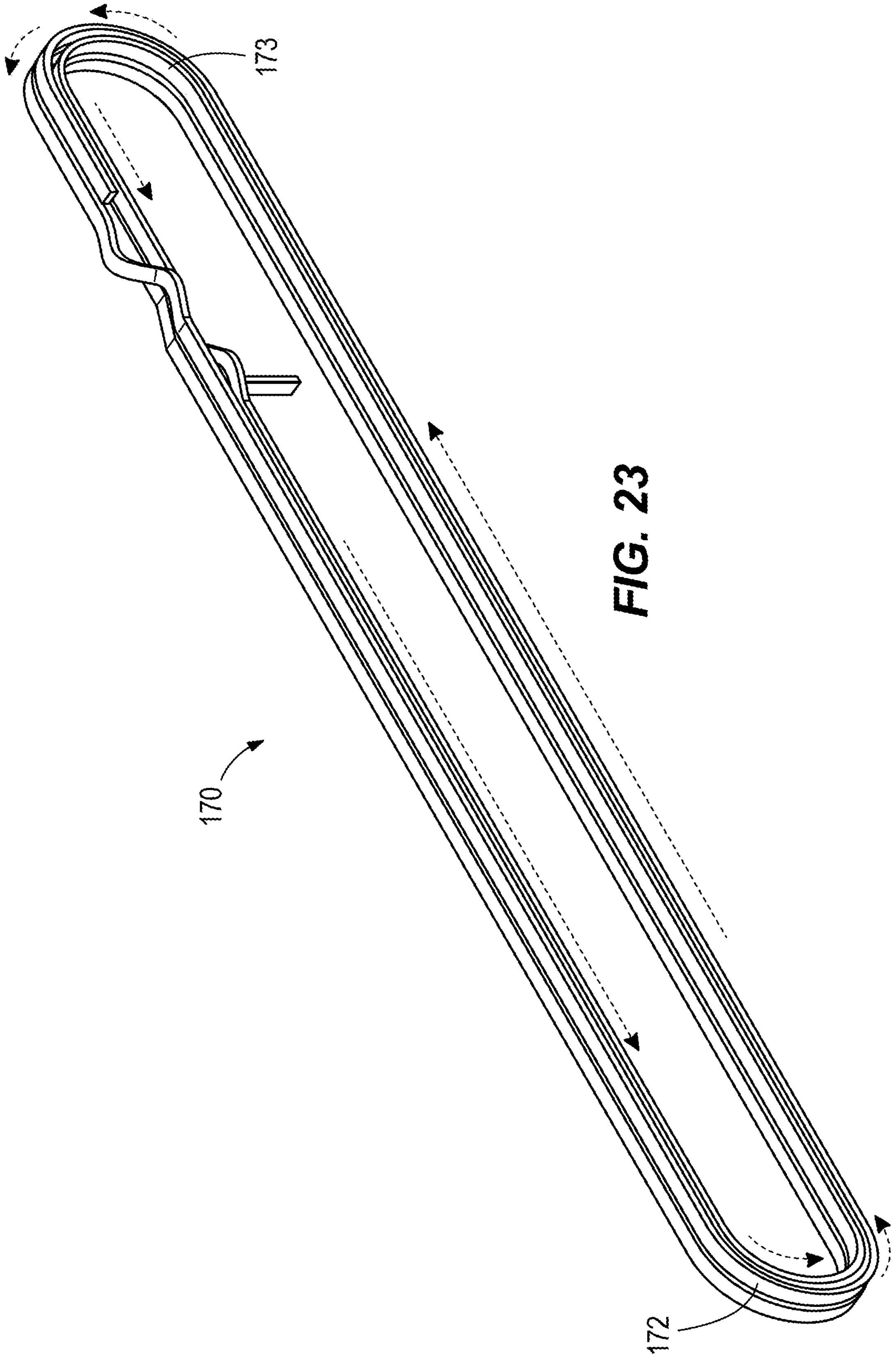
FIG. 23 illustrates a seventh step in manufacturing an ƐS -Then-Step-Zig-Zag coil.

FIG. 23 illustrates the conductor 170 following the bending illustrated in FIGS. 22A-22D. In FIG. 23, the looping of the conductor 170 continues to the first looping pin 172. The conductor 170 is then wound around first looping pin 172 to form a half circle, and continues to the second looping pin 173 on the opposite side of the loop from the first looping pin 172. The conductor 170 is then bent back towards the start of the loop, forming the fourth turn of the coil.

Figure 24A:
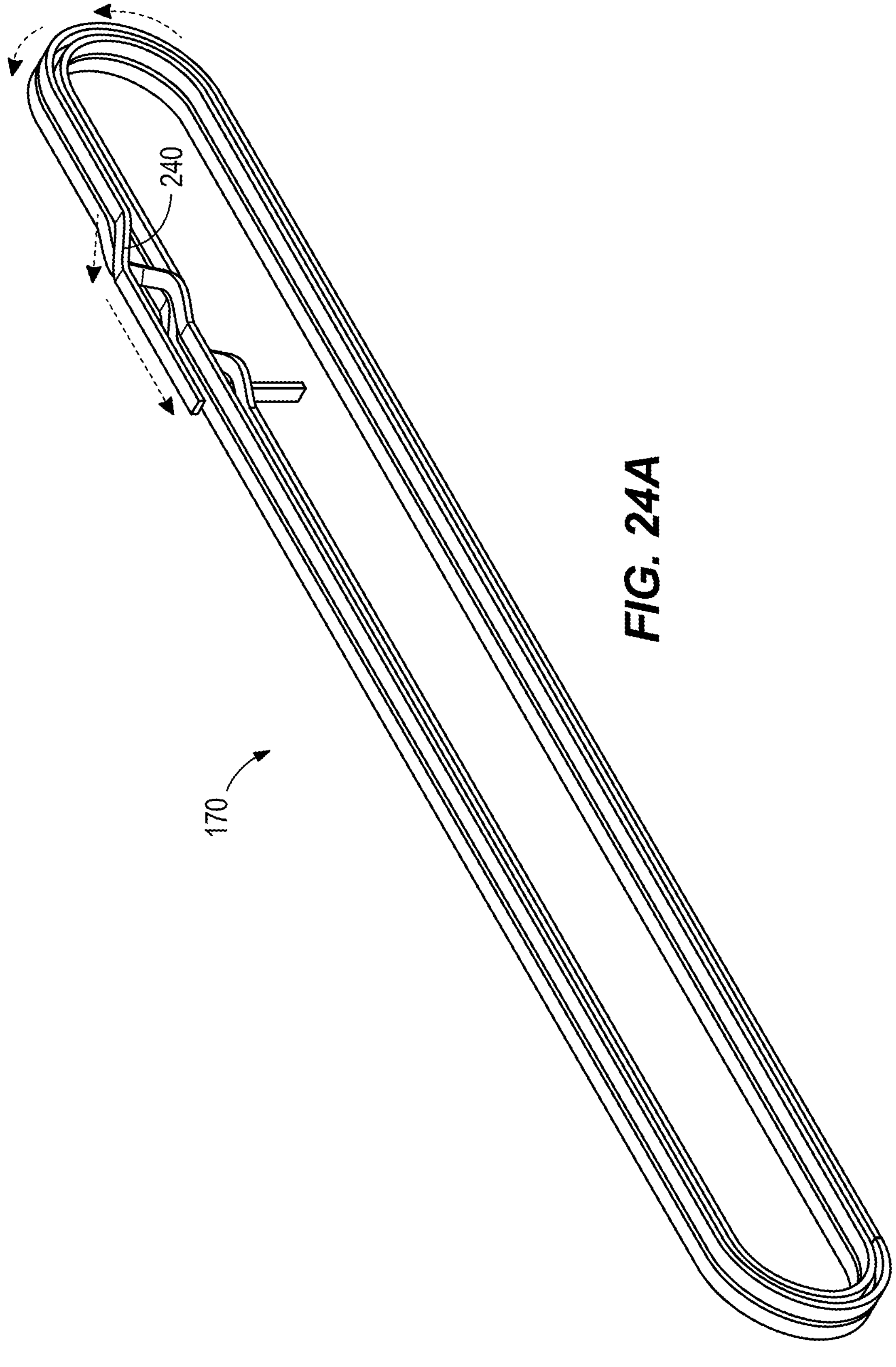
FIGS. 24A-24C illustrate an eighth step in manufacturing an ƐS -Then-Step-Zig-Zag coil.
Figure 24B:
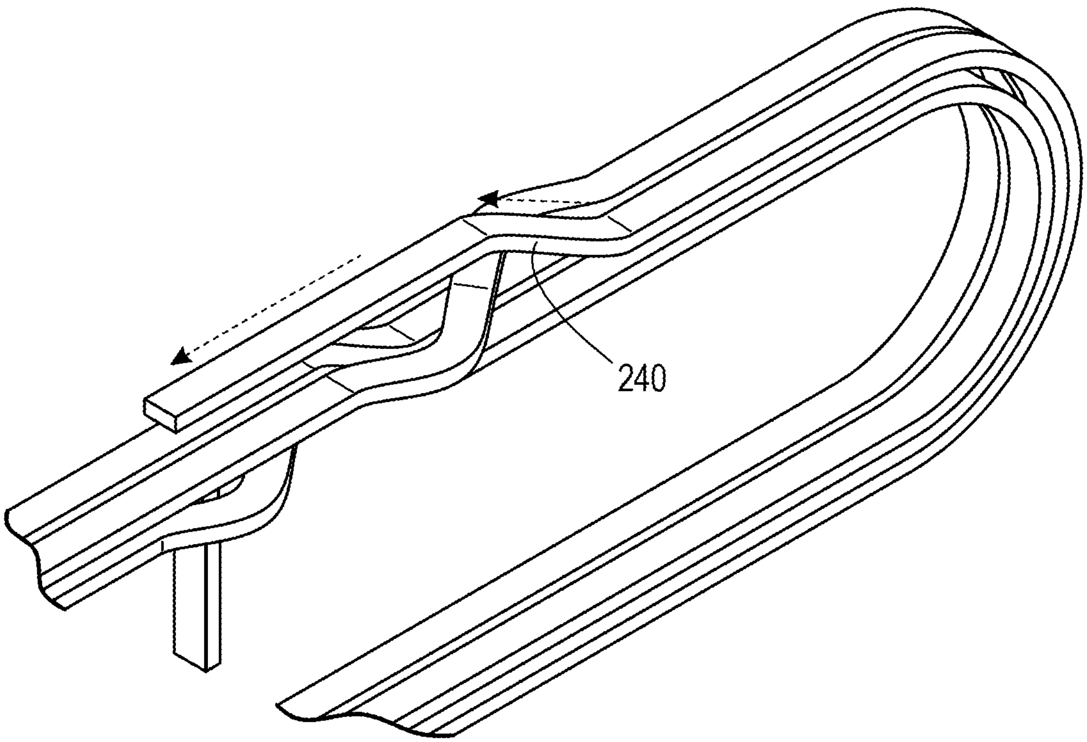
Figure 24C:
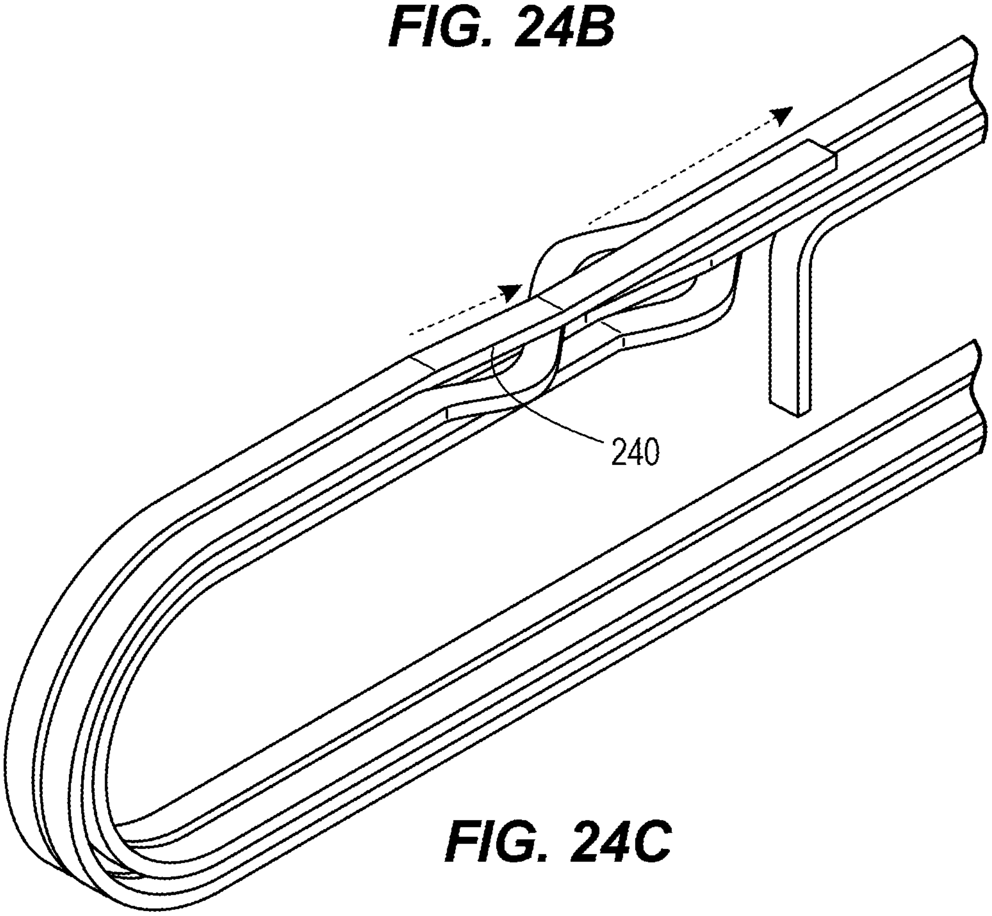

FIG. 24A illustrates the conductor 170 following the bending illustrated in FIG. 23. In FIG. 24A, the conductor 170 is bent (at bend 240) upwards as well as on edge to the side (approximately 45°) and then back straight again and back down to be on top of the first section. This back-and-forth bend 240 may be referred to as a Step-Zig-Zag portion 240. The Step-Zig-Zag portion 240 of the conductor 170 is insulated with additional insulation to prevent turn-to-turn shorts. FIG. 24B illustrates the Step-Zig-Zag portion 240 magnified for clarity. FIG. 24C illustrates the Step-Zig-Zag portion 240 from a reverse angle.

Figure 25:
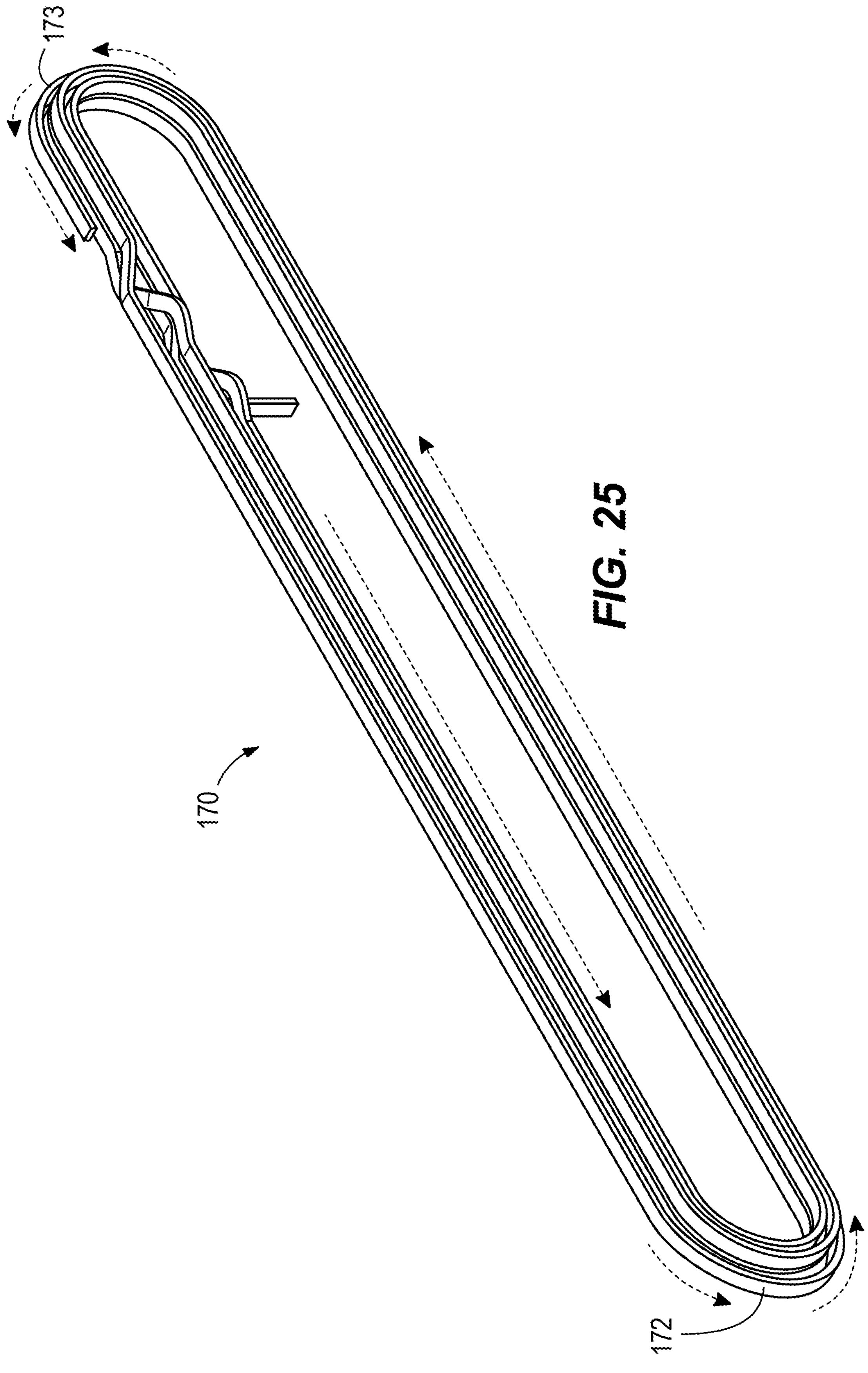
FIG. 25 illustrates a ninth step in manufacturing an ƐS -Then-Step-Zig-Zag coil.

FIG. 25 illustrates the conductor 170 following the bending illustrated in FIGS. 24A-24C. In FIG. 24, the looping of the conductor 170 continues to the first looping pin 172. The conductor 170 is then wound around first looping pin 172 to form a half circle, and continues to the second looping pin 173 on the opposite side of the loop from the first looping pin 172. The conductor 170 is then bent back towards the start of the loop, forming the fifth turn of the coil.

Figure 26A:
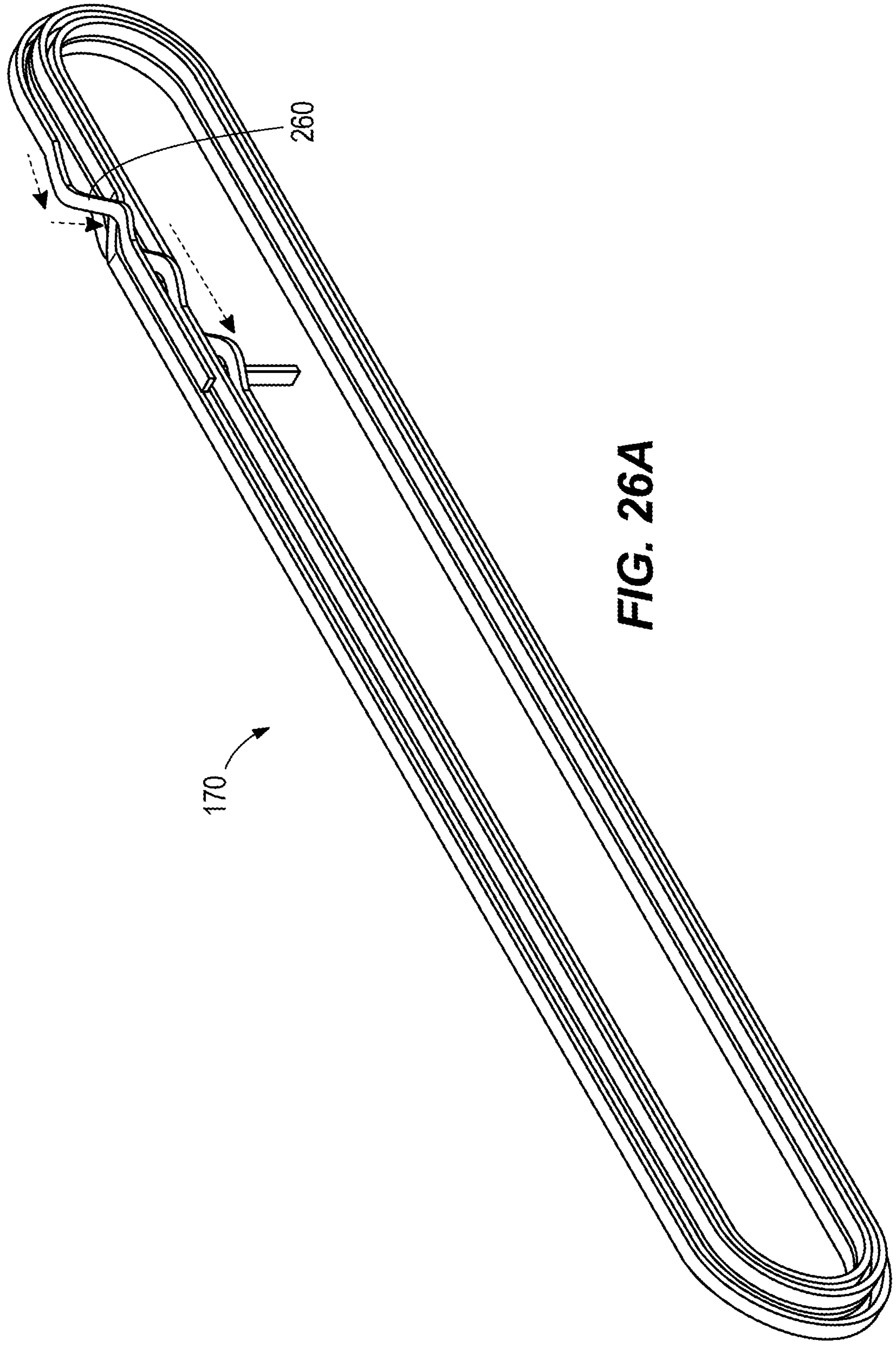
FIGS. 26A-26D illustrate a tenth step in manufacturing an ƐS -Then-Step-Zig-Zag coil.
Figure 26B:
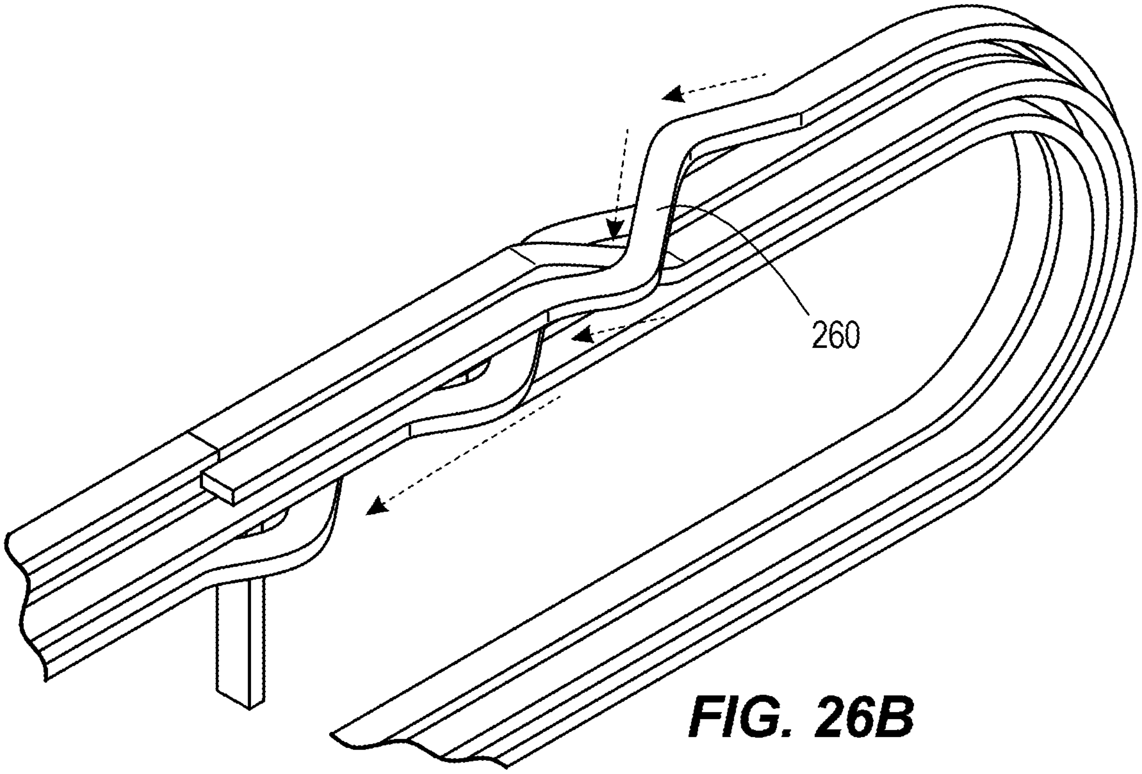
Figure 26C:
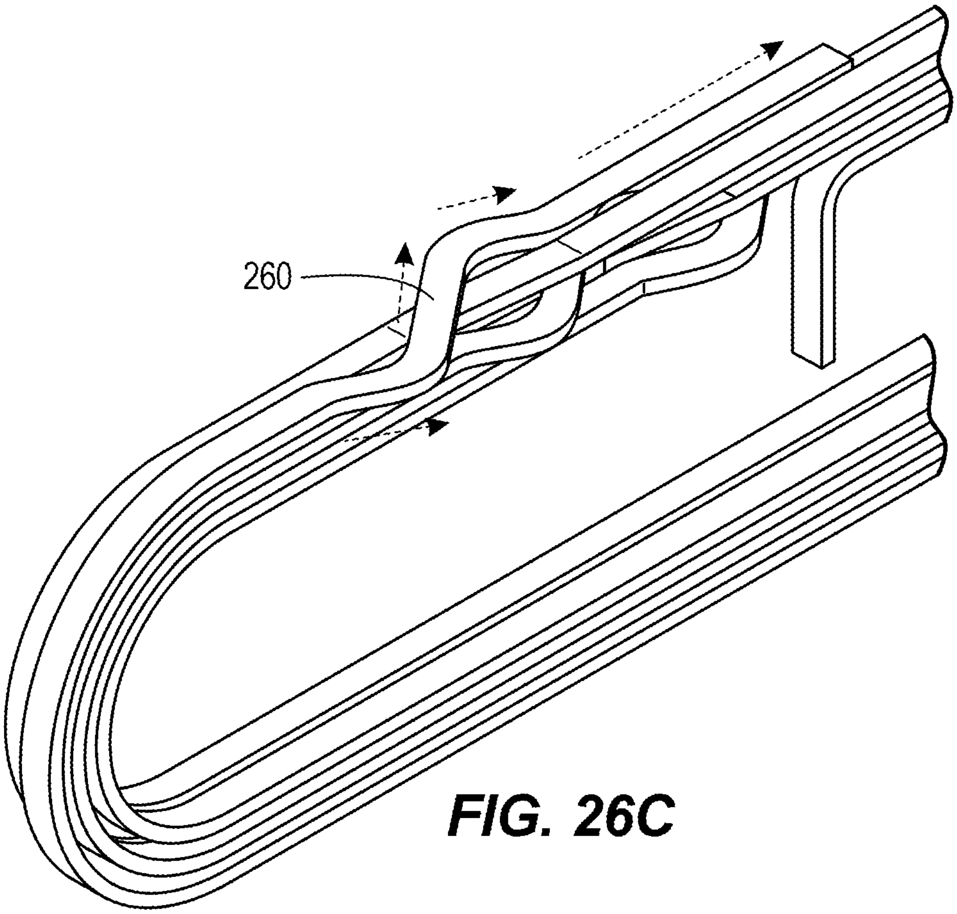
Figure 26D:
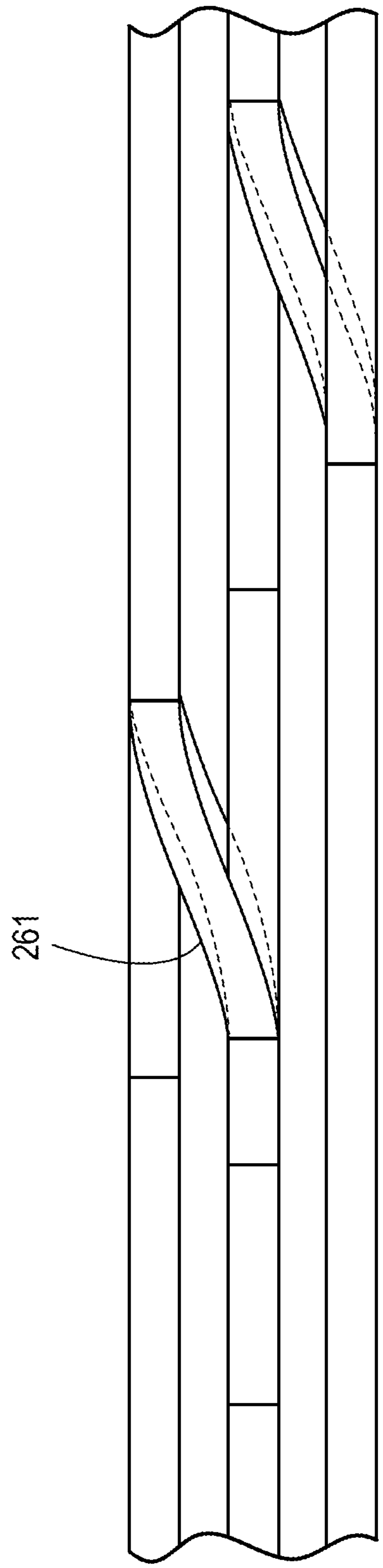

FIG. 26A illustrates the conductor 170 following the bending illustrated in FIG. 25. In FIG. 26A, the conductor 170 is bent (at bend 260) on edge in an "S" shape, consisting of: (a) to the side (approximately 45°) away from the center of the two sections of the coil; (b) back across the first section (approximately 180°) straight; (c) extending past the second section of the coil; (d) back to the second section of the coil (approximately 45°); and (e) back in parallel with the second section of the coil. These back-and-forth bends 260 may be referred to as an ƐS portion 260. The ƐS portion 260 may be insulated with additional insulation to prevent turn-to-turn shorts. FIG. 26B illustrates the ƐS portion 260 magnified for clarity. FIG. 26C illustrates the ƐS portion 260 from a reverse angle. FIG. 62D illustrates a perspective view of the ƐS portion 220 and the Step-Zig-Zag portion 200. The ƐS portion 260 together with the Step-Zig-Zag portion 240 create a spacing 261 between the different turns of the conductor 170 (shown in FIG. 26D).

Figure 27:
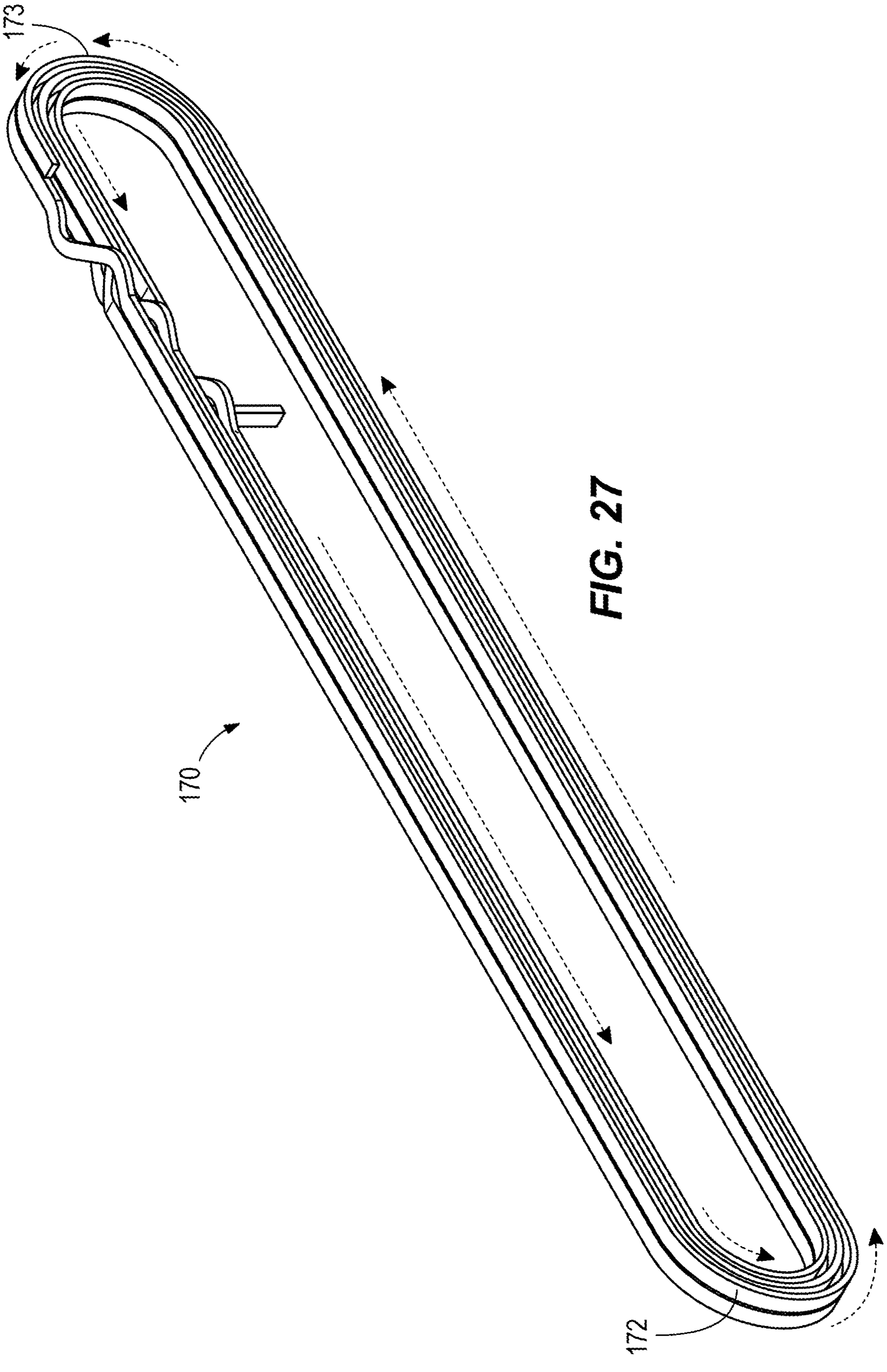
FIG. 27 illustrates an eleventh step in manufacturing an ƐS -Then-Step-Zig-Zag coil.

FIG. 27 illustrates the conductor 170 following the bending illustrated in FIGS. 26A-26D. In FIG. 27, the looping of the conductor 170 continues to the first looping pin 172. The conductor 170 is then wound around first looping pin 172 to form a half circle, and continues to the second looping pin 173 on the opposite side of the loop from the first looping pin 172. The conductor 170 is then bent back towards the start of the loop, forming the sixth turn of the coil.

Figure 28A:
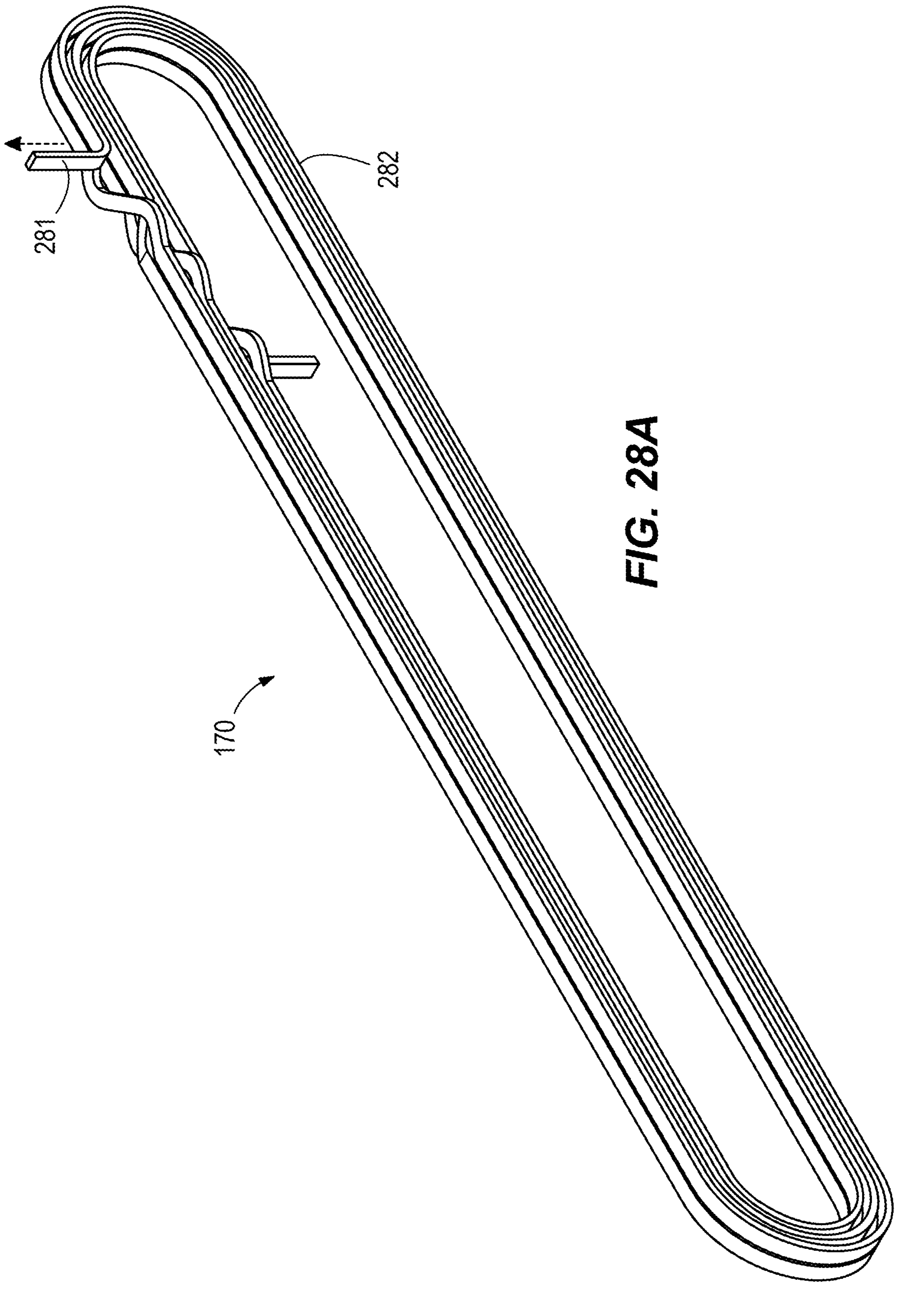
FIG. 28A illustrates a manufactured ƐS -Then-Step-Zig-Zag coil.
Figure 28B:
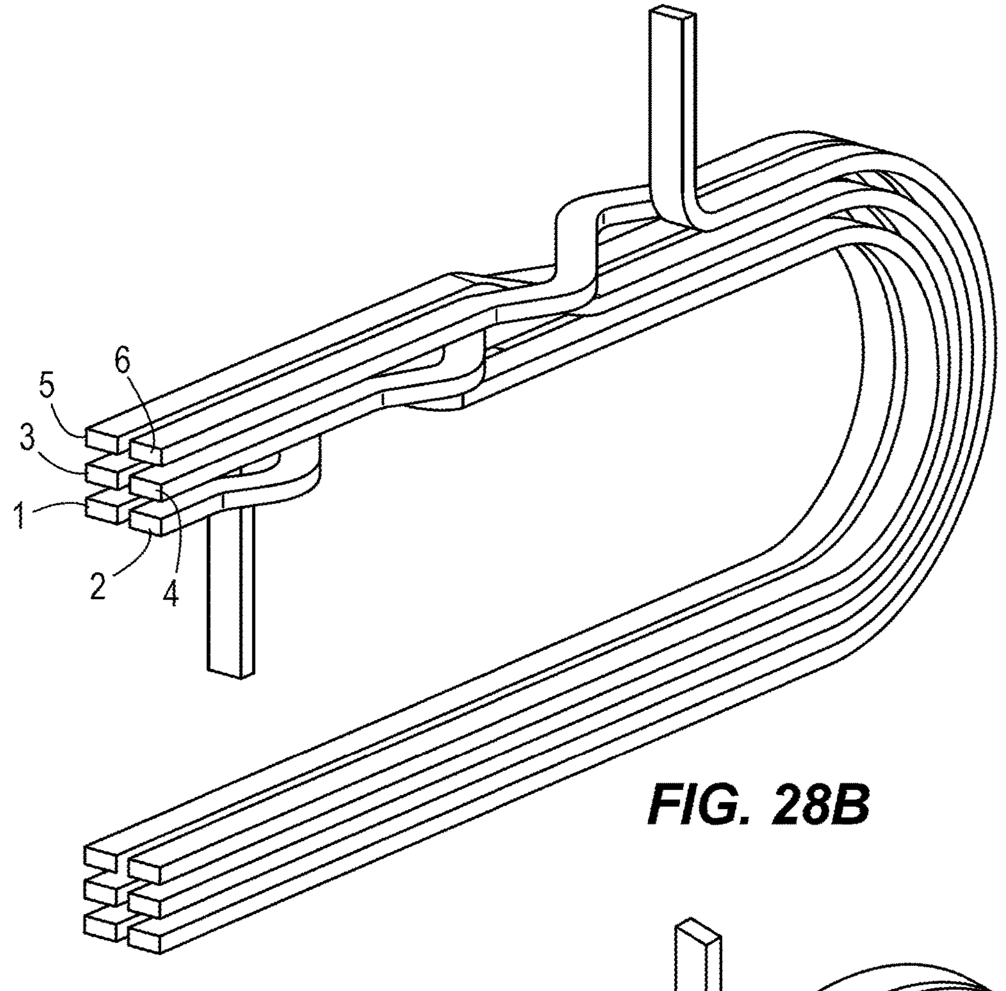
FIG. 28B illustrates a cross-sectional view of the manufactured ƐS -Then-Step-Zig-Zag coil of FIG. 28A.

FIG. 28A illustrates the conductor 170 following the bending illustrated in FIG. 27. In FIG. 28A, the end of the looping is bent away from the loop at bend 281. Alternatively, in some embodiments, the end of the coil is bent away from the loop at bend 282. The start and finish of the coils may then be bent and shaped into suitable positions for the plurality of slots 11. FIG. 28B illustrates a cross-section of the conductor 170 of FIG. 28A. Accordingly, FIGS. 28A-28B illustrates a six turn, ƐS -Then-Step-Zig-Zag series coil.

For the example six turn, ƐS -Then-Step-Zig-Zag series coil illustrated in FIGS. 28A-28B, the Simple Volt Per Turn in each coil is provided using Equation 4:

$$v_t = \frac{V_c}{t} \quad \text{[Equation 4]}$$

Where:

$V_c$=Volts per coil;

t=Number of turns in the coil; and $v_t$=Calculated Simple Volt Per Turn (in Volts).

In a parallel conductor coil, such as that shown in FIG. 3, the Maximum Volt Per Turn is exactly equal to the calculated Simple Volt Per Turn, as shown below in Equation 5:

$$V_{tmax} = v_t = \frac{V_c}{t} \quad \text{[Equation 5]}$$

Where:

$V_c$=Volts per coil;

t=Number of turns in the coil;

$v_t$=Calculated Simple Volt Per Turn (in Volts); and $V_{tmax}$=Calculated Maximum Volt Per Turn (in Volts).

This calculated Maximum Volt Per Turn value impacts the determination of the type and thickness of turn insulation to be used in the parallel conductor coil, and may impact the overall size of the insulated coil. For series coils, however the Maximum Volt Per Turn is not necessarily equal to the Simple Volt Per Turn. For example, the Maximum Volt Per Turn for the series coil of FIG. 28A is provided by Equation 6:

$$V_{tmax.\varepsilon tszz} = 2 \cdot v_t = 2 \cdot \frac{V_c}{t} \quad \text{[Equation 6]}$$

Where:

$V_c$=Volts per coil;

t=Number of turns in the coil;

$v_t$=Calculated Simple Volt Per Turn (in Volts); and $V_{tmax.\varepsilon tszz}$=Calculated Maximum Volt Per Turn for ƐS -Then-Step-Zig-Zag coil (in Volts).

Accordingly, by comparing Equations 5 and 6, one can see that conductor insulation may be significantly thicker or of a different material for the ƐS -Then-Step-Zig-Zag coil compared to a parallel conductor coil in order to compensate for the higher Maximum Volt Per Turn, however less so than the Zig-Zag-Then-Step coil.

Figure 29:
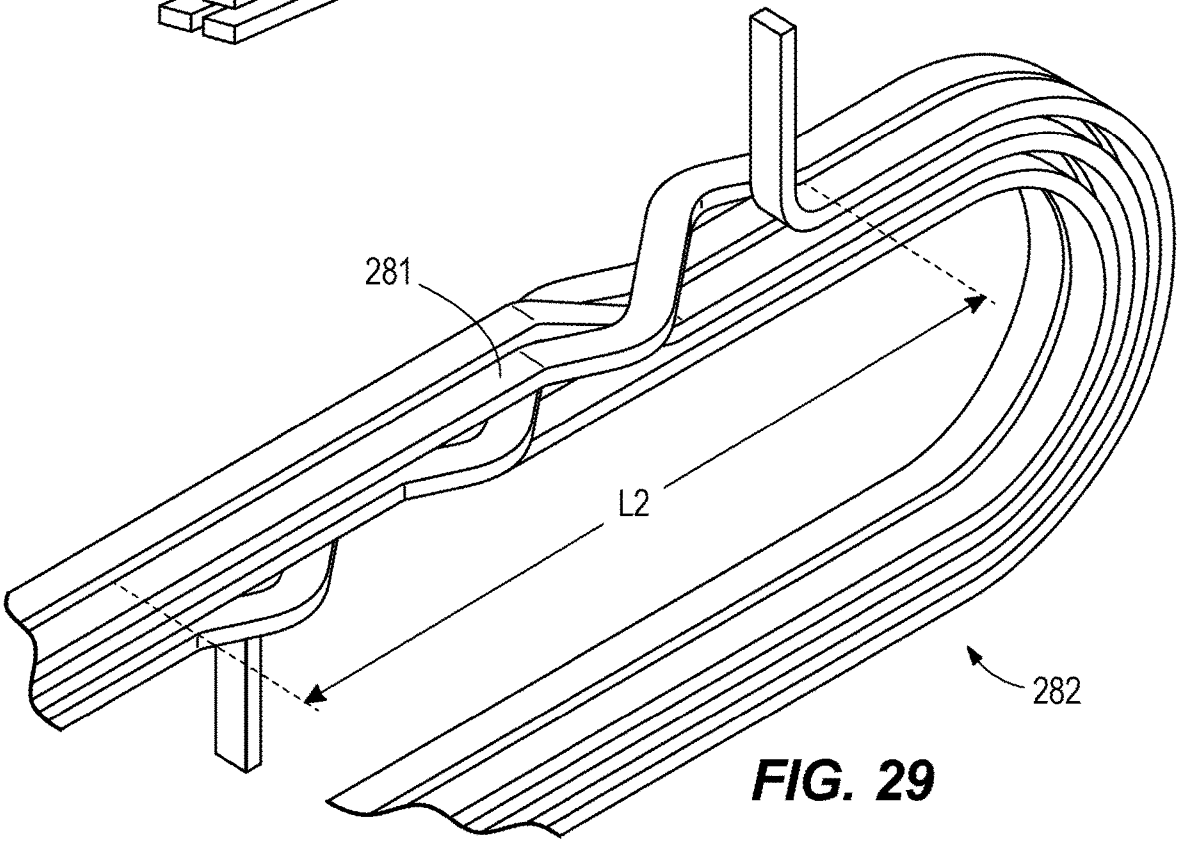
FIG. 29 illustrates a perspective view of the manufactured ƐS -Then-Step-Zig-Zag coil of FIG. 28A.

Additionally, as the number of turns increase, the length required for these transitions increases proportionally, limiting how many turns can be manufactured onto the overhand portion of the coil. In some instances, the transitions of the turns may be distributed around the conductor 170 to increase the number of turns that may be accommodated. For example, FIG. 29 provides a perspective view of the completed conductor 170, where the turn transitions have a length L2. To increase the number of turns that may be accommodated, some turn transitions may be manufactured on a first side 281 of the conductor 170, and other transitions may be manufactured on a second side 282 of the conductor 170.

Figure 30:
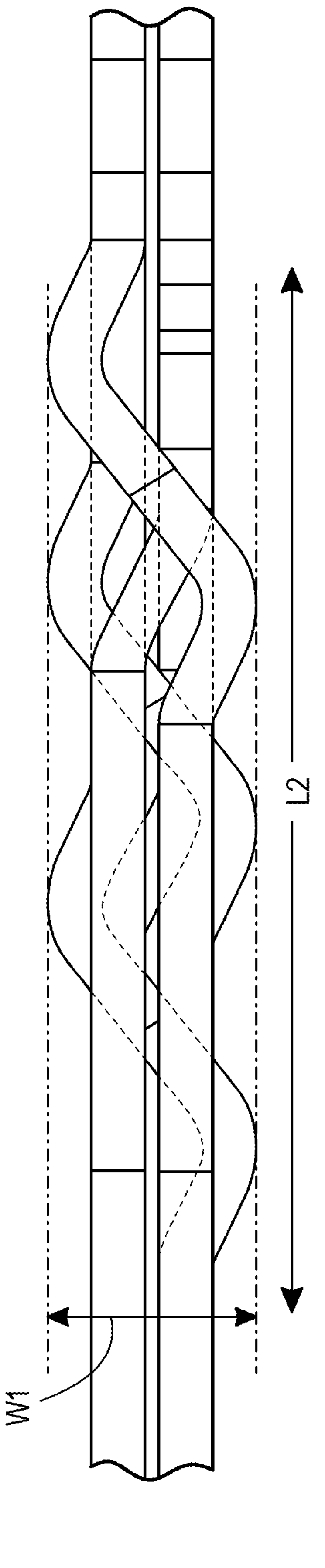
FIG. 30 illustrates a top view of the manufactured ƐS -Then-Step-Zig-Zag coil of FIG. 28A.

As shown in FIG. 30, the ƐS -Then-Step-Zig-Zag coil method of manufacturing may result in the ƐS portions becoming wider (e.g., having width W1) than two equivalent parallel conductor coils. This may be mitigated by alternating of the ƐS -Then-Step-Zig-Zag between the first side 281 and the second side 282 for adjacent coils.

The ƐS -Then-Step-Zig-Zag method of manufacturing the terrace coils provides reduced risk of pinch points in the insulation, as the "Zig-Zag" transitions and the "Step" transitions are manufactured separately. Additionally, the ƐS -Then-Step-Zig-Zag method introduces less physical stress on the conductor 170, thereby reducing risk of stress fractures and hairline cracks, and reducing risk of inter-turn failures.

Figure 31:
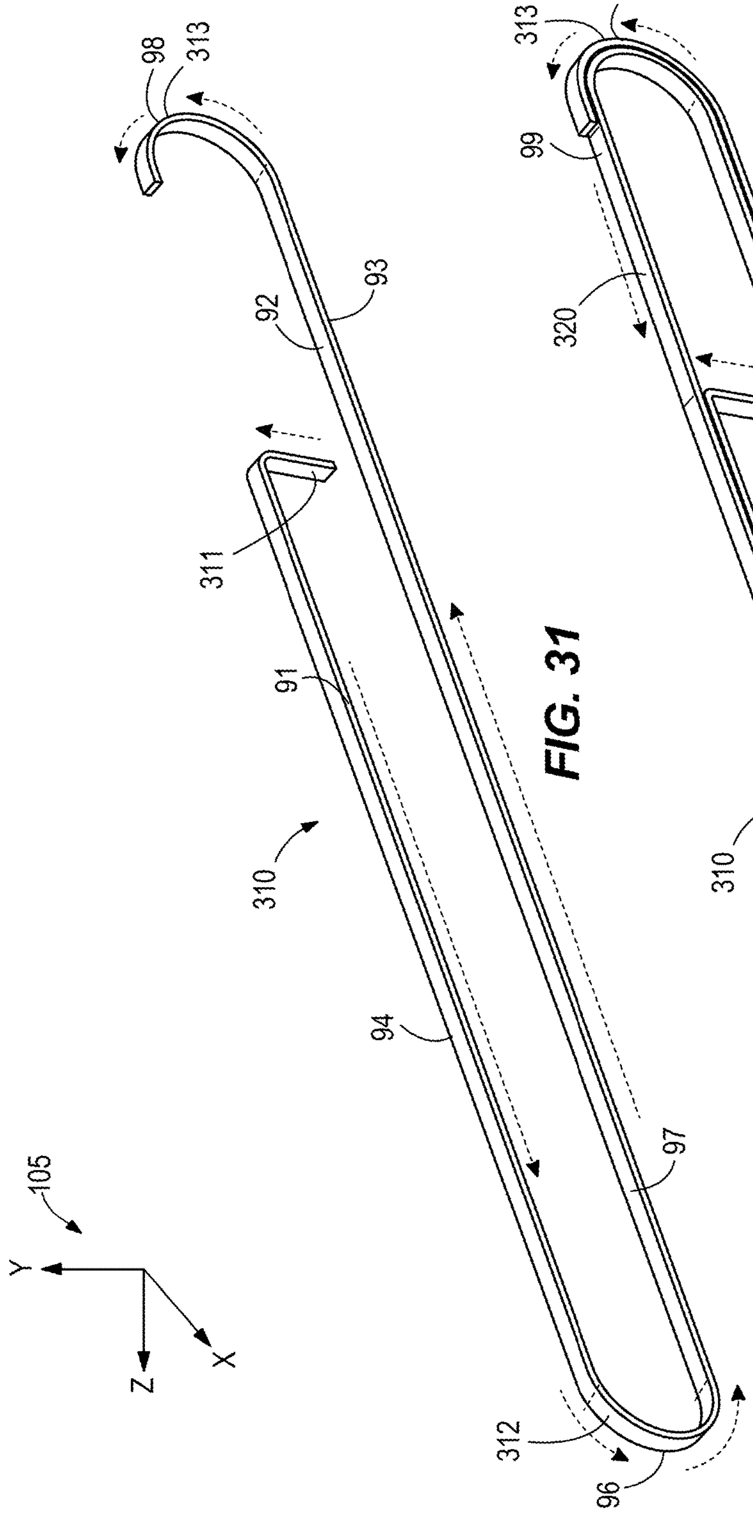
FIG. 31 illustrates a first step in manufacturing a Double-series-stack-top-to-bottom-bridge coil.

Another method of manufacturing described herein provides for a "Double-series-stack-top-to-bottom-bridge" coil. For example, FIG. 31 illustrates an example first conductor 310. Looping of the coil 310 begins with a first end 311 bending the beginning of the first conductor 310 towards the center of the loop. In some instances, the first end 311 may bend away from the center of the loop. The first conductor 310 is wound in a straight line to a first looping pin 312. The first conductor 310 is then wound around first looping pin 312 to form a half circle. The first conductor 310 is wound towards a second looping pin 313 on the opposite side of the loop from the first looping pin 312. The first conductor 310 is then wound back towards the start of the loop at the first end 311, forming the first turn of a coil. In instances where the first conductor 310 is a parallel conductor coil (not shown), two conductors are side-by-side in width and looped together. Subsequent turns are wound on top of the previous turns.

Figure 32A:
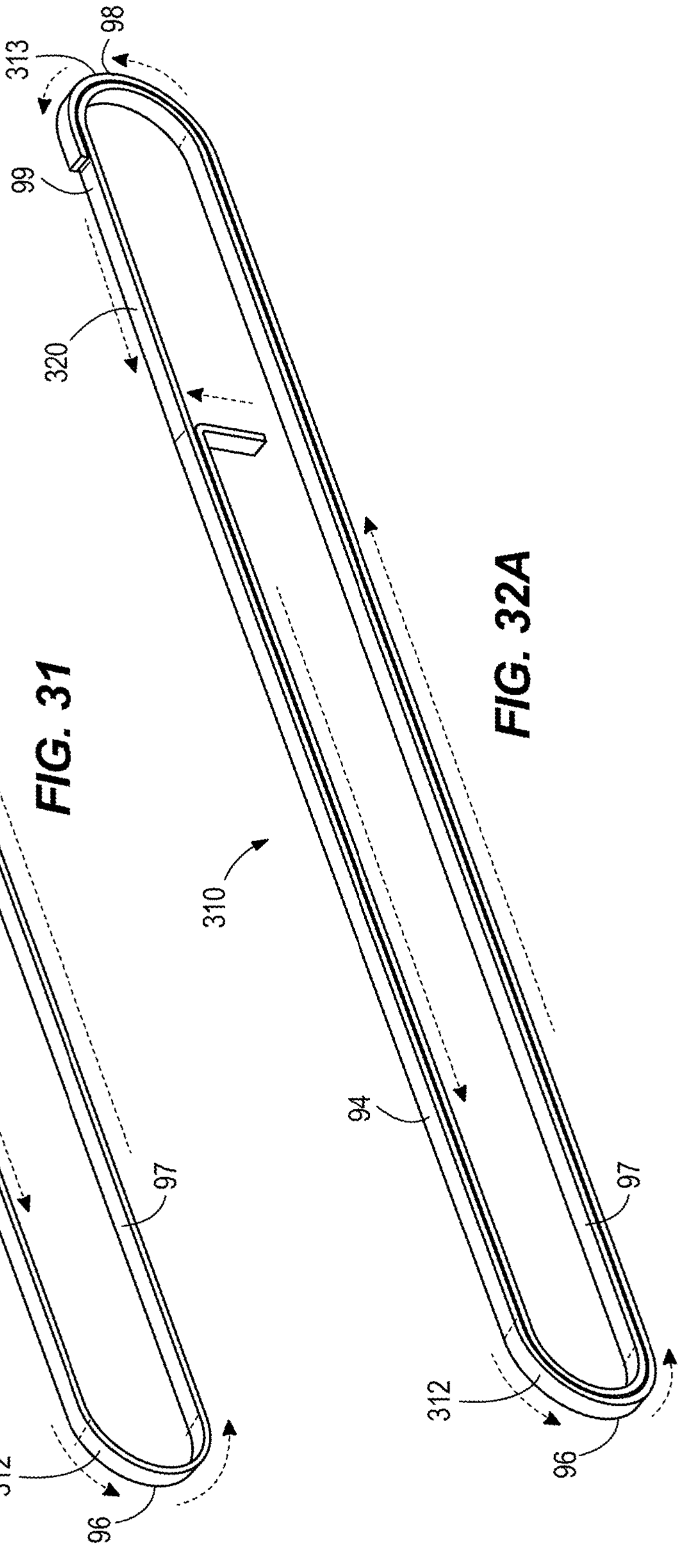
FIGS. 32A-32B illustrate a second step in manufacturing a Double-series-stack-top-to-bottom-bridge coil.
Figure 32B:
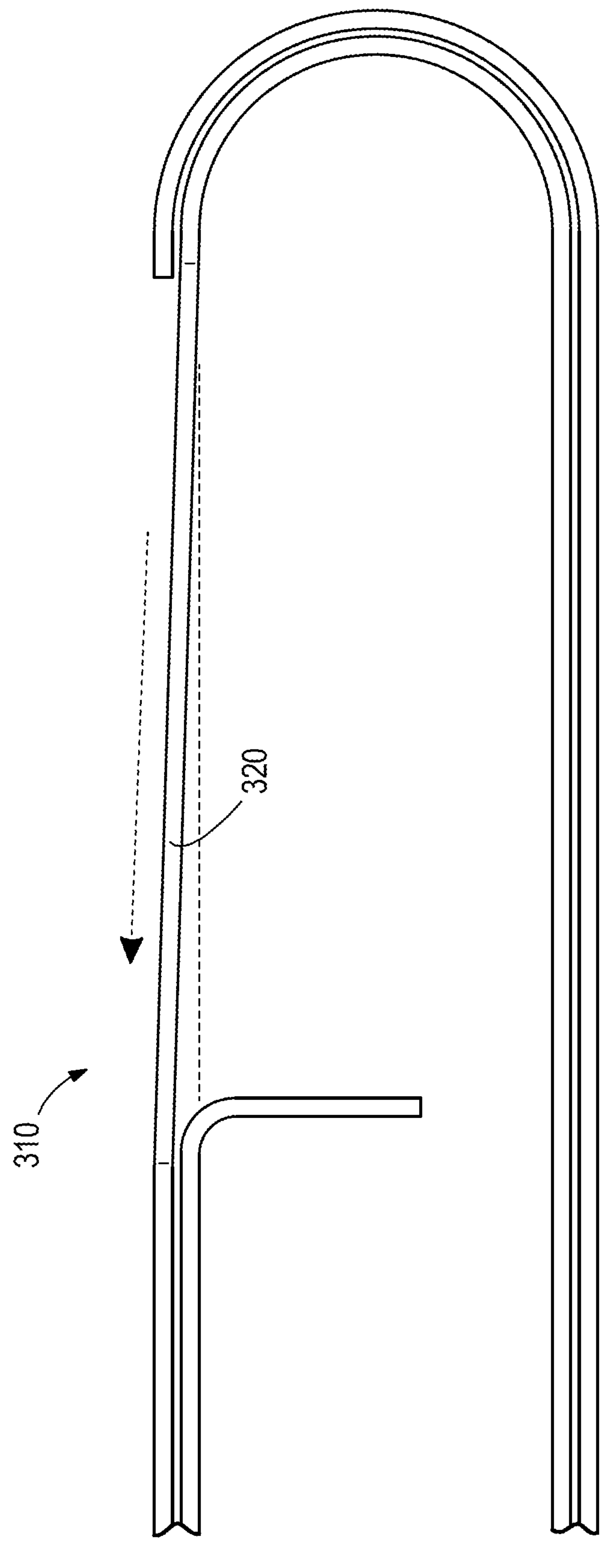

FIGS. 32A-32B illustrates the first conductor 310 following the bending illustrated in FIG. 31. In FIGS. 32A-32B, the first conductor 310 is wound slightly upwards (via ramp portion 320) to sit on top of the first turn, while still being aligned with the first turn. The first conductor 310 is then wound in a straight line to the first looping pin 312. The first conductor 310 is wound around the first looping pin 312 to form a half circle. The conductor 320 is then wound towards the second looping pin 313 on the opposite side of the loop from the first looping pin 312. The first conductor 310 is then wound back towards the start of the loop, forming the second turn of the coil.

Figure 33:
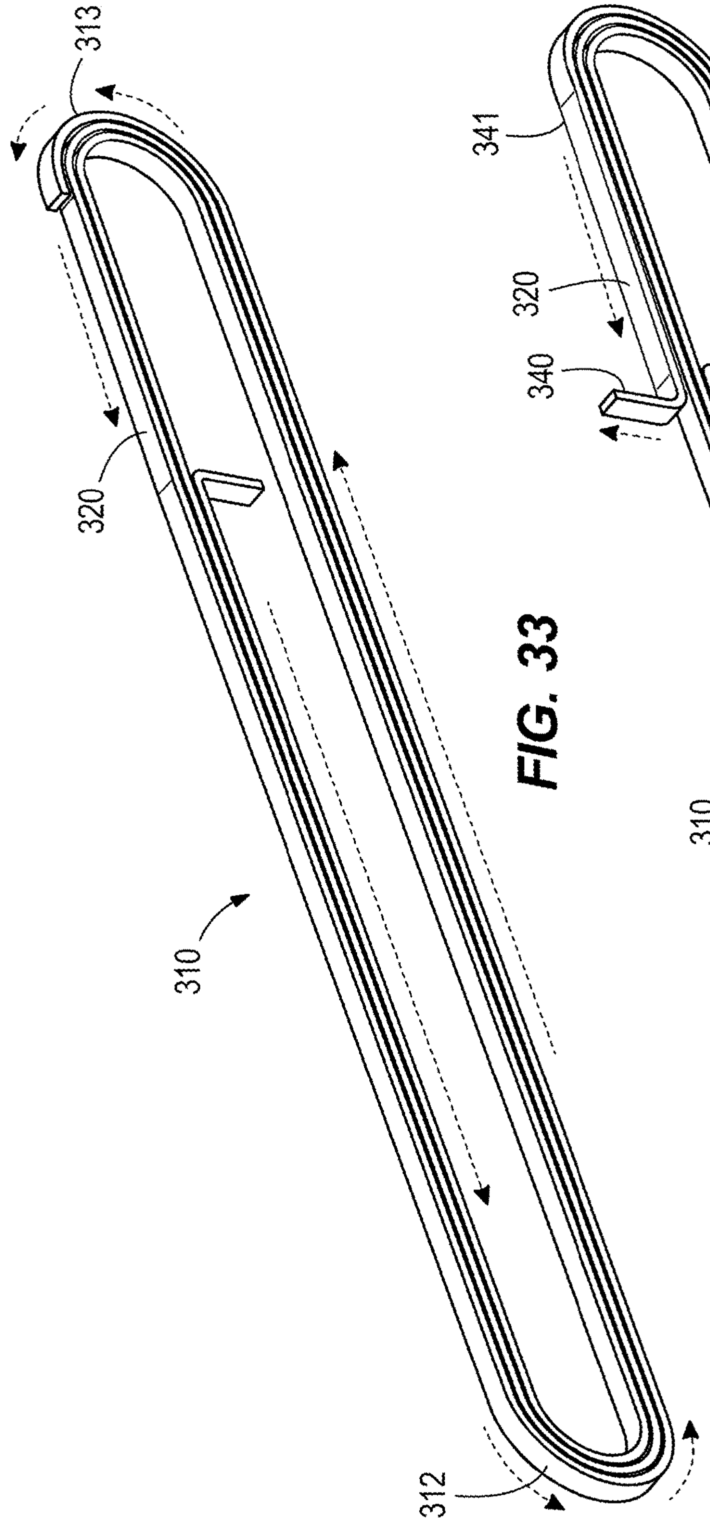
FIG. 33 illustrates a third step in manufacturing a Double-series-stack-top-to-bottom-bridge coil.

FIG. 33 illustrates the first conductor 310 following the bending illustrated in FIGS. 32A-32B. In FIG. 33, the first conductor 310 is wound slightly upwards (via ramp portion 320) to sit on top of the second turn, while still being aligned with the first turn and the second turn. The first conductor 310 is then wound in a straight line to the first looping pin 312. The first conductor 310 is wound around the first looping pin 312 to form a half circle. The conductor 320 is then wound towards the second looping pin 313 on the opposite side of the loop from the first looping pin 312. The first conductor 310 is then wound back towards the start of the loop, forming the third turn of the coil.

Figure 34:
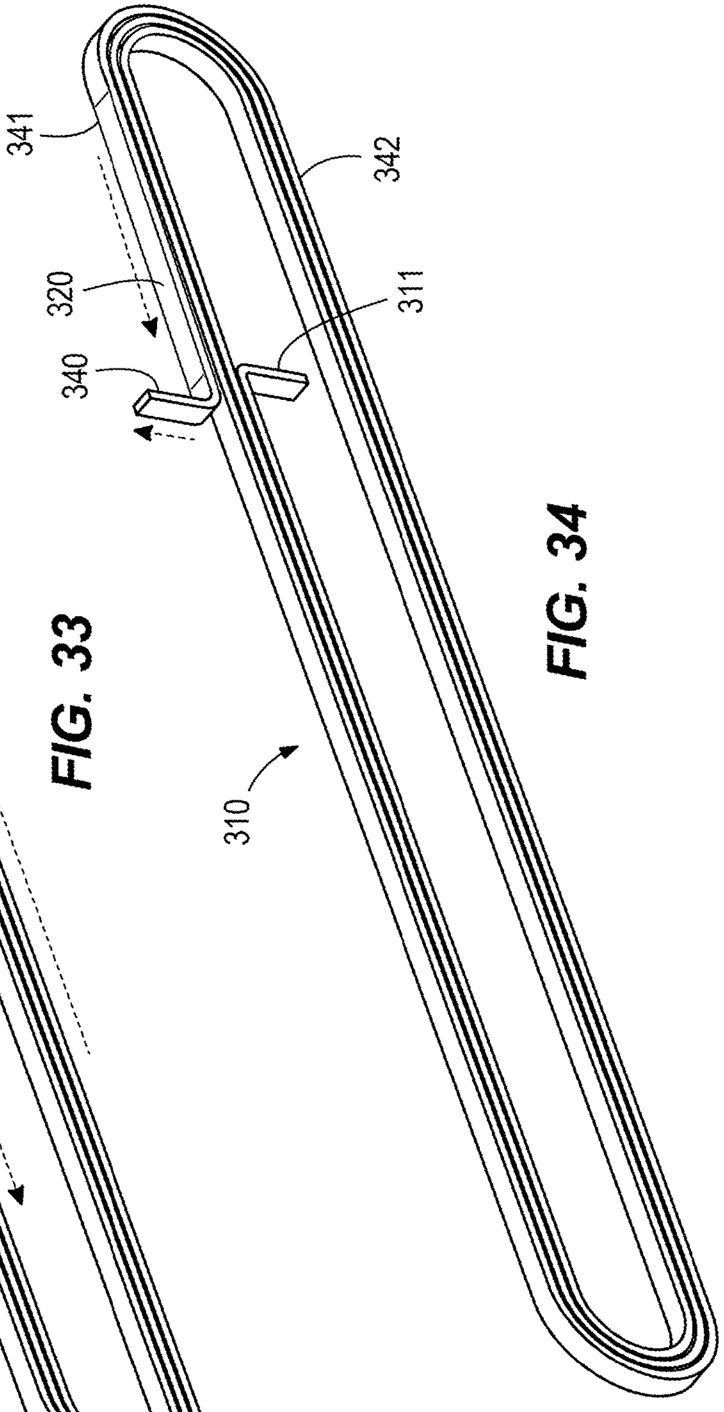
FIG. 34 illustrates a fourth step in manufacturing a Double-series-stack-top-to-bottom-bridge coil.

FIG. 34 illustrates the first conductor 310 following the bending illustrated in FIG. 33. In FIG. 34, similar to the start of the coil in FIG. 31, the end of the looping is bent away (at second end 340) from a first side 341 of the loop. Particularly, in the example of FIG. 31, the second end 340 is bent away from a center of the loop and in a direction opposite to the bend 311. The second end 340 may be located approximately opposite the first end 311. In other implementations, the second end 340 may extend longer, past the first end 311, as this piece may be used for the bridge connection to a second stack (see FIG. 35). In some instances, the second end 340 may be situated at a second side 342 of the loop.

Figure 35A:
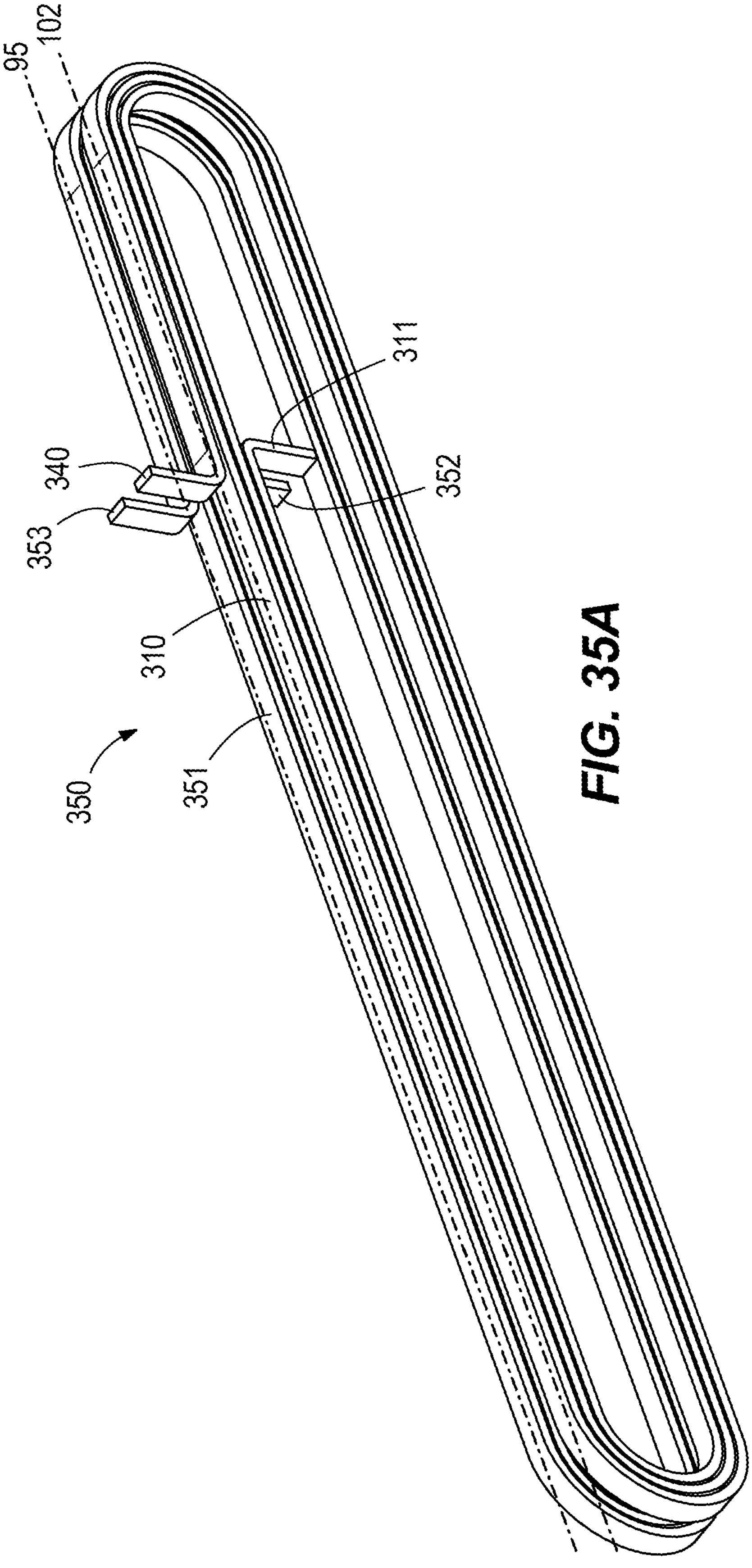
FIGS. 35A-35B illustrate a fifth step in manufacturing a Double-series-stack-top-to-bottom-bridge coil.
Figure 35B:
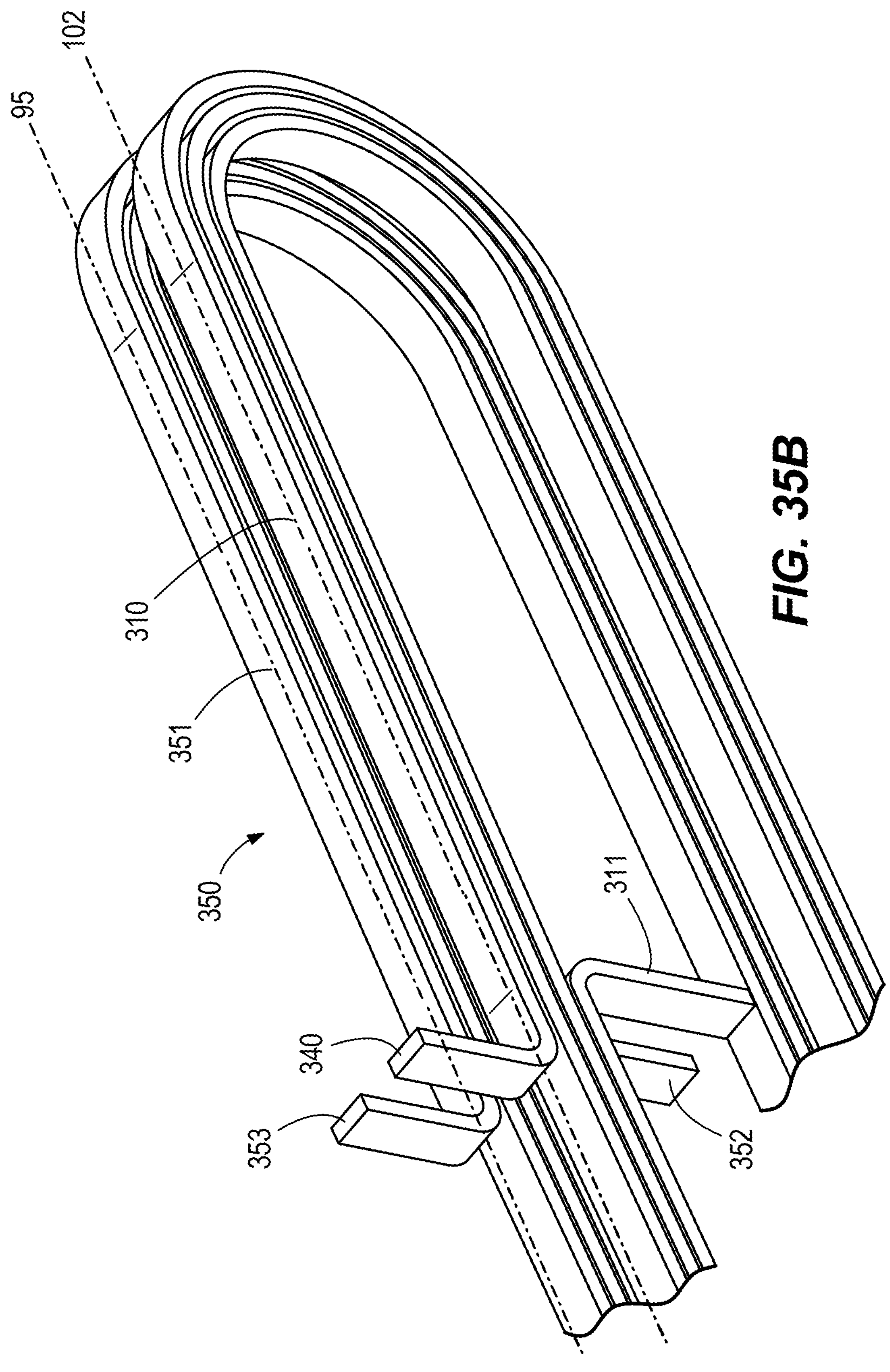

The bending illustrated between FIG. 31 to FIG. 34 is repeated to form a second conductor 351 (shown in FIG. 35A). The second conductor 351 is identical to the first conductor 310. The first conductor 310 and the second conductor 351 collectively form a double stack 350. Some manufacturing methods may wind both the first conductor 310 and the second conductor 351 simultaneously, side by side. The second conductor 351 includes a third end 352 and a fourth end 353. FIG. 35B illustrates the double stack 350 magnified for clarity. The first conductor 310 extends along a first axis 95 and the second conductor 351 extends along a second axis 102.

Figure 36:
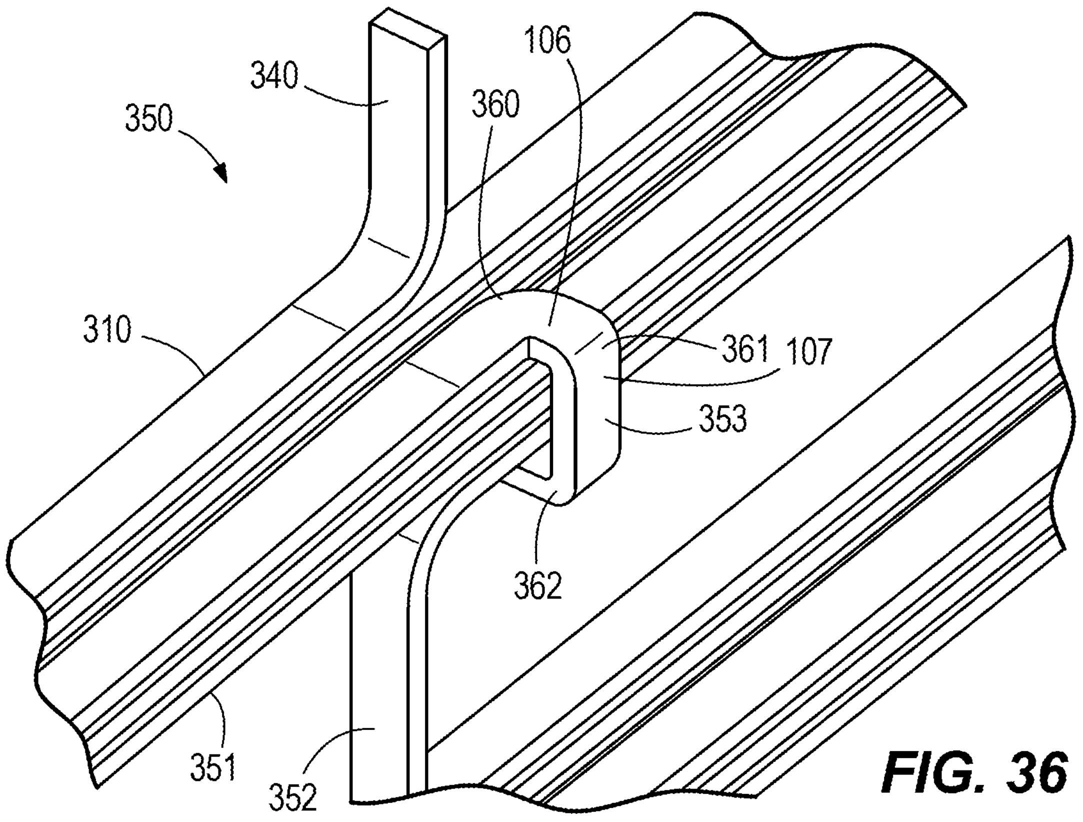
FIG. 36 illustrates a sixth step in manufacturing a Double-series-stack-top-to-bottom-bridge coil.
Figure 37:
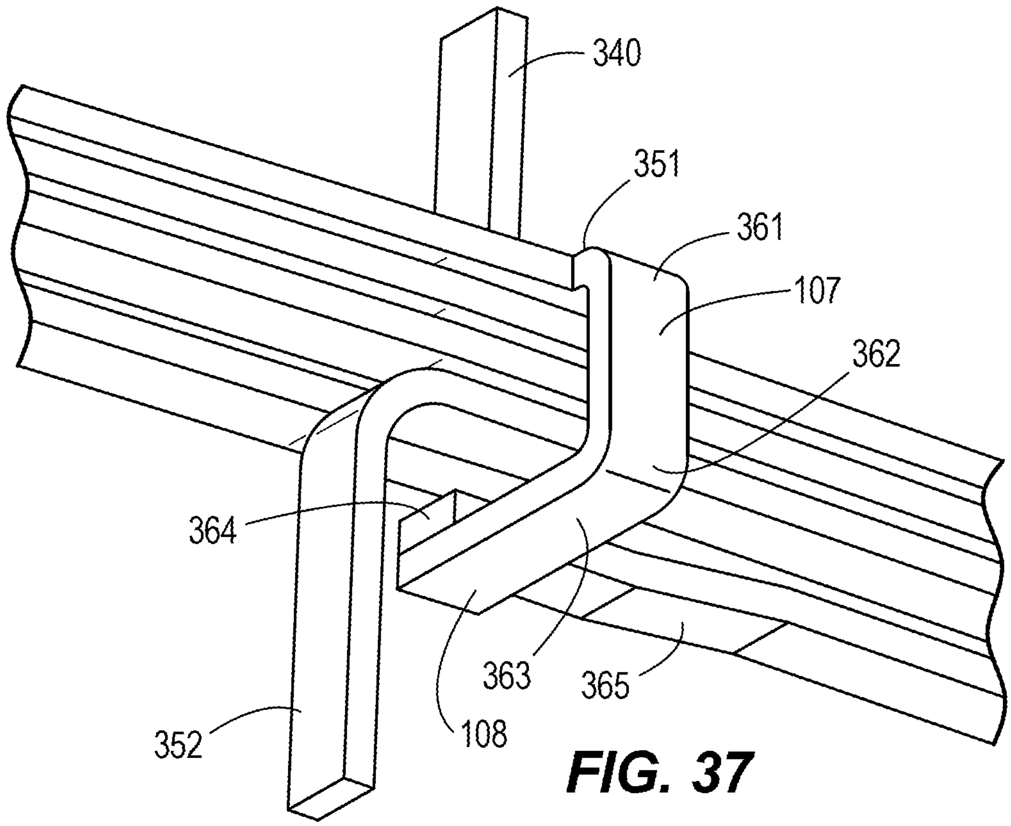
FIG. 37 illustrates a seventh step in manufacturing a Double-series-stack-top-to-bottom-bridge coil.

To achieve a series connection, the top of one stack is connected to the bottom of the other stack, forming a "bridge connection." FIGS. 36-37 provide one example for forming a bridge connection. In FIG. 36, a first end portion 106 of the second end 353 of the second conductor 351 is bent on the conductor edge 91, 90° away (at bend 360) from the first conductor 310 such that part of the first end portion 106 extends along an axis orthogonal to the first axis 95. Then, a second end portion 107 of the second end 353 of the second conductor 351 is bent 90° downwards (at bend 361) along the y-axis such that the second end portion 107 is in contact with the conductor edge 91 and such that the second end 353 is along the side of the second conductor 351. At the bottom 93 of the second conductor 351, a bottom end portion 108 of the second end 353 is again bent at an angle of 90° (at bend 362) to pass across the first turn of the second conductor 351 and underneath the second conductor 351. These bends thus take the second conductor 351 to the bottom of the stack and across the first turn. As the bridge connection is on the outside of the stack, FIG. 36 is referred to as a "Double-series-stack-top-to-bottom-side-bridge" design.

Figure 38:
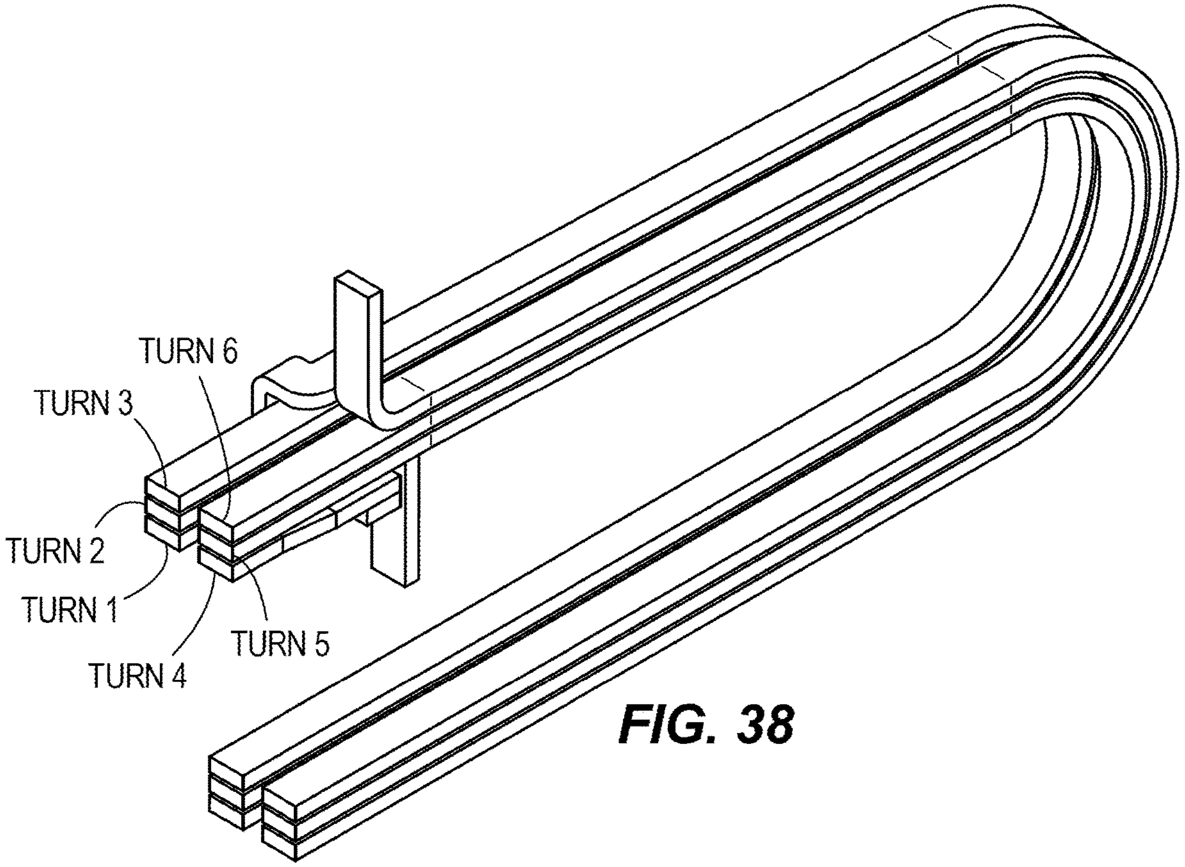
FIGS. 38 and 39 illustrate views of a manufactured Double-series-stack-top-to-bottom-bridge coil.

Referring now to FIG. 37, the bends take the second conductor 351 to the bottom 363 of the stack and across to the first turn 364 of the first conductor 310. In some instances, the first turn of the first conductor 310 is bent down slightly (at bend 365) to provide space to connect the second conductor 351 to the first conductor 310 at bridge connection 364. The first conductor 310 and the second conductor 351 are then soldered, welded, or brazed together, closing the circuit between the two stacks. FIG. 38 illustrates a cross-section of the completed "Double-series-stack-top-to-bottom-side-bridge" coil.

The bridge connection 364 needs to be insulated from the conductors in the stack. In some instances, this is achieved by insulating or taping the bridge connection 364 instead of increasing the conductor cover (as done for the Zig-Zag-Then-Step coil and the ƐS -Then-Step-Zig-Zag). While only six total turns are provided in the example of FIG. 38, the Double-series-stack-top-to-bottom-side-bridge coil may have twenty or more series turns. Accordingly, insulating or taping the bridge connection avoids increasing the conductor covering for this adjacent stack connection. The start and finish of the coils would then be bent and shaped into suitable positions.

Excluding the bridge connection and ignoring the stack-to-stack volt per turn, the volt per turn can be calculated in a similar manner as previously described. For the example six turn, Double-series-stack-top-to-bottom-side-bridge coil illustrated in FIG. 38, the Simple Volt Per Turn in each coil is provided using Equation 7:

$$v_t = \frac{V_c}{t} \quad \text{[Equation 7]}$$

Where:

$V_c$=Volts per coil;

t=Number of turns in the coil; and $v_t$=Calculated Simple Volt Per Turn (in Volts).

In a parallel conductor coil, such as that shown in FIG. 3, the Maximum Volt Per Turn is exactly equal to the calculated Simple Volt Per Turn, as shown below in Equation 8:

$$V_{tmax} = v_t = \frac{V_c}{t} \quad \text{[Equation 8]}$$

Where:

$V_c$=Volts per coil;

t=Number of turns in the coil;

$v_t$=Calculated Simple Volt Per Turn (in Volts); and $V_{tmax}$=Calculated Maximum Volt Per Turn (in Volts).

This calculated Maximum Volt Per Turn value impacts the determination of the type and thickness of turn insulation to be used in the parallel conductor coil, and may impact the overall size of the insulated coil. For series coils, however the Maximum Volt Per Turn is not necessarily equal to the Simple Volt Per Turn. For example, the Maximum Volt Per Turn for the series coil of FIG. 38 is provided by Equation 9:

$$V_{tmax.Dssttbsb} = v_{tmax} = \frac{V_c}{t} \quad \text{[Equation 9]}$$

Where:

$V_c$=Volts per coil;

t=Number of turns in the coil;

$v_t$=Calculated Simple Volt Per Turn (in Volts); and $V_{tmax.Dssttbsb}$=Calculated Maximum Volt Per Turn for Double-series-stack-top-to-bottom-side-bridge coil (in Volts).

Figure 39:
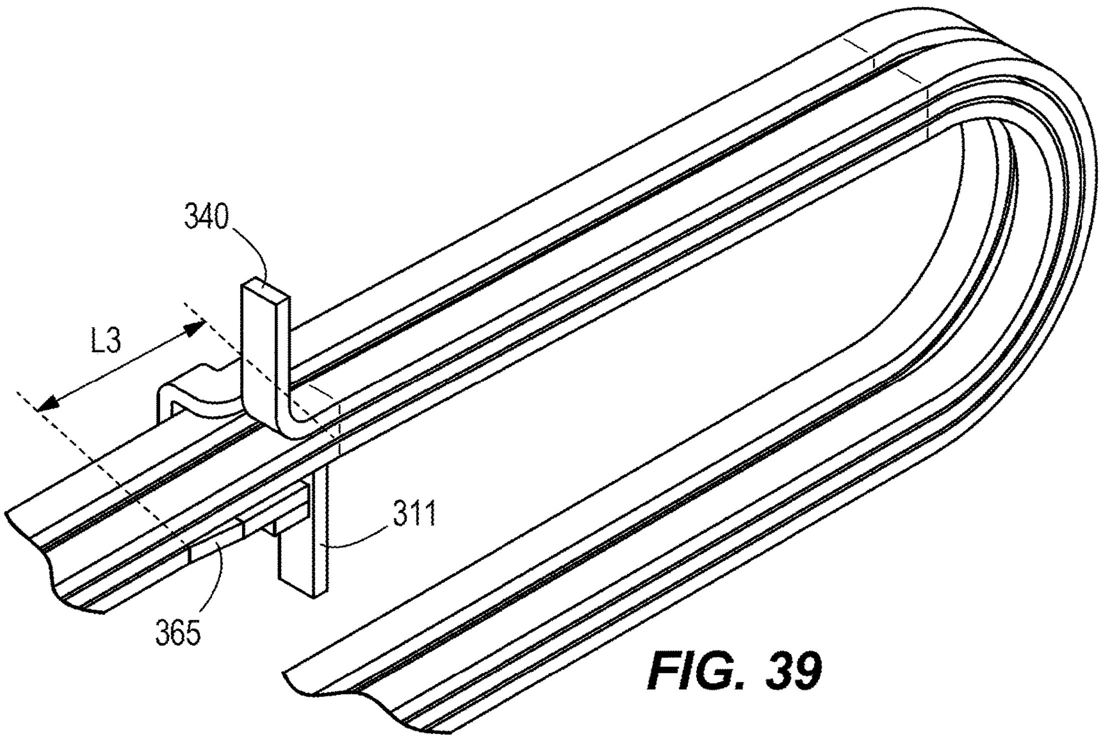
Figure 40:
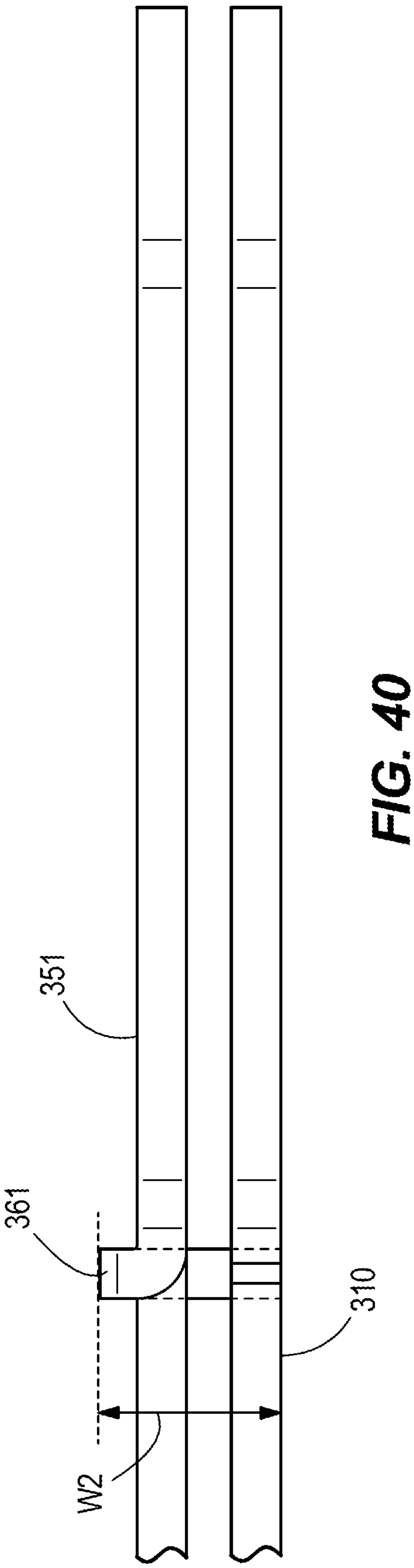
FIG. 40 illustrates a top view of the manufactured Double-series-stack-top-to-bottom-bridge coil of FIGS. 38 and 39.

One advantage of the Double-series-stack-top-to-bottom-side-bridge method of manufacturing coils is that the space needed for the bridge connection 364 is not dependent on the total number of turns. For example, FIG. 39 illustrates the length L3 representative of the space between the first turn (before bend 365) and the first end 311. However, the Double-series-stack-top-to-bottom-side-bridge method of manufacturing coils also results in the bridge portion of the coil becoming wider than the two equivalent parallel conductor coils. For example, FIG. 40 illustrates the Double-series-stack-top-to-bottom-side-bridge coil having width W2.

Figure 41:
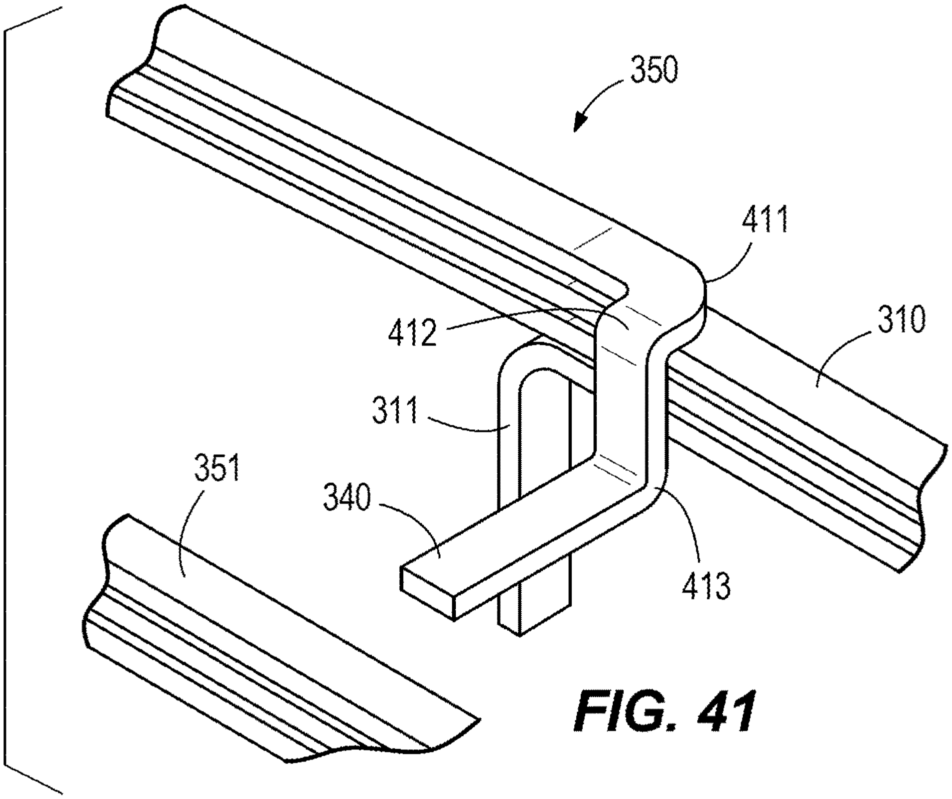
FIG. 41 illustrates a first step in manufacturing a Double-series-stack-top-to-bottom-center-bridge coil.

An alternative method of creating the bridge connection includes placing the bridge connection between two stacks. For example, starting with the double stack 350 from FIG. 35B, in FIG. 41, the second end 340 of the first conductor 310 is bent (at bend 411) on edge, 90° towards the second conductor 351. The second end 340 is then bent 90° downwards (at bend 412) to be along the side of the stack created by the first conductor 310. At the bottom of the stack, the second end 340 is again bent (at bend 413) at an angle of 90° away from the stack, underneath and next to the stack created by the second conductor 351. These bends thus take the second end 340 to the bottom of the first conductor 310 and across to the first turn of the second conductor 351. As the bridge connection is between the stacks, this specific coil is referred to as a "Double-series-stack-top-to-bottom-center-bridge" coil.

Figure 42:
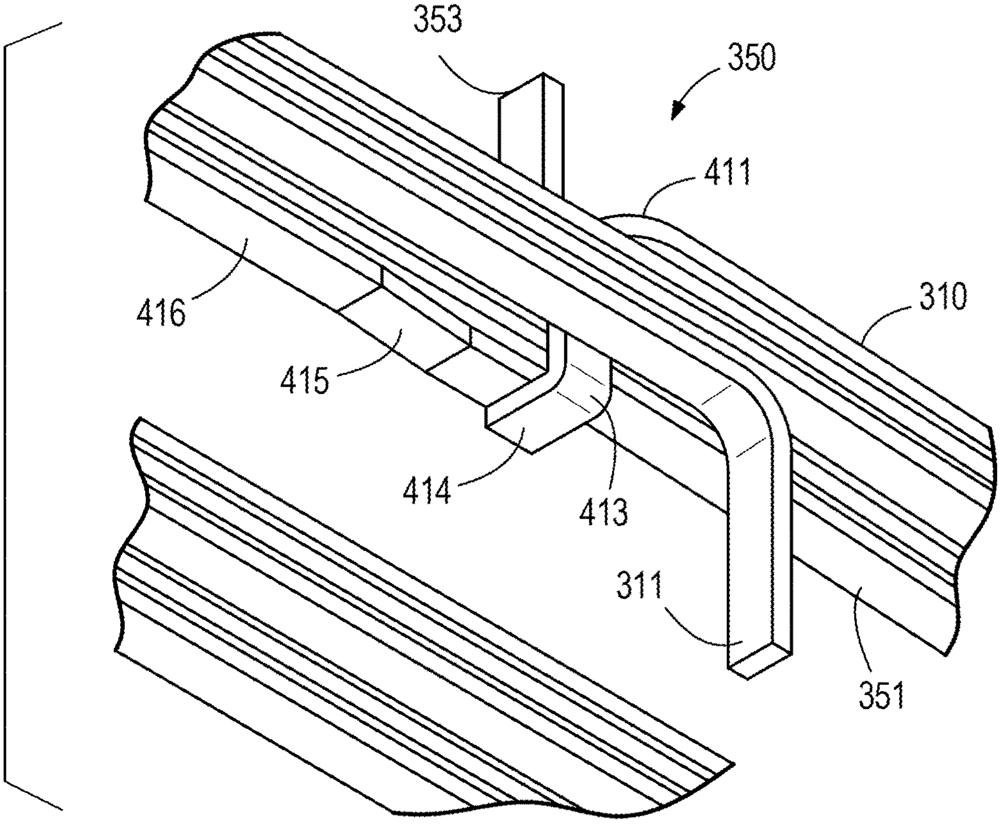
FIG. 42 illustrates a second step in manufacturing a Double-series-stack-top-to-bottom-center-bridge coil.
Figure 43:
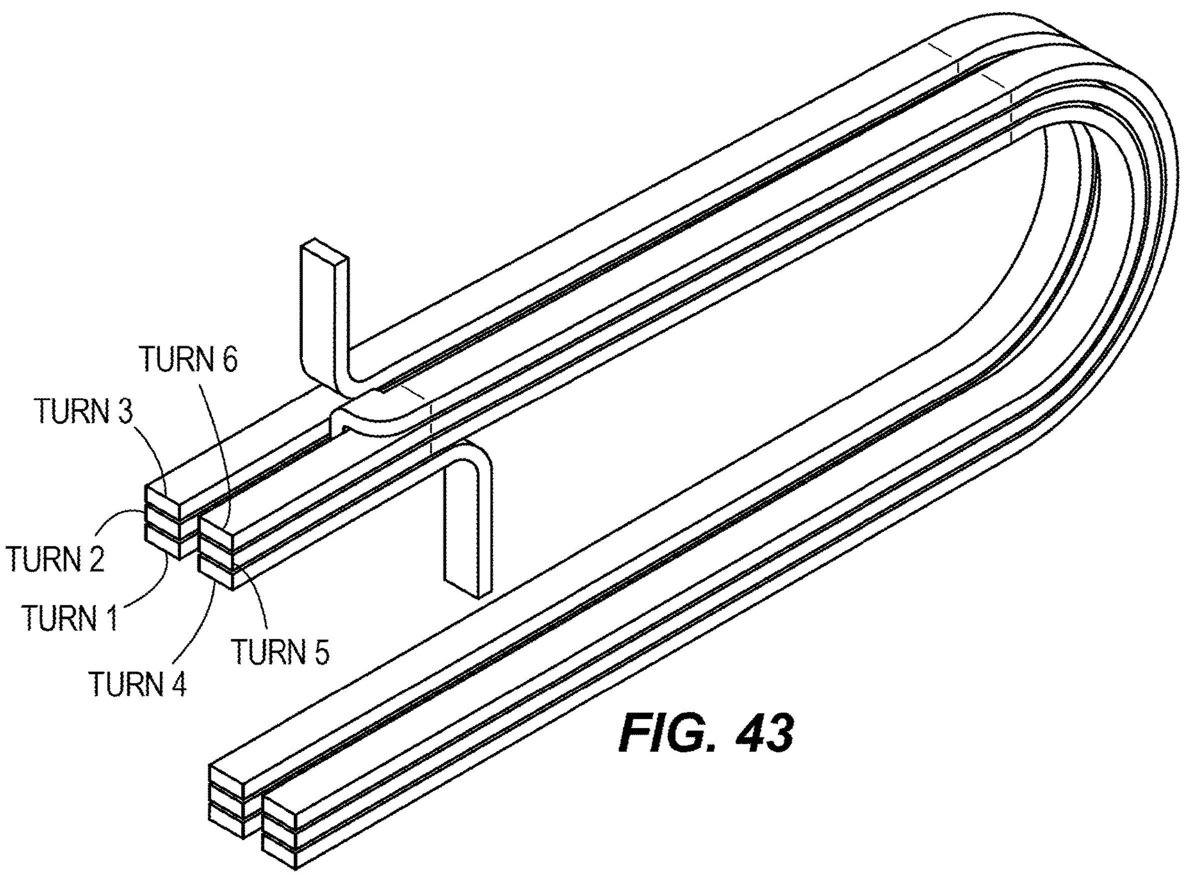
FIGS. 43 and 44 illustrate views of a manufactured Double-series-stack-top-to-bottom-center-bridge coil.

Referring now to FIG. 42, the bends take the first conductor 310 to the bottom of the stack and across to the first turn 416 of the second conductor 351. In some instances, the first turn 416 of the second conductor 351 is bent down slightly (at bend 415) to provide space to connect the first conductor 310 to the second conductor 351 at bridge connection 414. The first conductor 310 and the second conductor 351 are then soldered, welded, or brazed together, closing the circuit between the two stacks. FIG. 43 illustrates a cross-section of the completed "Double-series-stack-top-to-bottom-center-bridge" coil.

The bridge connection 414 needs to be insulated from the conductors in the stack. In some instances, this is achieved by insulating or taping the bridge connection 414 instead of increasing the conductor cover (as done for the Zig-Zag-Then-Step coil and the ƐS -Then-Step-Zig-Zag). While only six total turns are provided in the example of FIG. 43, the Double-series-stack-top-to-bottom-center-bridge coil may have twenty or more series turns. Accordingly, insulating or taping the bridge connection avoids increasing the conductor covering for this adjacent stack connection. The start and finish of the coils would then be bent and shaped into suitable positions.

Excluding the bridge connection and ignoring the stack-to-stack volt per turn, the volt per turn can be calculated in a similar manner as previously described. For the example six turn, Double-series-stack-top-to-bottom-center-bridge coil illustrated in FIG. 43, the Simple Volt Per Turn in each coil is provided using Equation 10:

$$v_t = \frac{V_c}{t} \quad \text{[Equation 10]}$$

Where:

$V_c$=Volts per coil;

t=Number of turns in the coil; and $v_t$=Calculated Simple Volt Per Turn (in Volts).

In a parallel conductor coil, such as that shown in FIG. 3, the Maximum Volt Per Turn is exactly equal to the calculated Simple Volt Per Turn, as shown below in Equation 11:

$$V_{tmax} = v_t = \frac{V_c}{t} \quad \text{[Equation 11]}$$

Where:

$V_c$=Volts per coil;

t=Number of turns in the coil;

$v_t$=Calculated Simple Volt Per Turn (in Volts); and $V_{tmax}$=Calculated Maximum Volt Per Turn (in Volts).

This calculated Maximum Volt Per Turn value impacts the determination of the type and thickness of turn insulation to be used in the parallel conductor coil, and may impact the overall size of the insulated coil. For series coils, however the Maximum Volt Per Turn is not necessarily equal to the Simple Volt Per Turn. For example, the Maximum Volt Per Turn for the series coil of FIG. 43 is provided by Equation 12:

$$V_{tmax.Dssttbcb} = v_{tmax} = \frac{V_c}{t} \quad \text{[Equation 12]}$$

Where:

$V_c$=Volts per coil;

t=Number of turns in the coil;

$v_t$=Calculated Simple Volt Per Turn (in Volts); and $V_{tmax.Dssttbsb}$=Calculated Maximum Volt Per Turn for Double-series-stack-top-to-bottom-center-bridge coil (in Volts).

Figure 44:
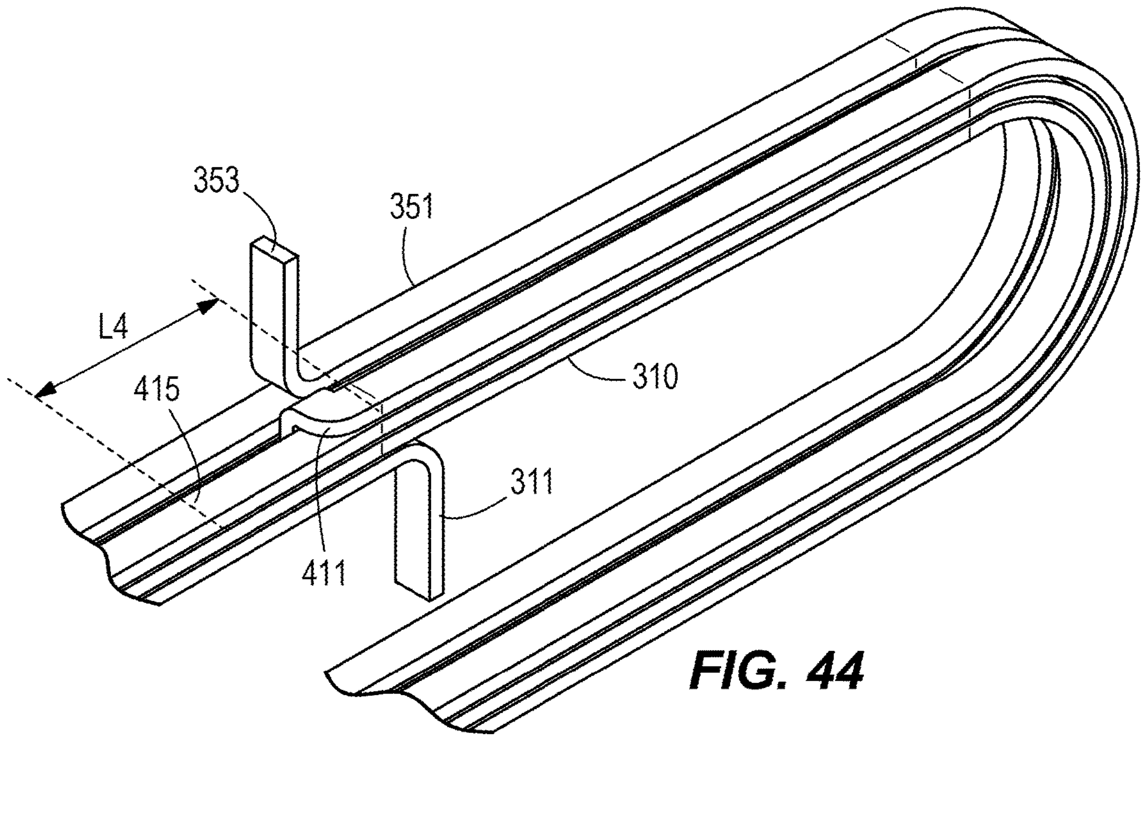
Figure 45:
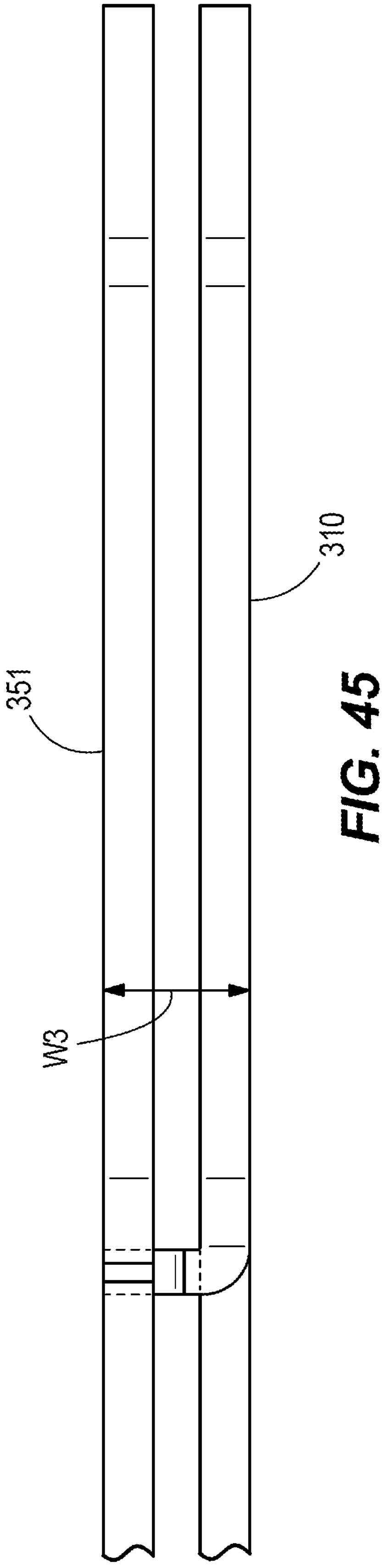
FIG. 45 illustrates a top view of the manufactured Double-series-stack-top-to-bottom-center-bridge coil of FIGS. 43 and 44.

One advantage of the Double-series-stack-top-to-bottom-center-bridge method of manufacturing coils is that the space needed for the bridge connection 414 is not dependent on the total number of turns. For example, FIG. 44 illustrates the length L4 representative of the space between the first turn (before bend 415) and the beginning bend 411. However, the Double-series-stack-top-to-bottom-center-bridge method of manufacturing coils also results in the bridge portion of the coil becoming wider than the two equivalent parallel conductor coils. For example, FIG. 45 illustrates the Double-series-stack-top-to-bottom-center-bridge coil having width W3.

Figure 46:
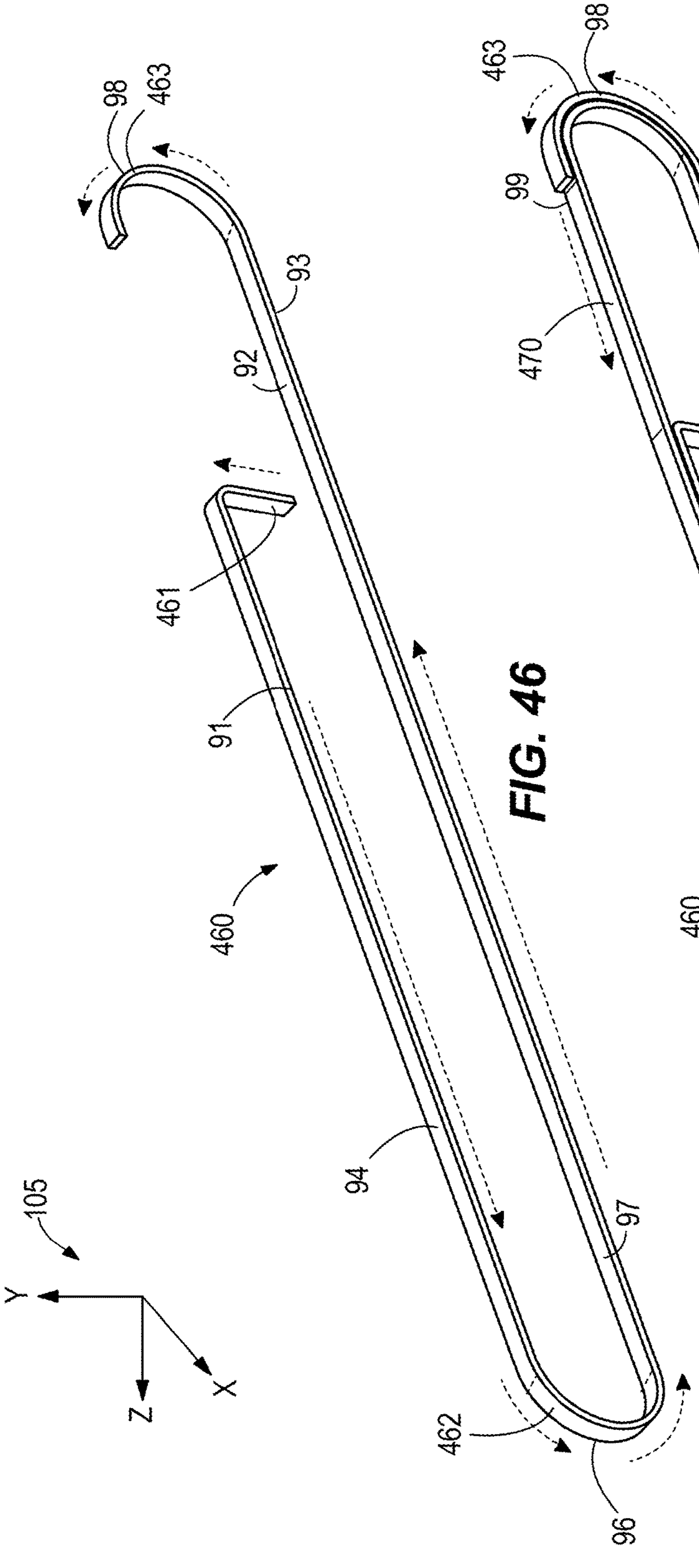
FIG. 46 illustrates a first step for manufacturing a Reverse-wound-double-series-stack coil.

Another method of manufacturing described herein provides for a "Reverse-wound-double-series-stack" coil. For example, FIG. 46 illustrates an example first conductor 460. Looping of the coil 460 begins with a first end 461 bending the beginning of the first conductor 460 towards the center of the loop. In some instances, the first end 461 may bend away from the center of the loop. The first conductor 460 is wound in a straight line to a first looping pin 462. The first conductor 460 is then wound around first looping pin 462 to form a half circle. The first conductor 460 is wound towards a second looping pin 463 on the opposite side of the loop from the first looping pin 462. The first conductor 460 is then wound back towards the start of the loop at the first end 461, forming the first turn of a coil. In instances where the first conductor 460 is a parallel conductor coil (not shown), two conductors are side-by-side in width and looped together. Subsequent turns are wound on top of the previous turns.

Figure 47A:
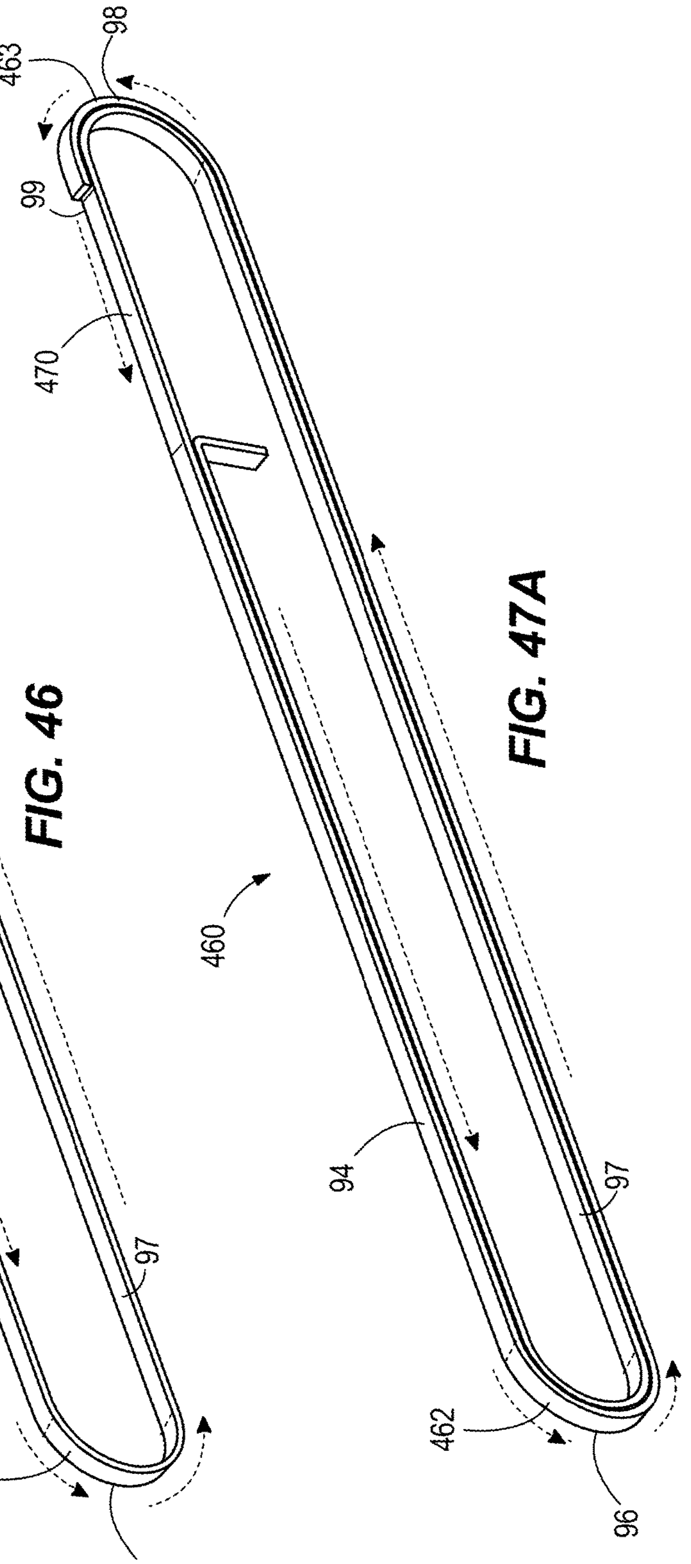
FIGS. 47A-47B illustrate a second step for manufacturing a Reverse-wound-double-series-stack coil.
Figure 47B:
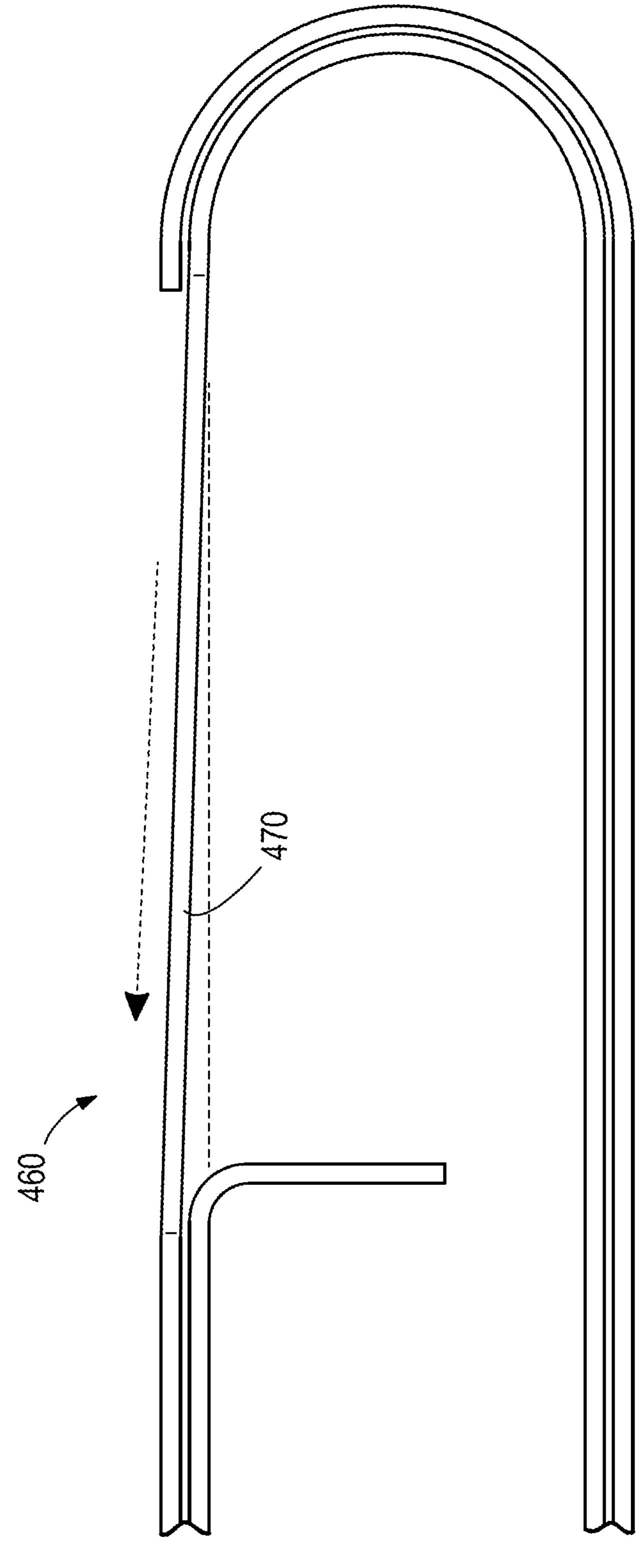

FIGS. 47A-47B illustrates the first conductor 460 following the bending illustrated in FIG. 46. In FIGS. 47A-47B, the first conductor 460 is wound slightly upwards (via ramp portion 470) to sit on top of the first turn, while still being aligned with the first turn. The first conductor 460 is then wound in a straight line to the first looping pin 462. The first conductor 460 is wound around the first looping pin 462 to form a half circle. The conductor 460 is then wound towards the second looping pin 463 on the opposite side of the loop from the first looping pin 462. The first conductor 460 is then wound back towards the start of the loop, forming the second turn of the coil.

Figure 48:
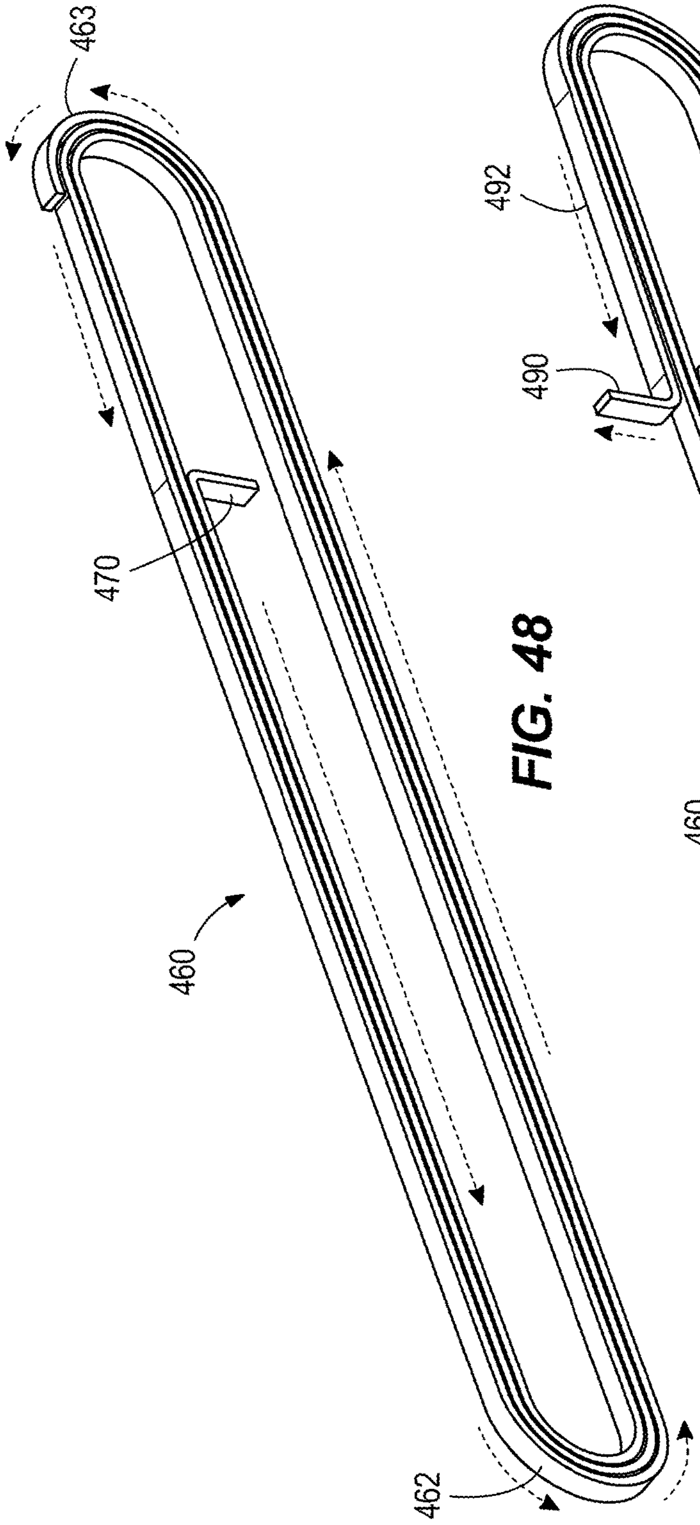
FIG. 48 illustrates a third step for manufacturing a Reverse-wound-double-series-stack coil.

FIG. 48 illustrates the first conductor 460 following the bending illustrated in FIGS. 47A-47B. In FIG. 48, the first conductor 460 is wound slightly upwards (via ramp portion 470) to sit on top of the second turn, while still being aligned with the first turn and the second turn. The first conductor 460 is then wound in a straight line to the first looping pin 462. The first conductor 460 is wound around the first looping pin 462 to form a half circle. The conductor 470 is then wound towards the second looping pin 463 on the opposite side of the loop from the first looping pin 462. The first conductor 460 is then wound back towards the start of the loop, forming the third turn of the coil.

Figure 49:
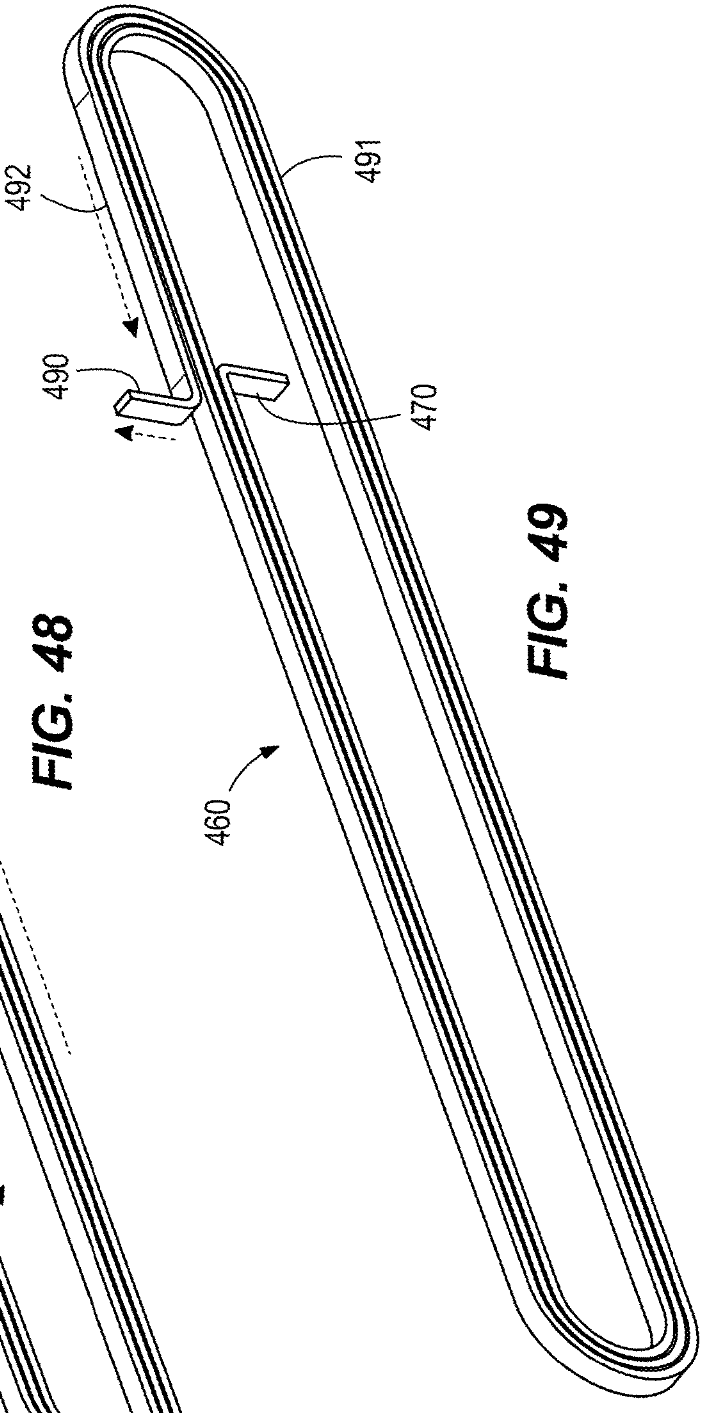
FIG. 49 illustrates a fourth step for manufacturing a Reverse-wound-double-series-stack coil.

FIG. 49 illustrates the first conductor 460 following the bending illustrated in FIG. 48. In FIG. 49, similar to the start of the coil in FIG. 31, the end of the looping is bent away (at second end 490) from a first side 491 of the loop. Particularly, in the example of FIG. 49, the second end 490 is bent away from a center of the loop and in a direction opposite to the first end 461. The second end 490 may be located approximately opposite the first end 461. In other implementations, the second end 490 may extend longer, past the first end 461, as this piece may be used for the bridge connection to a second stack. In some instances, the second end 490 may be situated at a second side 492 of the loop.

For the Reverse-wound-double-series-stack coil, the second stack is wound in the opposite direction. Beginning with FIG. 50, the looping starts with a first end 501 of second conductor 500 being bent away from the loop and towards the center of the loop (or, in other embodiments, outwards away from the center of the loop). The second conductor 500 is then wound in a straight line to a first looping pin 502. The second conductor 500 is wound around the first looping pin 502 to form a half circle and wound towards a second looping pin 503 on the opposite side of the loop from the first looping pin 502. The second conductor 500 is then wound back towards the start of the loop, forming the first turn of the coil.

Figure 50:
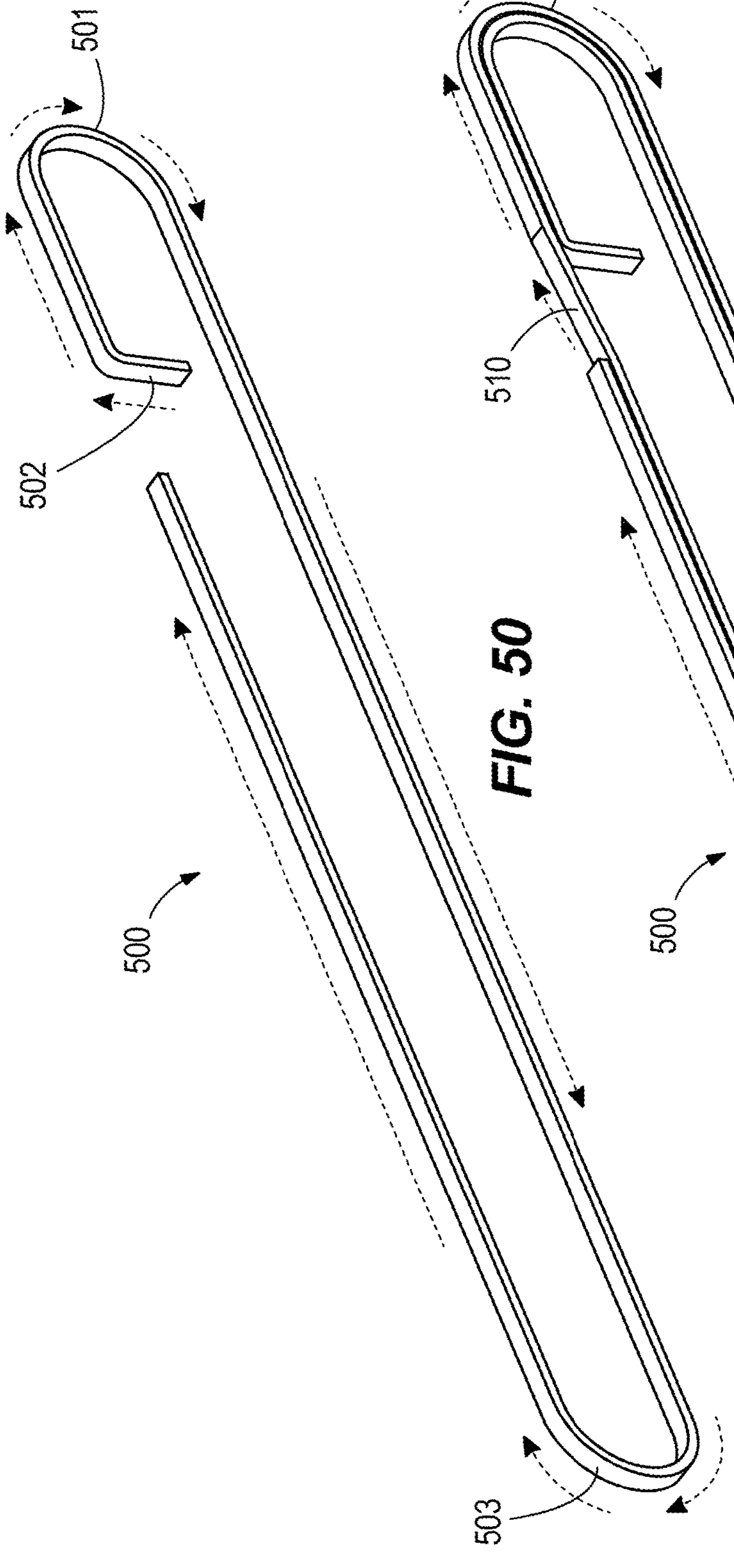
FIG. 50 illustrates a fifth step in manufacturing a Reverse-wound-double-series-stack coil.
Figure 51A:
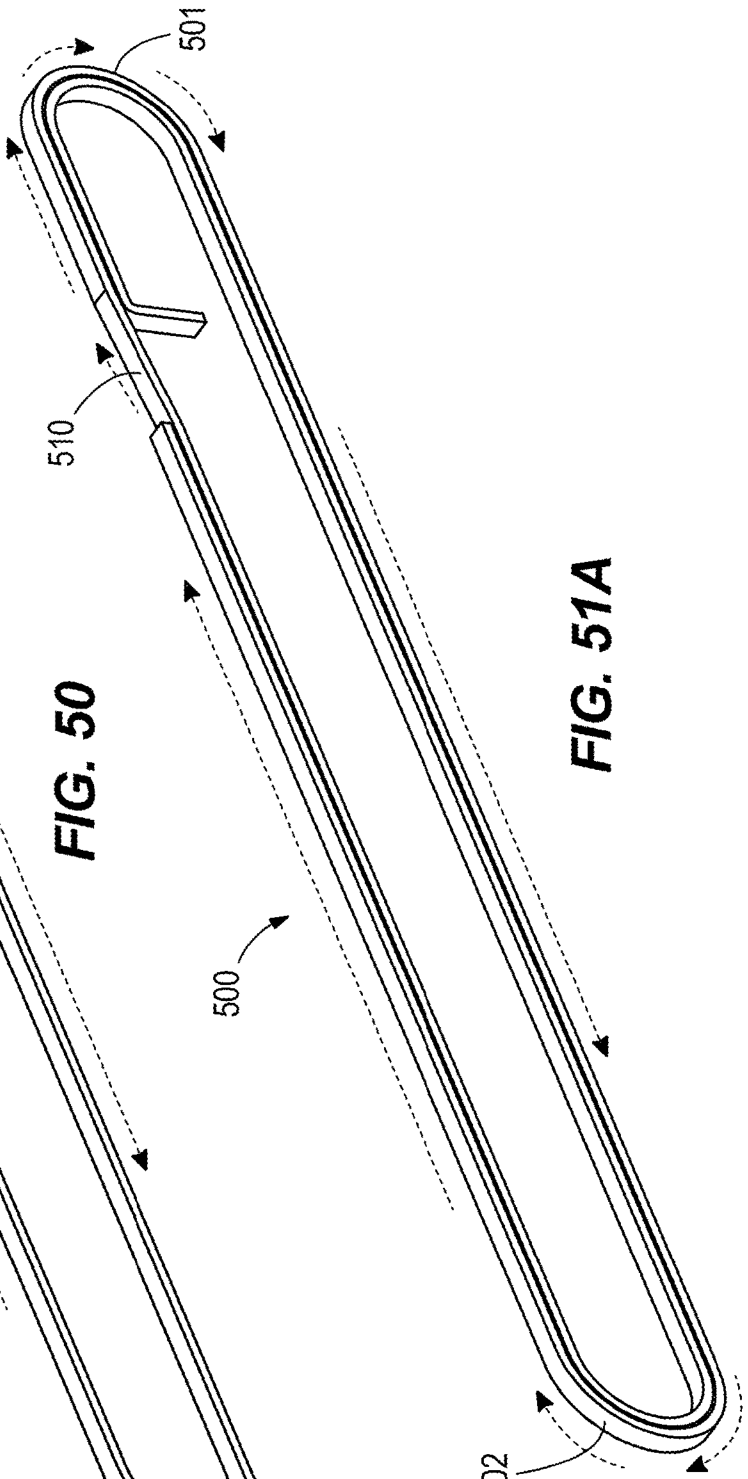
FIGS. 51A-51B illustrate a sixth step in manufacturing a Reverse-wound-double-series-stack coil.
Figure 51B:
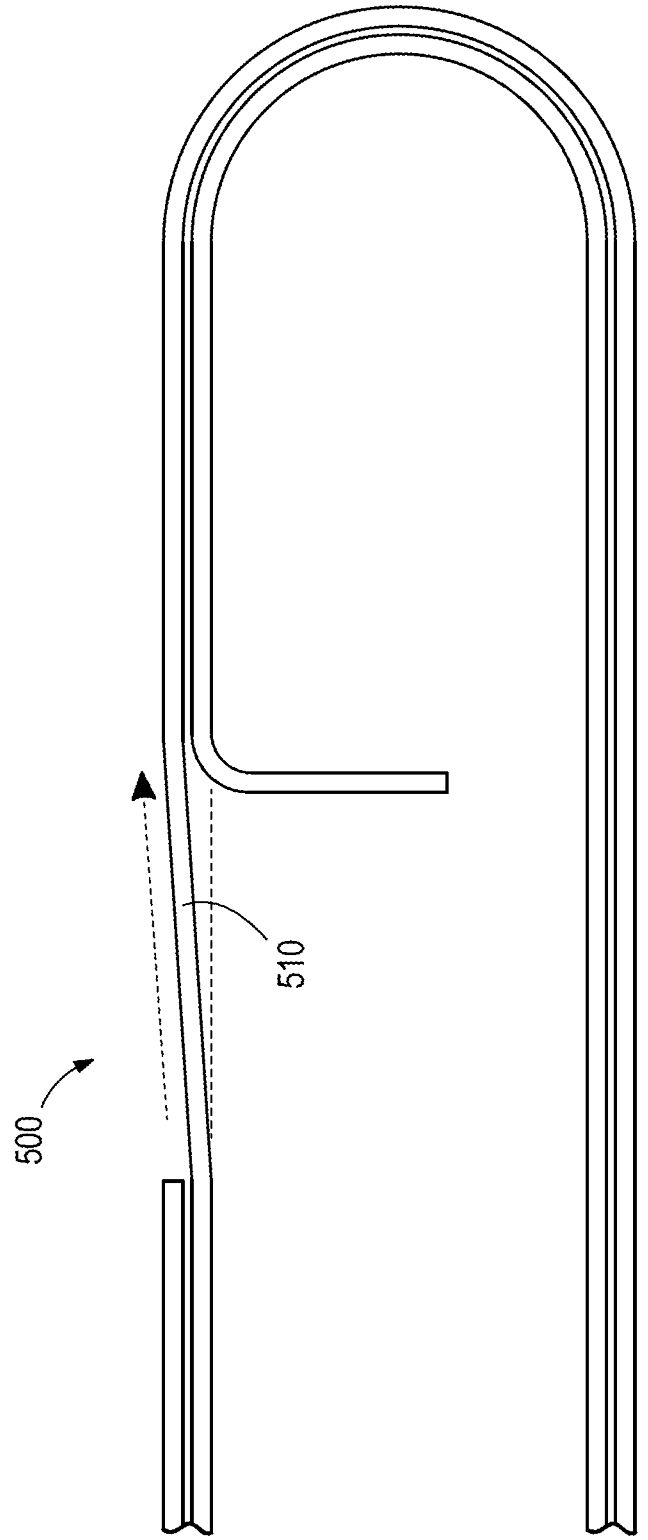

FIGS. 51A-51B illustrates the second conductor 500 following the bending illustrated in FIG. 50. In FIGS. 51A-51B, the second conductor 500 is wound slightly upwards (via ramp portion 510) to sit on top of the first turn, while still being aligned with the first turn. The second conductor 500 is then wound in a straight line to the first looping pin 502. The second conductor 500 is wound around the first looping pin 502 to form a half circle. The second conductor 500 is then wound towards the second looping pin 503 on the opposite side of the loop from the first looping pin 502. The second conductor 500 is then wound back towards the start of the loop, forming the second turn of the coil.

Figure 52:
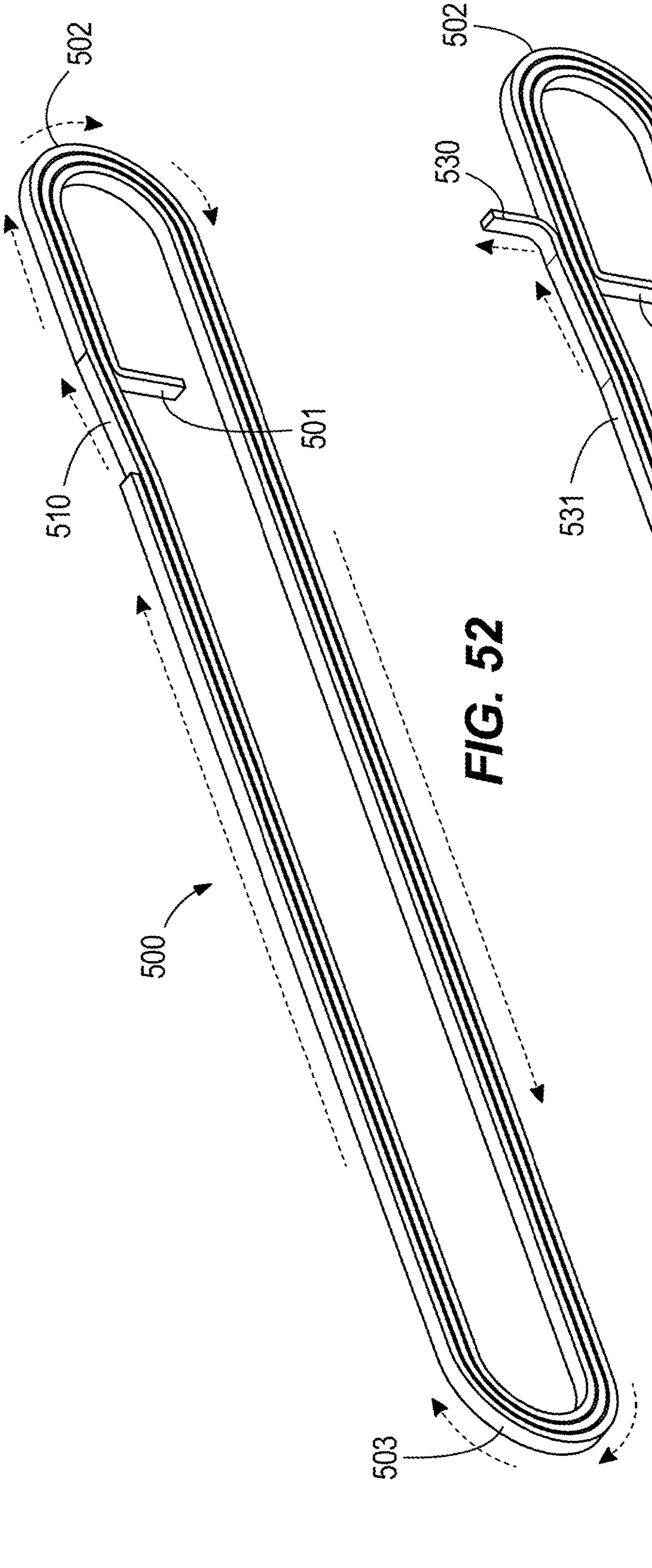
FIG. 52 illustrates a seventh step in manufacturing a Reverse-wound-double-series-stack coil.

FIG. 52 illustrates the second conductor 500 following the bending illustrated in FIGS. 51A-51B. In FIG. 52, the second conductor 500 is wound slightly upwards (via ramp portion 510) to sit on top of the second turn, while still being aligned with the first turn and the second turn. The second conductor 500 is then wound in a straight line to the first looping pin 502. The second conductor 500 is wound around the first looping pin 502 to form a half circle. The second conductor 500 is then wound towards the second looping pin 503 on the opposite side of the loop from the first looping pin 502. The second conductor 500 is then wound back towards the start of the loop, forming the third turn of the coil.

Figure 53:
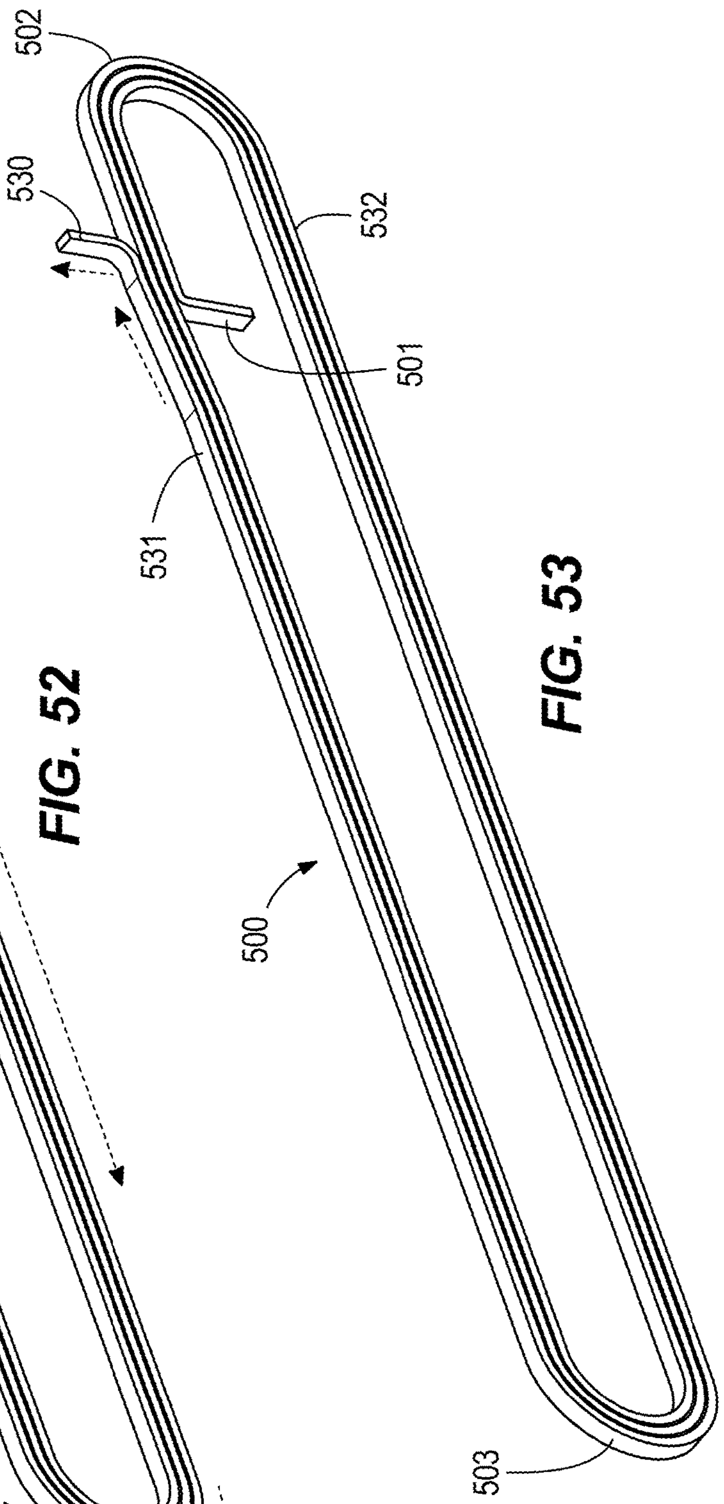
FIG. 53 illustrates an eighth step in manufacturing a Reverse-wound-double-series-stack coil.

FIG. 53 illustrates the first conductor 460 following the bending illustrated in FIG. 52. In FIG. 53, the end of the looping is bent away (at second end 530) from a first side 491 of the loop. Particularly, in the example of FIG. 53, the second end 530 is bent away from a center of the loop and in a direction opposite to the first end 501. The second end 530 may be located approximately opposite the first end 501. In other implementations, the second end 530 may extend longer, past the first end 501, as this piece may be used for the bridge connection to a second stack. In some instances, the second end 530 may be situated at a second side 532 of the loop.

Figure 54A:
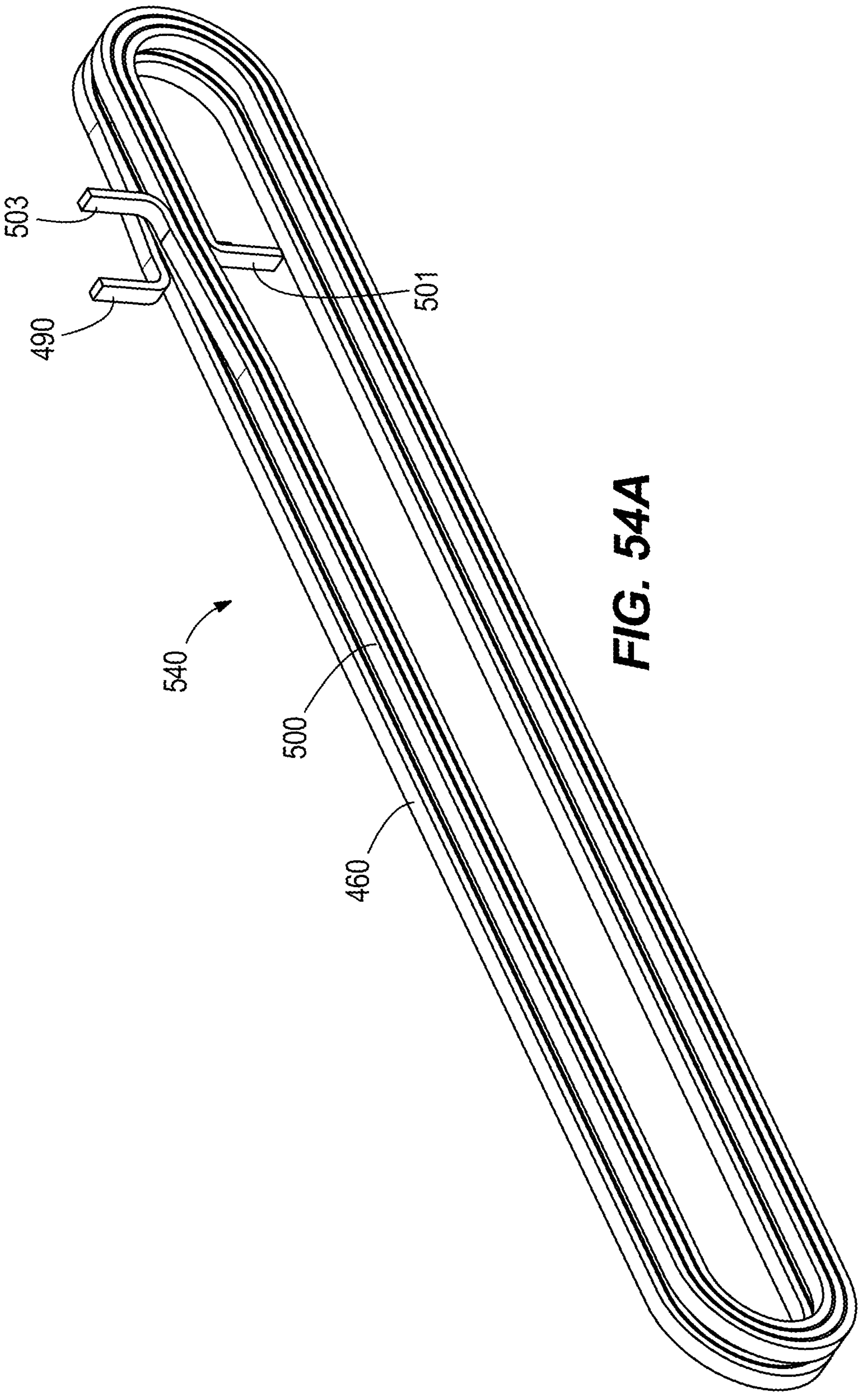
FIGS. 54A-54B illustrate a ninth step in manufacturing a Reverse-wound-double-series-stack coil.
Figure 54B:
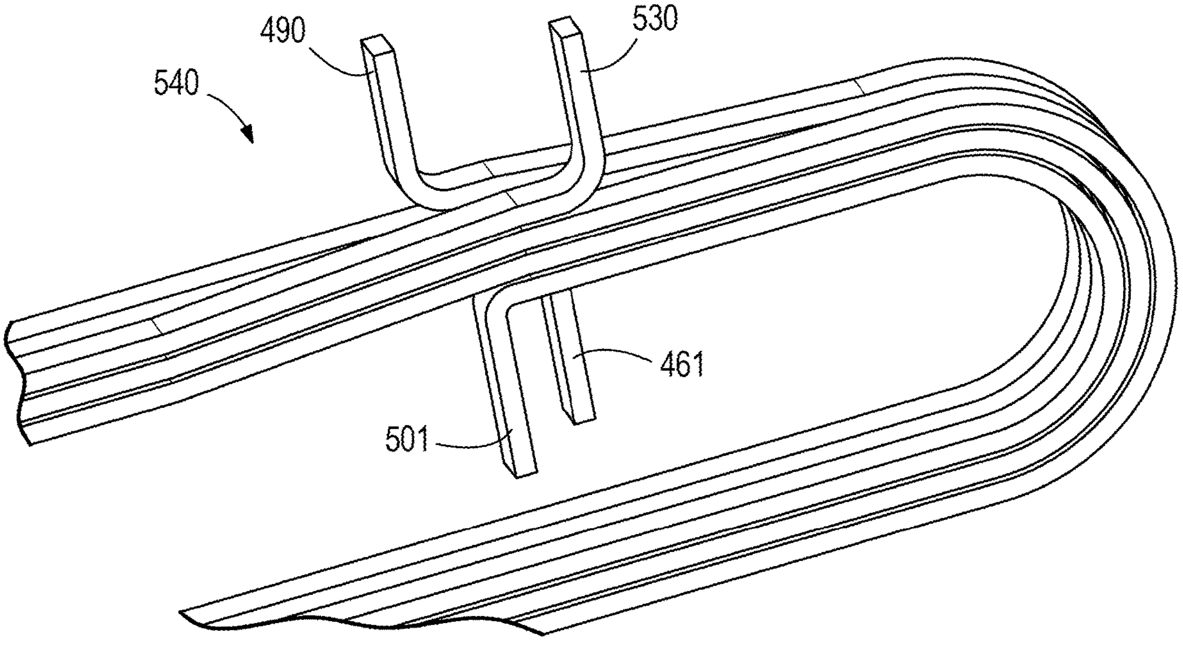

As illustrated in FIG. 54A, the first conductor 460 and the second conductor 500 collectively form a double stack 540. Some manufacturing methods may wind both the first conductor 460 and the second conductor 500 simultaneously, side by side. FIG. 54B illustrates the double stack 540 magnified for clarity.

Figure 55:
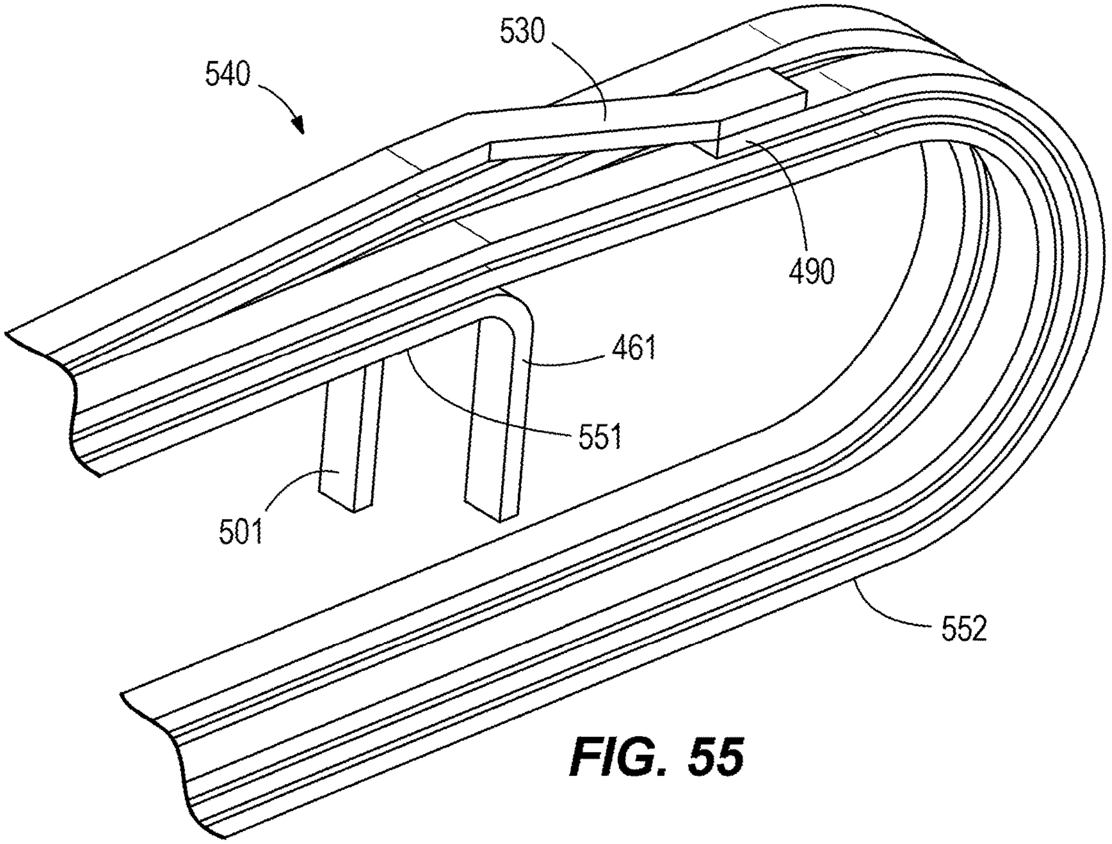
FIG. 55 illustrates a manufactured Reverse-wound-double-series-stack coil.

To achieve a series connection, the top of one stack is connected to the top of the other stack. The inter-stack connection may henceforth be referred to as a "bridge connection". The bridge connection may be made using either one of the ends of the stacks, or may be made using an additional piece of conductor. With reference to FIG. 55, the second end 530 of the second conductor 500 is bent towards the second stack to overlay the second end 490 of the first conductor 460. The first conductor 460 and the second conductor 500 are then soldered, welded, or brazed together to close the circuit between the two stacks. In some instances, the first conductor 460 and the second conductor 500 may instead be joined at a bottom 551 of the stacks by connecting the first end 461 of the first conductor 460 and the first end 501 of the second conductor 500. In other instances, the first conductor 460 and the second conductor 500 may instead be connected at an opposite side 552 of the double stack 540. The "in" and "out" leads may be adjacent, as shown in FIG. 55, or one may be routed to the opposite side 552 of the double stack 540. A cross-section of the Reverse-wound-double-series-stack coil is provided in FIG. 56.

The bridge connection needs to be insulated from the conductors in the stack. In some instances, this is achieved by insulating or taping the bridge connection instead of increasing the conductor cover (as done for the Zig-Zag-Then-Step coil and the ƐS -Then-Step-Zig-Zag). While only six total turns are provided in the example of FIG. 56, the Reverse-wound-double-series-stack coil may have twenty or more series turns. Accordingly, insulating or taping the bridge connection avoids increasing the conductor covering for this adjacent stack connection. The start and finish of the coils would then be bent and shaped into suitable positions.

Excluding the bridge connection and ignoring the stack-to-stack volt per turn, the volt per turn can be calculated in a similar manner as previously described. For the example six turn, Reverse-wound-double-series-stack coil illustrated in FIG. 56, the Simple Volt Per Turn in each coil is provided using Equation 13:

$$v_t = \frac{V_c}{t} \quad \text{[Equation 13]}$$

Where:

$V_c$=Volts per coil;

t=Number of turns in the coil; and $v_t$=Calculated Simple Volt Per Turn (in Volts).

In a parallel conductor coil, such as that shown in FIG. 3, the Maximum Volt Per Turn is exactly equal to the calculated Simple Volt Per Turn, as shown below in Equation 14:

$$V_{tmax} = v_t = \frac{V_c}{t} \quad \text{[Equation 14]}$$

Where:

$V_c$=Volts per coil;

t=Number of turns in the coil;

$v_t$=Calculated Simple Volt Per Turn (in Volts); and $V_{tmax}$=Calculated Maximum Volt Per Turn (in Volts).

Figure 56:
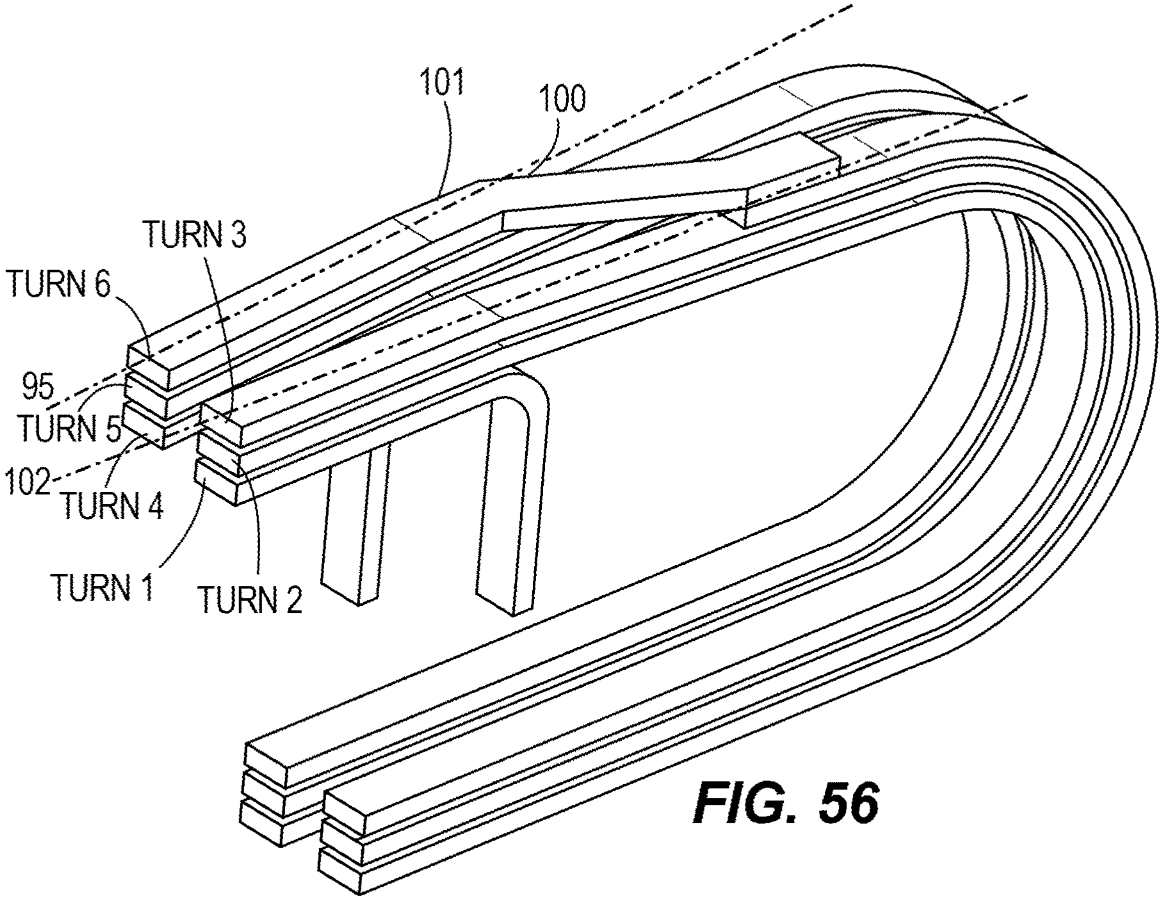
FIG. 56 illustrates a cross-sectional view of the manufactured Reverse-wound-double-series-stack coil of FIG. 55.

For series coils, the Maximum Volt Per Turn is not necessarily equal to the Simple Volt Per Turn. For example, the Maximum Volt Per Turn for the series coil of FIG. 56 is provided by Equation 15:

$$V_{tmax.rwdss} = v_{tmax} = \frac{V_c}{t} \quad \text{[Equation 15]}$$

Where:

$V_c$=Volts per coil;

t=Number of turns in the coil;

$v_t$=Calculated Simple Volt Per Turn (in Volts); and $V_{tmax.rwdss}$=Calculated Maximum Volt Per Turn for Reverse-wound-double-series-stack coil (in Volts).

Figure 57:
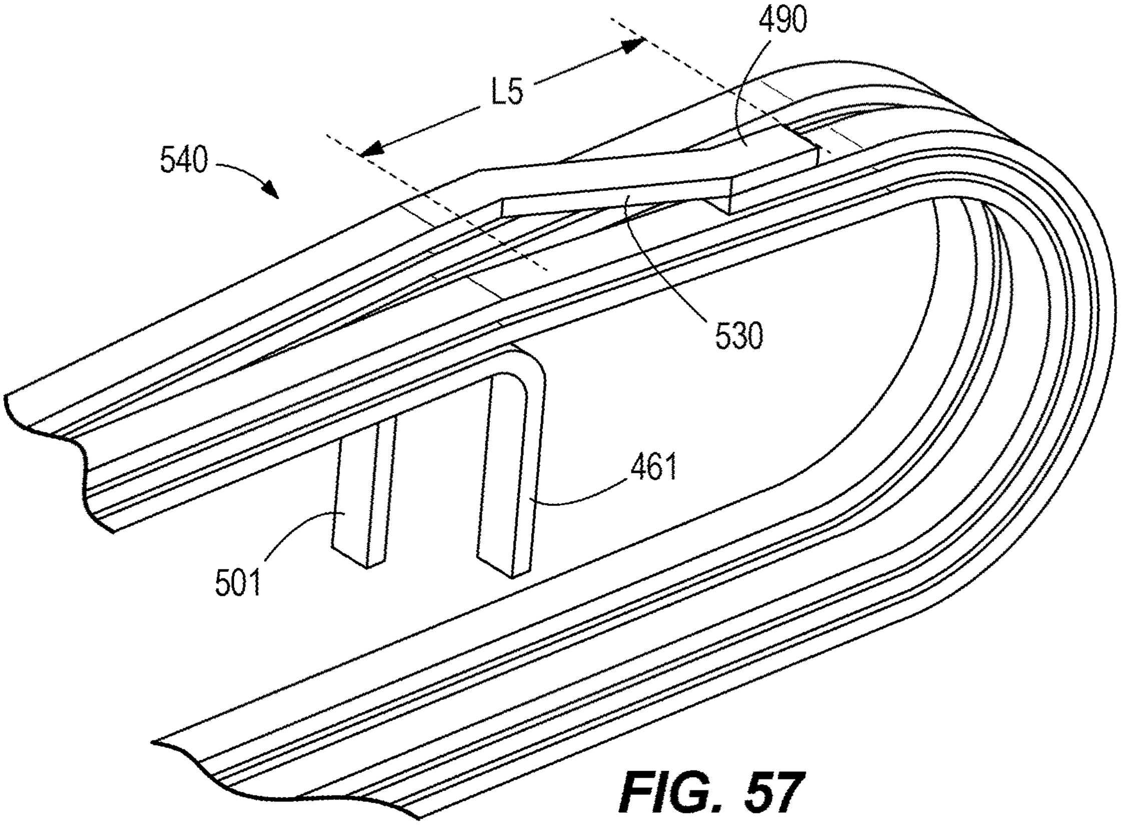
FIG. 57 illustrates a view of the manufactured Reverse-wound-double-series-stack coil of FIG. 55.
Figure 58:
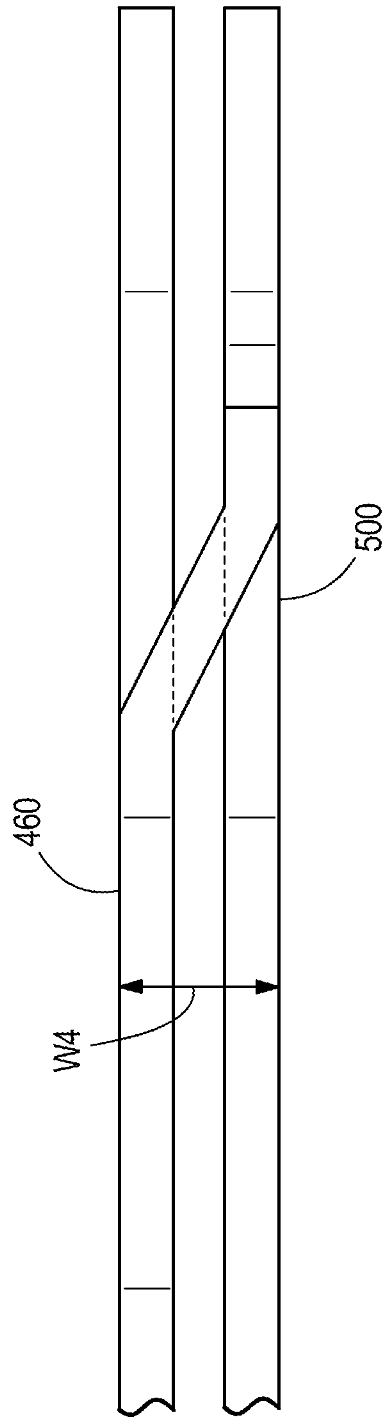
FIG. 58 illustrates a top view of the manufactured Reverse-wound-double-series-stack coil of FIG. 55.

One advantage of the Reverse-wound-double-series-stack method of manufacturing coils is that the space needed for the bridge connection is not dependent on the total number of turns. For example, FIG. 57 illustrates the length L5 representative of the length of the bridge connection. Additionally, the Reverse-wound-double-series-stack coil method of manufacturing coils also results in the bridge portion of the coil being the same width as two equivalent parallel conductor coils. FIG. 58 illustrates the Reverse-wound-double-series-stack coil having width W4.

Figure 59:
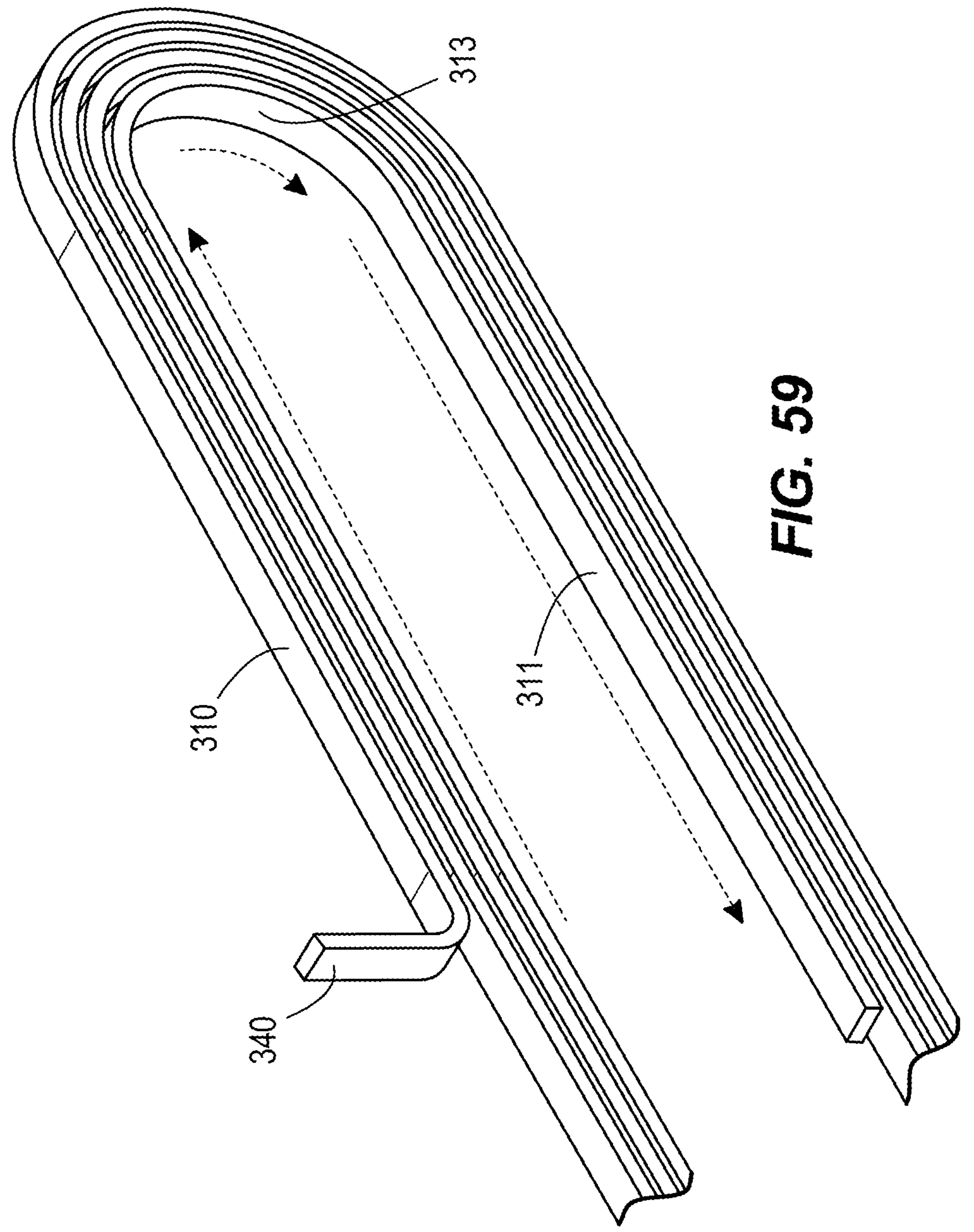
FIG. 59 illustrates a first step in the manufacturing of an Overhang-knuckle-series-bridge coil.
Figure 60:
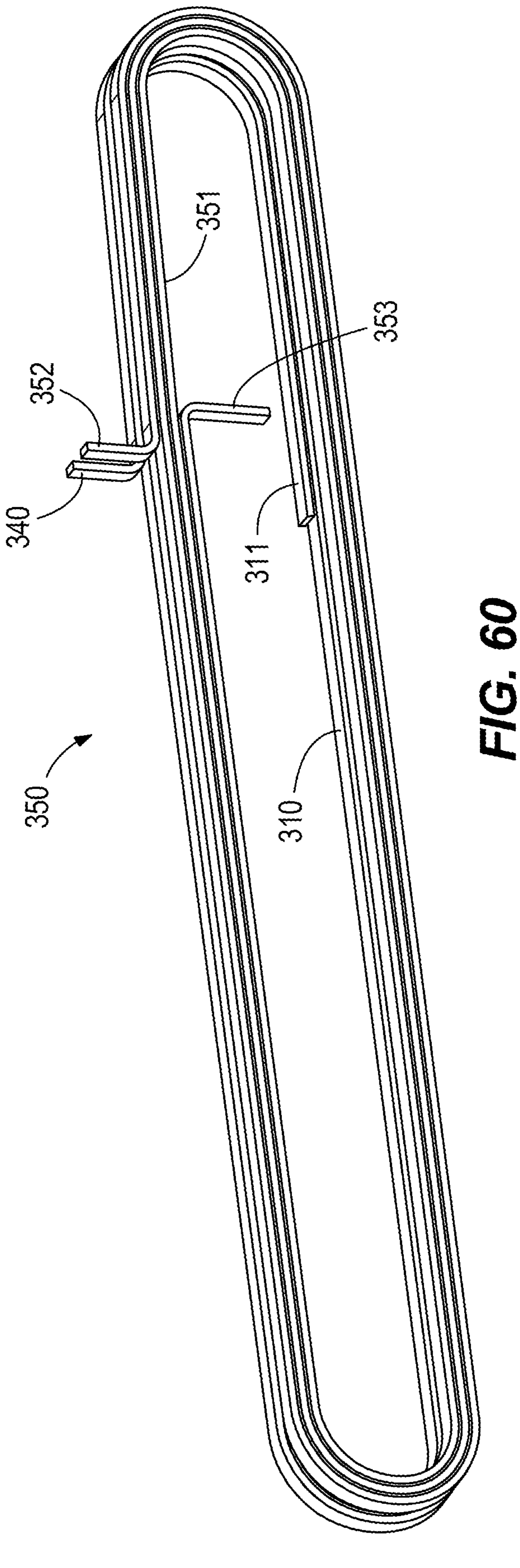
FIG. 60 illustrates a second step in the manufacturing of an Overhang-knuckle-series-bridge coil.

Returning to the double stack 350 from FIG. 35B, an alternative method of creating the bridge connection includes connecting the top of one stack to the bottom of the other stack, referred to as an "Overhang-knuckle-series-bridge" coil. For example, as shown in FIG. 59, first conductor 310 includes first end 311 and second end 340. For the Overhang-knuckle-series-bridge manufacturing method, the first end 311 and the second end 340 may be longer than in previous embodiments. The first end 311 of the first stack of the first conductor 310 is wound to the second looping pin 313 and wound on the inside of the loop to form a half circle. The first end 311 is then wound backwards towards the opposite side of the loop to approximately the position adjacent to the start of the stack. The second conductor 351 is then placed adjacent to the first conductor 310, shown in FIG. 60, to form the double stack 350. The double stack 350 includes first end 352 and second end 353.

Figure 61A:
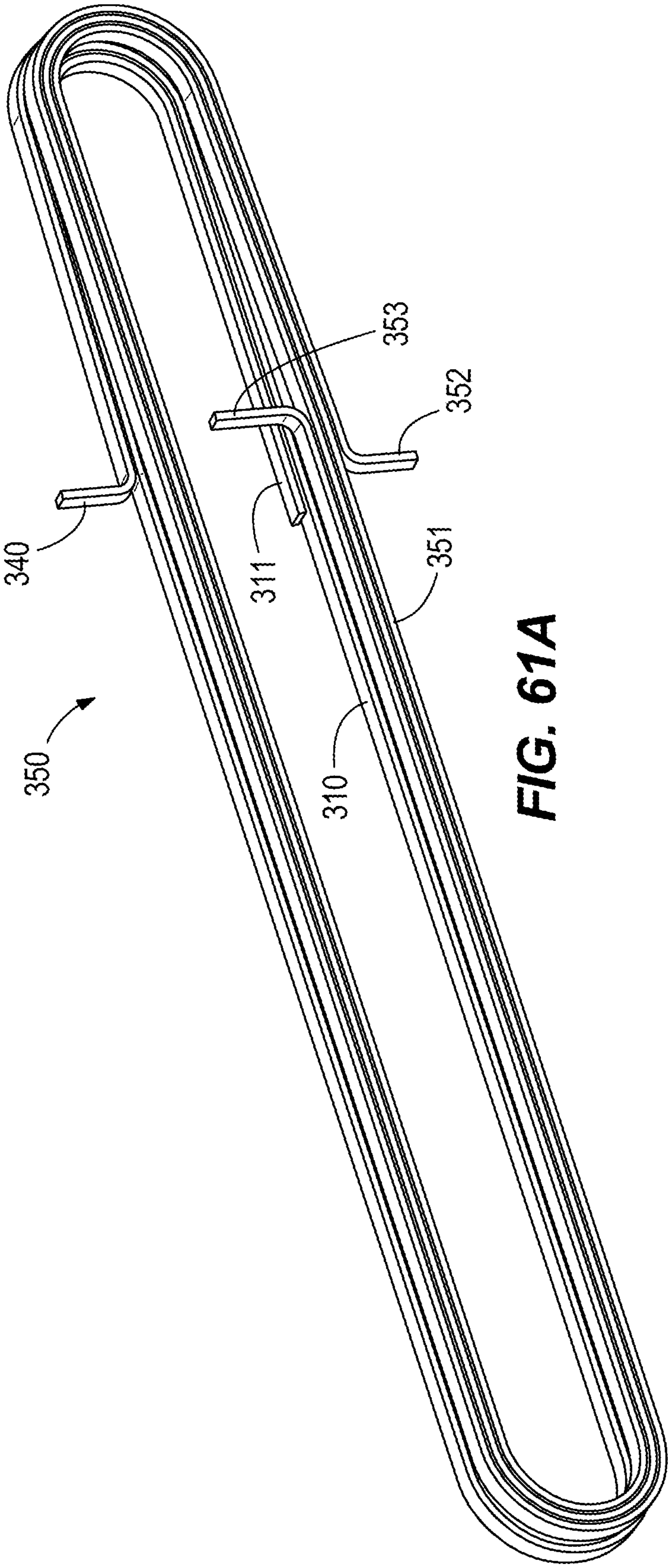
FIGS. 61A-61B illustrates a third step in the manufacturing of an Overhang-knuckle-series-bridge coil.
Figure 61B:
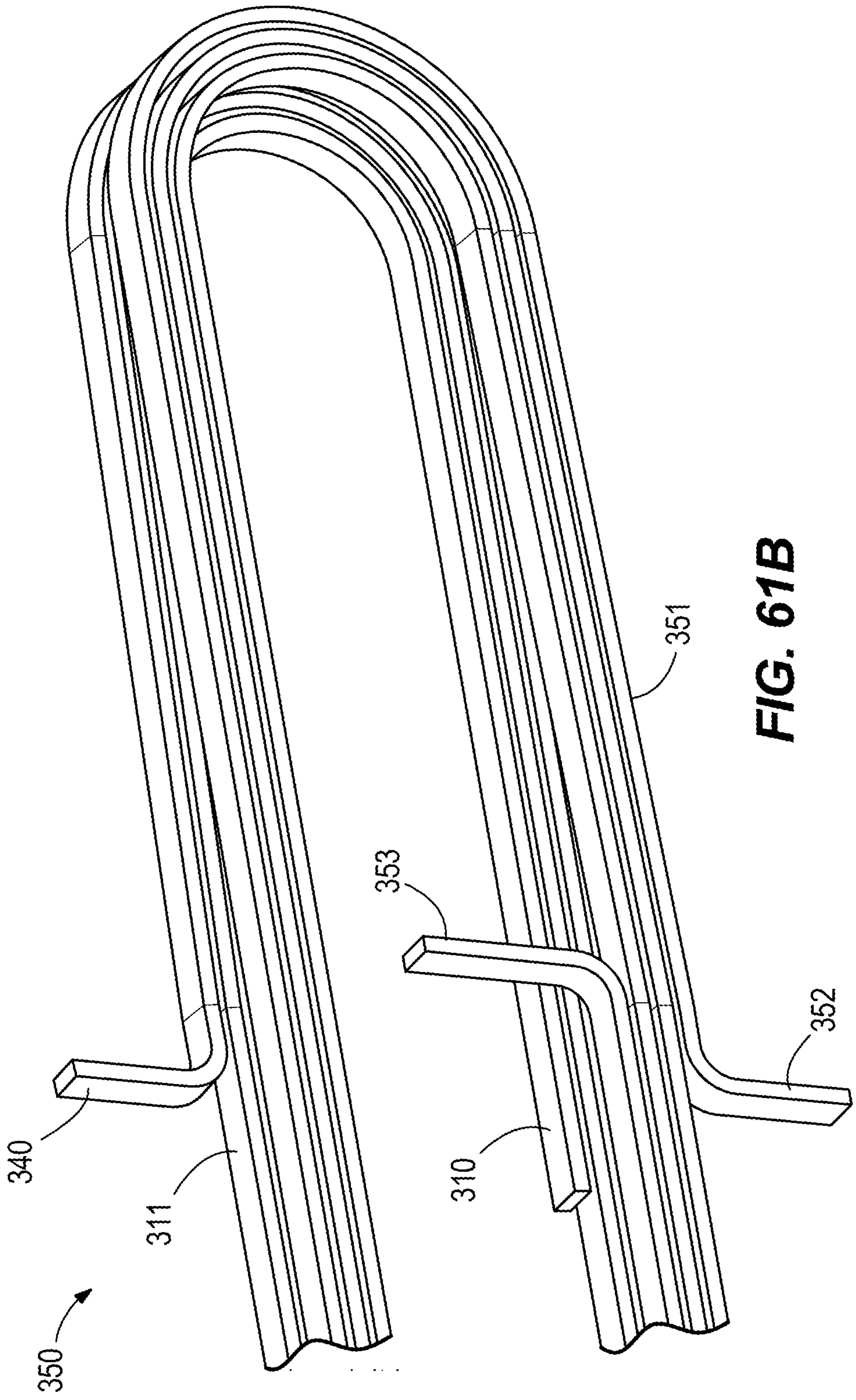
Figure 62A:
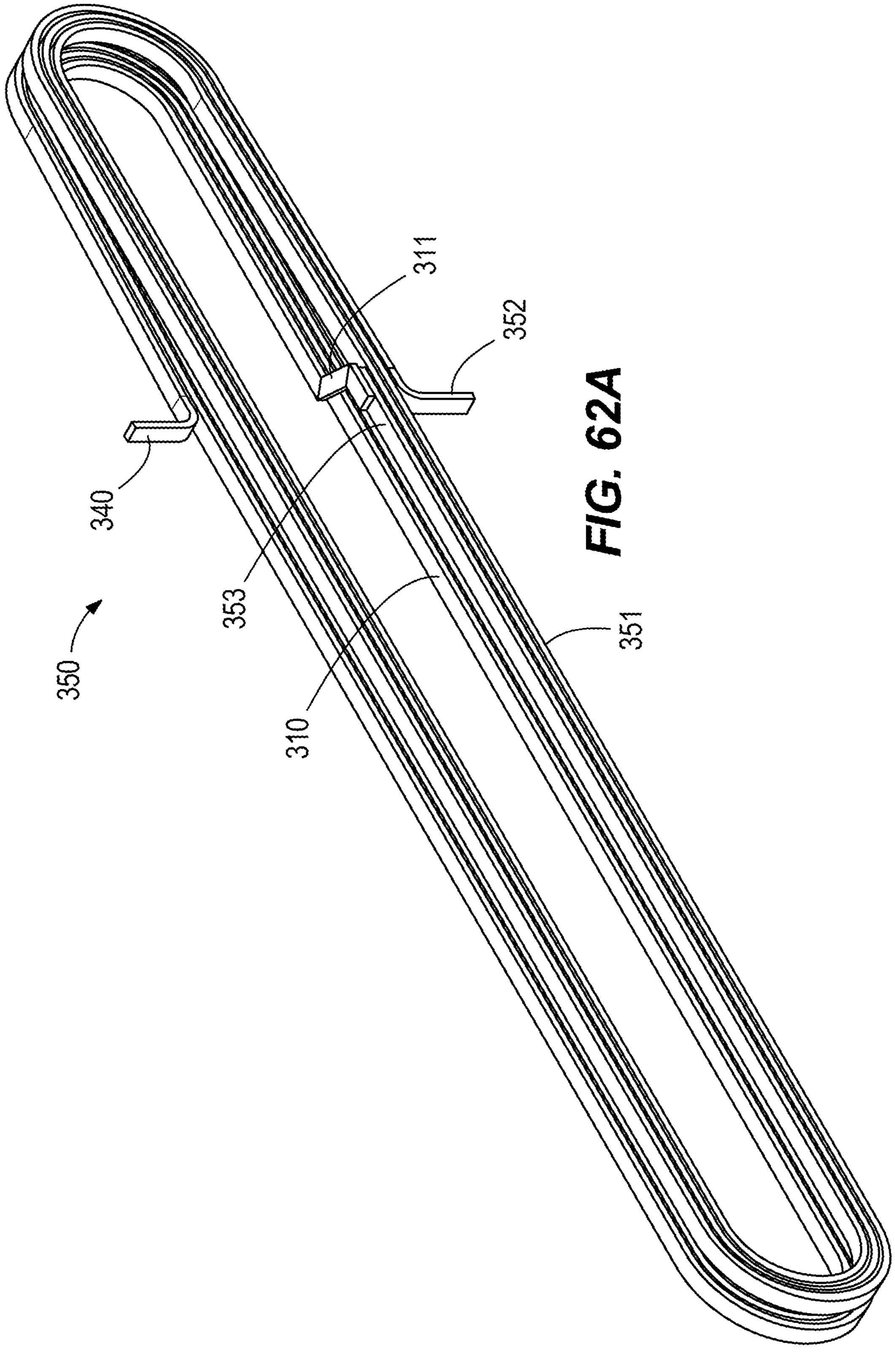
FIGS. 62A-62B illustrates a fourth step in the manufacturing of an Overhang-knuckle-series-bridge coil.
Figure 62B:
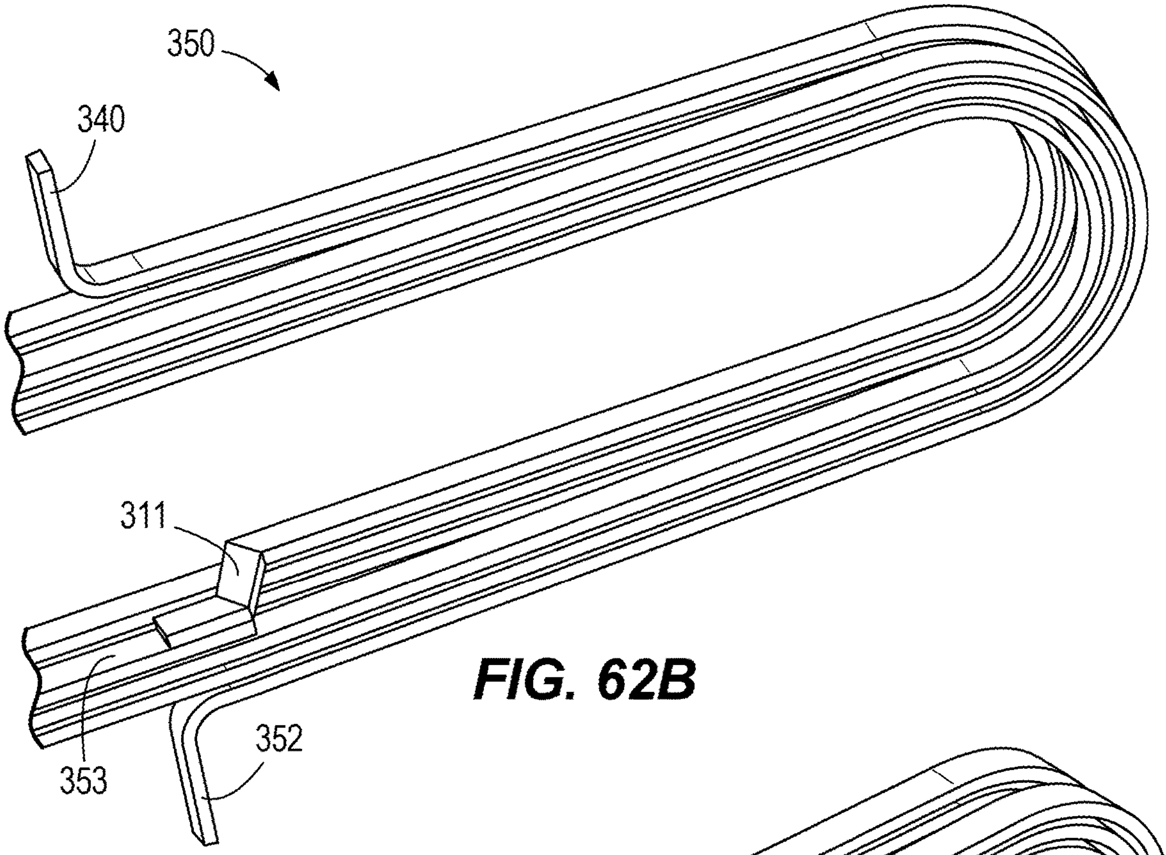

Next, the second conductor 351 is flipped over and aligned next to the first conductor 310, as shown in FIG. 61A. FIG. 61B illustrates the double stack 350 magnified for more clarity. Next, the end of one stack is connected to the beginning of the other stack, forming a bridge connection. The bridge connection may be made using one of the ends of the stacks, or could be made by using an additional piece of conductor. With reference to FIGS. 62A-62B, the first end 311 of the first conductor 310 is bent towards the second end 353 of the second conductor 351 to overlay the first conductor 310 on the second conductor 351. In some instances, to achieve the bridge connection, the second end 353 of the second conductor 351 is flattened onto the fourth turn. The first conductor 310 and the second conductor 351 are then soldered, welded, or brazed together to close the circuit between the stacks.

In another embodiment of forming the bridge connection, the inner or outer turn of the first conductor 310 may be extended around and connected to the flipped-over inner or outer stack of the second conductor 351. In another embodiment, the inner or outer turn from the second conductor 351 can be extended around and connected to the flipped-over inner or outer turn of the first conductor 310. The coil leads "in" and "out" may also be adjusted for a given coil and winding (i.e., to enter and exit the coil either adjacent or separate at the top or bottom, inside or outside of either of the stacks). A cross-section of the Overhang-knuckle-series-bridge coil is provided in FIG. 63.

The bridge connection needs to be insulated from the conductors in the stack. In some instances, this is achieved by insulating or taping the bridge connection instead of increasing the conductor cover (as done for the Zig-Zag-Then-Step coil and the ƐS -Then-Step-Zig-Zag). While only six total turns are provided in the example of FIG. 63, the Overhang-knuckle-series-bridge coil may have twenty or more series turns. Accordingly, insulating or taping the bridge connection avoids increasing the conductor covering for this adjacent stack connection. The start and finish of the coils would then be bent and shaped into suitable positions.

Excluding the bridge connection and ignoring the stack-to-stack volt per turn, the volt per turn can be calculated in a similar manner as previously described. For the example six turn, Overhang-knuckle-series-bridge coil illustrated in FIG. 63, the Simple Volt Per Turn in each coil is provided using Equation 16:

$$v_t = \frac{V_c}{t} \qquad \text{[Equation 16]}$$

Where:

$V_c$=Volts per coil;

t=Number of turns in the coil; and $v_t$=Calculated Simple Volt Per Turn (in Volts).

In a parallel conductor coil, such as that shown in FIG. 3, the Maximum Volt Per Turn is exactly equal to the calculated Simple Volt Per Turn, as shown below in Equation 17:

$$V_{tmax} = v_t = \frac{V_c}{t} \qquad \text{[Equation 17]}$$

Where:

$V_c$=Volts per coil;

t=Number of turns in the coil;

$v_t$=Calculated Simple Volt Per Turn (in Volts); and $V_{tmax}$=Calculated Maximum Volt Per Turn (in Volts).

Figure 63:
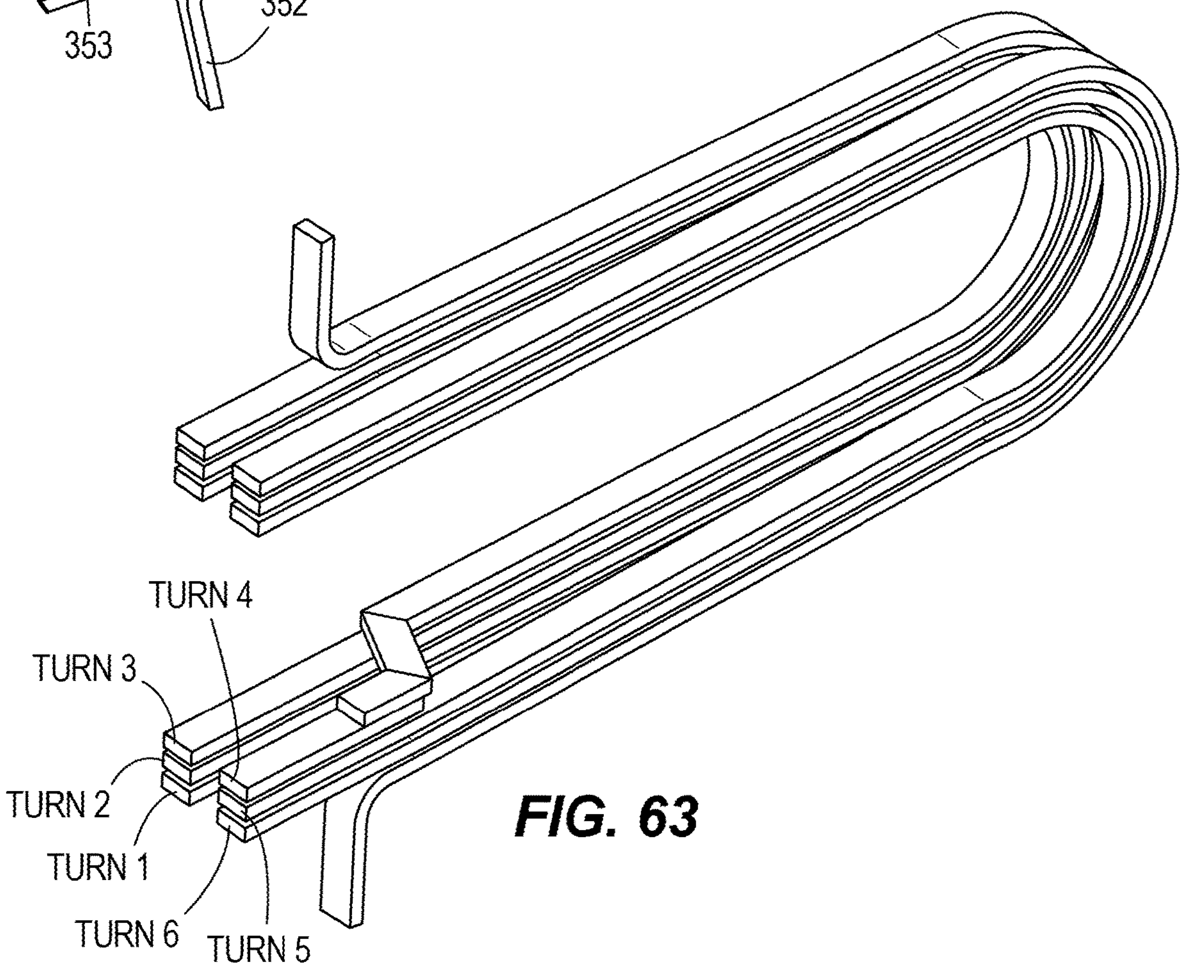
FIG. 63 illustrates a cross-sectional view of a manufactured Overhang-knuckle-series-bridge coil.

For series coils, the Maximum Volt Per Turn is not necessarily equal to the Simple Volt Per Turn. For example, the Maximum Volt Per Turn for the series coil of FIG. 63 is provided by Equation 18:

$$V_{tmax.oksb} = v_{tmax} = \frac{V_c}{t} \qquad \text{[Equation 18]}$$

Where:

$V_c$=Volts per coil;

t=Number of turns in the coil;

$v_t$=Calculated Simple Volt Per Turn (in Volts); and $V_{tmax.oksb}$=Calculated Maximum Volt Per Turn for Overhang-knuckle-series-bridge coil (in Volts).

Figure 64:
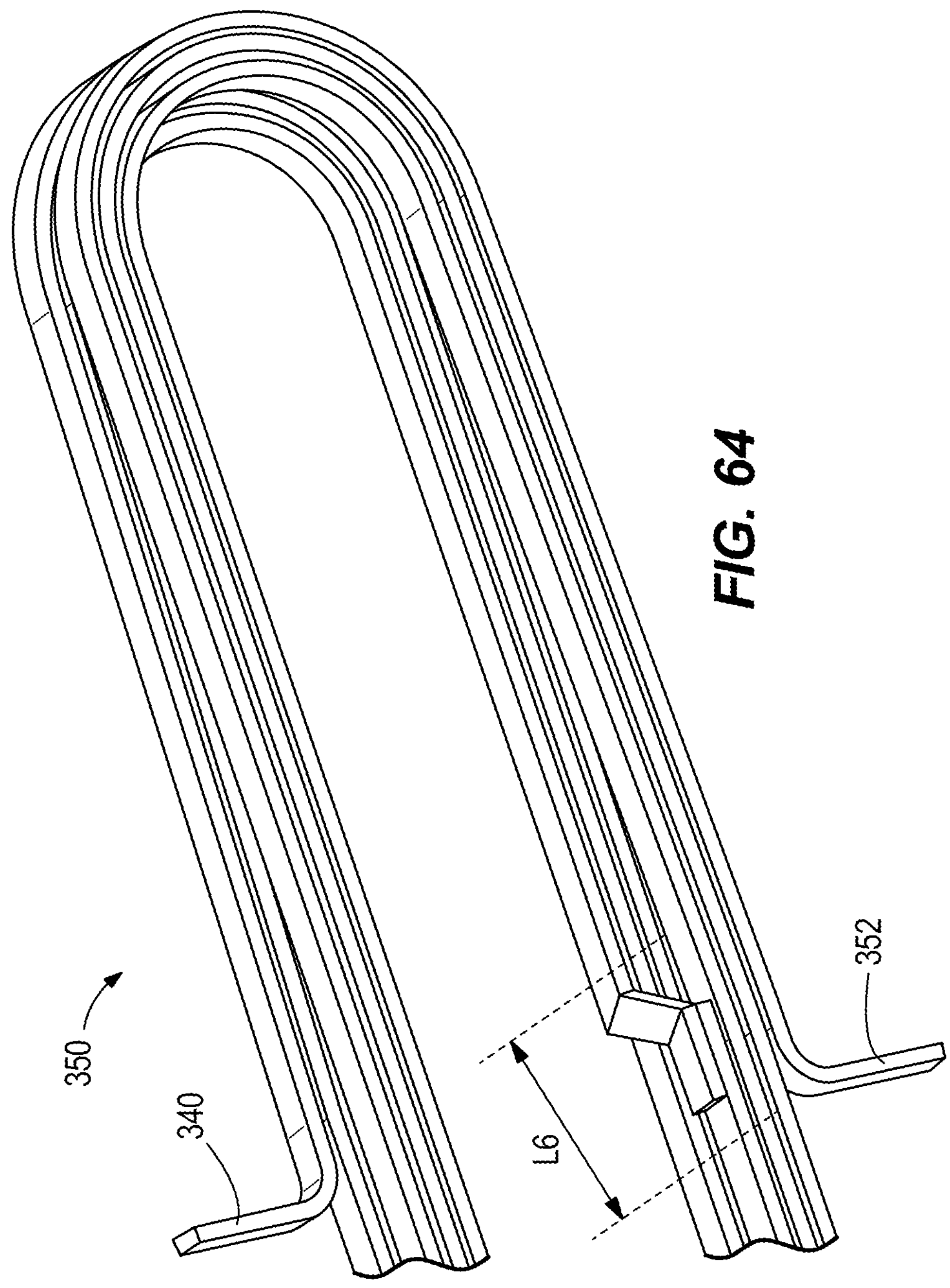
FIG. 64 illustrates a perspective view of a manufactured Overhang-knuckle-series-bridge coil.
Figure 65:
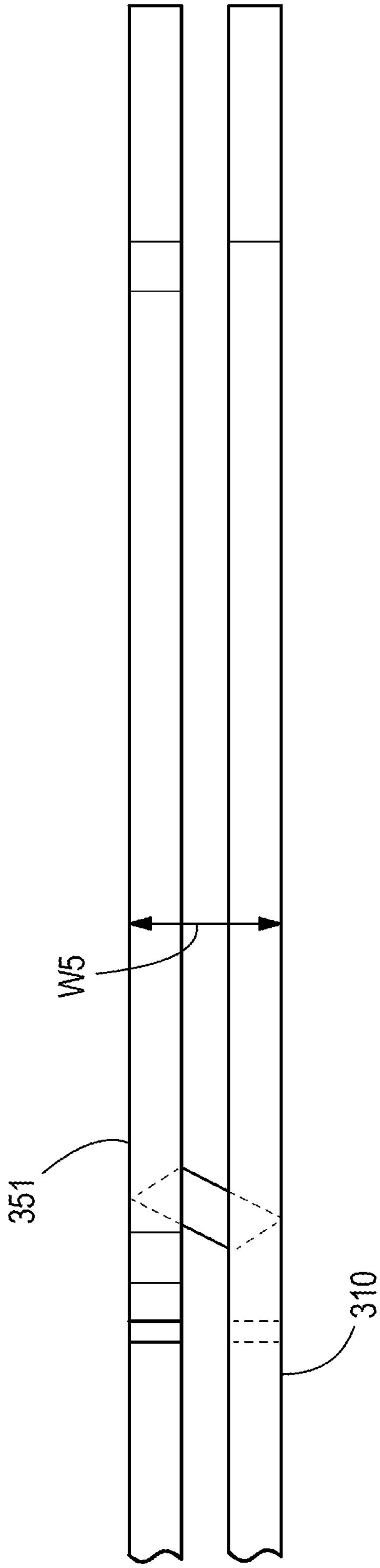
FIG. 65 illustrates a top view of the manufactured Overhang-knuckle-series-bridge coil of FIG. 64.

One advantage of the Overhang-knuckle-series-bridge method of manufacturing coils is that the space needed for the bridge connection is not dependent on the total number of turns. For example, FIG. 64 illustrates the length L6 representative of the length of the bridge connection. Additionally, the Overhang-knuckle-series-bridge coil method of manufacturing coils also results in the bridge portion of the coil being the same width as two equivalent parallel conductor coils. FIG. 65 illustrates the Overhang-knuckle-series-bridge coil having width W5.

Figure 66:
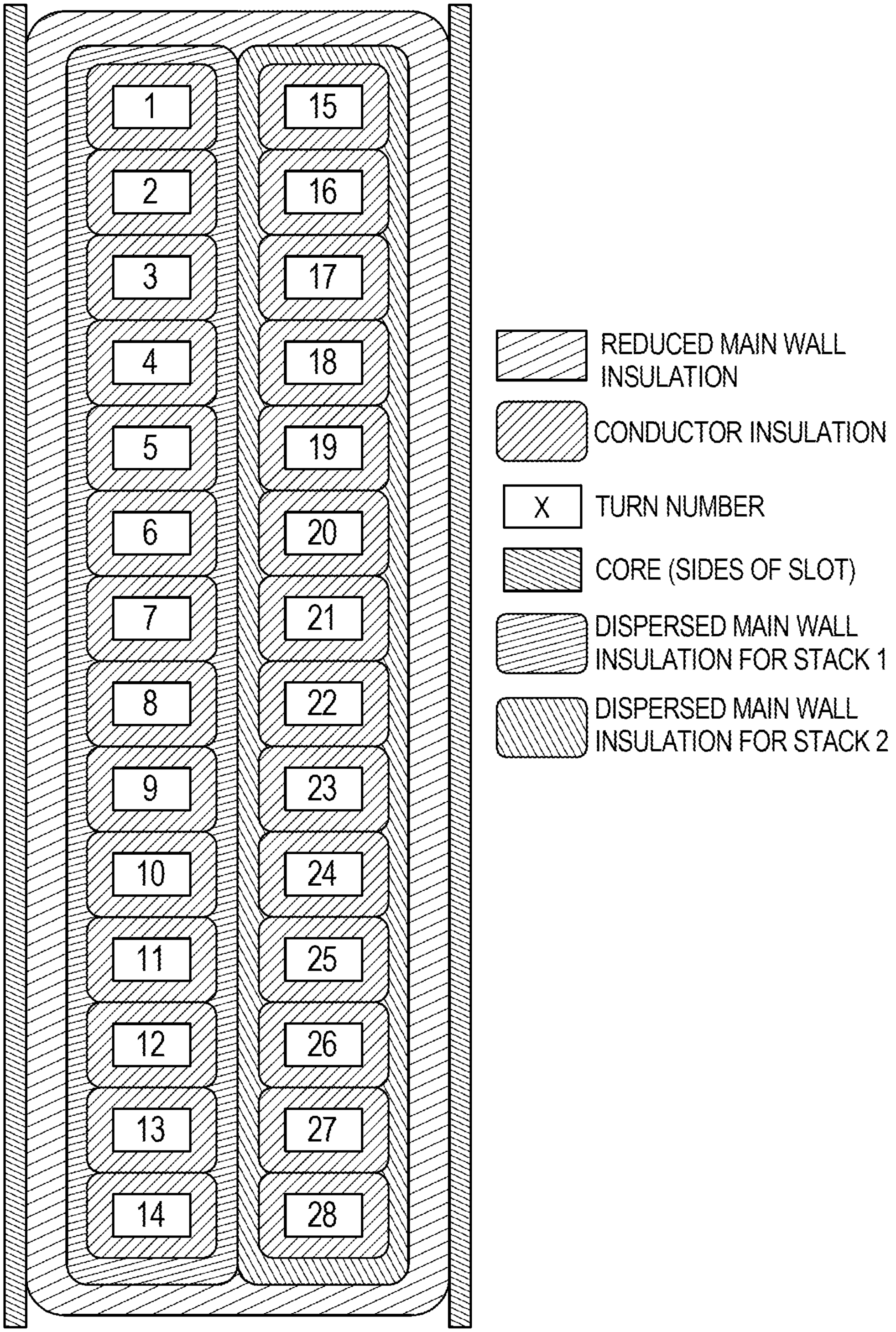
FIG. 66 illustrates a cross-sectional view of a twenty-eight turn coil, according to one embodiment.

Next, main wall insulation is provided to address the high turn to turn voltages between the different stacks. As previously described, the traditional method of manufacturing coils insulated the combined stack with a number of layers dependent on the required voltage insulation. In embodiments described herein, some layers of the main wall insulation are used to insulate each stack individually. Next, the remaining layers of tape are taped around the combined stack, as shown in FIG. 66. The main wall insulation may have a sufficient thickness comprised of a sufficient number of layers of tape to withstand the stator/rotor voltage for long term reliability.

Equation 19 provides the minimum main wall insulation thickness:

$$th_{min.main.wall} = \frac{V_{phase}}{Vt_{max}} \quad \text{[Equation 19]}$$

Where:

$th_{min.main.wall}$=Minimum main wall insulation thickness;

$V_{phase}$=Phase voltage of winding; and $Vt_{max}$=Maximum allowed voltage per unit of measure thickness.

In some embodiments, $Vt_{max}$ is 2500 V/mm. In such an embodiment, for a 13800 V machine with a phase voltage of 7967 V, the minimum main wall insulation is 3.19 mm (or 125.5 mil). In an embodiment where $Vt_{max}$ is 3000 V/mm, for a 13800 V machine with a phase voltage of 7967 V, the minimum main wall insulation is 2.66 mm (or 104.6 mil).

In some instances, the insulation may be taped with a 50% overlap (also referred to as a half lap). The number of layers of tape can thus be calculated with Equation 20:

$$la_{main.wall} = \left[\frac{th_{min.main.wall}}{th_{tape}} \cdot \frac{1}{1-lap}\right] \quad \text{[Equation 20]}$$

Where:

$th_{min.main.wall}$=Minimum main wall insulation thickness;

$la_{main.wall}$=Number of layers of tape;

$th_{tape}$=Thickness of tape; and lap=Overlap % of tape.

As one example, for a 13800 V machine with a phase voltage of 7967 V, where $Vt_{max}$ is 2500 V/mm, the minimum main wall insulation is 3.19 mm (or 125.5 mil). If the main wall insulation is taped with a 50% lap of 6 mil tape, 11 layers of tape are required. In contrast, the distributed main wall insulation portion is not dependent on the machine voltage, but the simple turn voltage ($v_t$) (previously calculated in Equation 1). For example, Equation 21 provides the minimum distributed main wall insulation:

$$th_{min.dist.main.wall} = \frac{V_t}{Vt2_{max}} \quad \text{[Equation 21]}$$

Where:

$th_{min.dist.main.wall}$=Minimum distributed main wall insulation thickness;

$V_t$=Simple turn voltage; and $Vt2_{max}$=Maximum allowed voltage per unit of measure thickness. A different material may be used for the distributed main wall insulation that the rest of the main wall insulation.

For a $Vt2_{max}$ value of 1000 V/mm, and a machine with a simple volt per turn of 100 V, the minimum main wall insulation is 0.1 mm. In cases with insulation tape with a 50% overlap, the number of layers of distributed main wall tape is calculated with Equation 22:

$$la_{dist.main.wall} = \left[\frac{th_{dist.min.main.wall}}{th_{tape}} \cdot \frac{1}{1-lap}\right] \quad \text{[Equation 22]}$$

Where:

$th_{dist.min.main.wall}$=Minimum distributed main wall insulation thickness;

$la_{dist.main.wall}$=Number of layers of tape;

$th_{tape}$=Thickness of tape; and lap=Overlap % of tape.

For example, for a machine with a simple volt per turn of 100 V, a minimum main wall insulation of 0.1 mm, and a distributed main wall insulation taped with a 50% lap of 0.1 mm thick tape, 1 layer of tape will be required. The practical thickness of the distributed main wall insulation is provided by Equation 23:

$$th_{actual.dist.main.wall} = la_{dist.main.wall} \cdot th_{tape}\left(\frac{1}{1-lap}\right) \quad \text{[Equation 23]}$$

Thus, the main wall tape thickness can be reduced by the thickness of the distributed main wall insulation, and thus fewer layers of main wall tape are applied. This has advantages to the configuration of the inter-stack connections that can be used, as the maximum volt per turn will remain equal to the simple volt per turn, reducing the need for thicker or different material additional turn insulation applied to each turn. The total main wall insulation thus remains constant on all sides of the stacks, ensuring sufficient insulation for the required voltage class, with only the additional tape in-between needed for the stack-to-stack voltages.

To keep the final coil shape rectangular, the stack heights of each stack are kept close to identical. Accordingly, in the Zig-Zag-Then-Step and ƐS-Then-Step-Zig-Zag manufacturing methods, the conductor sizes and number of turns per stack may be equal. However, as a result, the number of turns per coil are an equal number. When designing the motor and generator, the number of turns is one of the determining factors of the flux density in the core, teeth, air gap, and the like. These influence the overall performance of the design. Having only an equal number of turns available for selection may limit the design configurations that can be manufactured.

One example motor has design constraints of 564.6 hp, 6900 V, 4 pole, 50 Hz, 80 Kelvin temperature rise, starting current maximum of 6.00 pu (=600%), starting torque of at least 1.00 pu (=100%), pull out torque of at least 1.85 pu (=185%), and flux densities in any part of the core not to exceed 1.6 T. Using coils that can only have equal number of turns, the maximum rating of this frame size is 544.5 hp, while adhering to the design constraints. Table 5 provides performance data of such an example motor with 22 turns per coil.

TABLE 5

| Performance Data of Example Motor With 22 Turns Per Coil | |
|---|---|
| Winding design | |
| Turns per coil | 22 |

TABLE 5-continued

| Performance Data of Example Motor With 22 Turns Per Coil | | | |
|---|---|---|---|
| Performance values | | | |
| Description | | Value | Unit |
| Power | | 544.5 | hp |
| Voltage | | 6900 | V |
| Current | Full Load | 39.8 | A |
| | Starting | 6.00 | pu |
| | | 238.8 | A |
| Efficiency | | 95.59% | |
| Power Factor | | 0.894 | |
| Frequency | | 50 | Hz |
| Temperature rise | | 80 | K |
| Speed | | 1484.29 | rpm |
| Torque | Full load | 2612.0 | Nm |
| | Starting | 1.07 | pu |
| | | 2794.9 | Nm |
| | Pull out | 1.88 | pu |
| | | 4910.6 | Nm |
| Flux density | Back of core | 1.191 | T |
| | Bottom of slot | 0.832 | T |
| | Teeth | 1.163 | T |
| | Top of slot | 1.520 | T |
| | Bridge | 1.307 | T |
| | Air gap | 0.636 | T |

Calculations decreasing the turns in Table 5 to the next lower equal number (20 turns) are provided in Table 6. A motor having 20 turns per coil with the same design constraints is unable to achieve the desired performance. Although the output power rating may be achieved, the starting current exceeds the requirements by more than 10% and the stator core is saturing, as the top of slot flux density exceeds 1.6 T. To correct this, a larger frame size may need to be implemented.

TABLE 6

| Performance Data of Example Motor With 20 Turns Per Coil | | | |
|---|---|---|---|
| Winding design | | | |
| Turns per coil | | 20 | |
| Performance values | | | |
| Description | | Value | Unit |
| Power | | 564.6 | hp |
| Voltage | | 6900 | V |
| Current | Full Load | 41.6 | A |
| | Starting | 6.63 | pu |
| | | 275.8 | A |
| Efficiency | | 95.97% | |
| Power Factor | | 0.881 | |
| Frequency | | 50 | Hz |
| Temperature rise | | 74 | K |
| Speed | | 1486.80 | rpm |
| Torque | Full load | 2704.0 | Nm |
| | Starting | 1.13 | pu |
| | | 3055.5 | Nm |
| | Pull out | 2.05 | pu |
| | | 5543.1 | Nm |
| Flux density | Back of core | 1.320 | T |
| | Bottom of slot | 0.913 | T |
| | Teeth | 1.276 | T |
| | Top of slot | 1.667 | T |
| | Bridge | 1.433 | T |
| | Air gap | 0.705 | T |

However, the Double-series-stack-top-to-bottom-bridge, the Reverse-wound-double-series-stack, and the Overhang-knuckle-series-bridge Manufacturing methods allow for using an odd number of turns. Table 7 provides an example motor including 21 turns per coil and having the same design restrictions as previously listed. As shown in Table 7, the example motor meets the design requirements while maintaining the same frame size.

TABLE 7

| Performance Data of Example Motor With 21 Turns Per Coil | | | |
|---|---|---|---|
| Winding design | | | |
| Turns per coil | | 21 | |
| Performance values | | | |
| Description | | Value | Unit |
| Power | | 564.6 | hp |
| Voltage | | 6900 | V |
| Current | Full Load | 41.6 | A |
| | Starting | 6.00 | pu |
| | | 249.6 | A |
| Efficiency | | 95.71% | |
| Power Factor | | 0.885 | |
| Frequency | | 50 | Hz |
| Temperature rise | | 80 | K |
| Speed | | 1485.17 | rpm |
| Torque | Full load | 2706.9 | Nm |
| | Starting | 1.02 | pu |
| | | 2761.1 | Nm |
| | Pull out | 1.86 | pu |
| | | 5034.9 | Nm |
| Flux density | Back of core | 1.249 | T |
| | Bottom of slot | 0.873 | T |
| | Teeth | 1.220 | T |
| | Top of slot | 1.594 | T |
| | Bridge | 1.370 | T |
| | Air gap | 0.667 | T |

However, to maintain the coil as a rectangular section, the number of turns per coil in one stack can not be reduced and does not provide an executable coil. Rather, an odd number of turns may be achieved by adjusting the conductor size of the second stack to maintain the original conductor cross sectional area, while adhering to the total stack height required to match the first stack, as provided below in Equations 24, 25, and 26.

$$A_{conductor} = w_{stack1} \cdot h_{stack1} = w_{stack2} \cdot h_{stack2} \quad \text{[Equation 24]}$$

Where:

$A_{conductor}$=Area of the conductor;

$w_{stack1}$=Width of conductor in stack 1;

$h_{stack1}$=Height (or thickness) of conductor in stack 1;

$w_{stack2}$=Width of conductor in stack 2; and $h_{stack2}$=Height (or thickness) of conductor in stack 2.

$$H_{stack} = t_{stack1} \cdot (h_{stack1} + 2 \cdot c_{conductor}) = t_{stack2} \cdot (h_{stack2} + 2 \cdot c_{conductor}) \quad \text{[Equation 25]}$$

Where:

$H_{stack}$=Height of the stack (not including dispersed main wall insulation);

$t_{stack1}$=number of turns in stack 1;

$h_{stack1}$=Height (or thickness) of conductor in stack 1;

$C_{conductor}$=Thickness of conductor covering per side;

$t_{stack2}$=number of turns in stack 2; and $h_{stack2}$=Height (or thickness) of conductor in stack 2.

$$t_{stack2} = t_{stack1} - 1 \quad \text{[Equation 26]}$$

Where:

$t_{stack1}$=number of turns in stack 1; and $t_{stack2}$=number of turns in stack 2.

Figure 67:
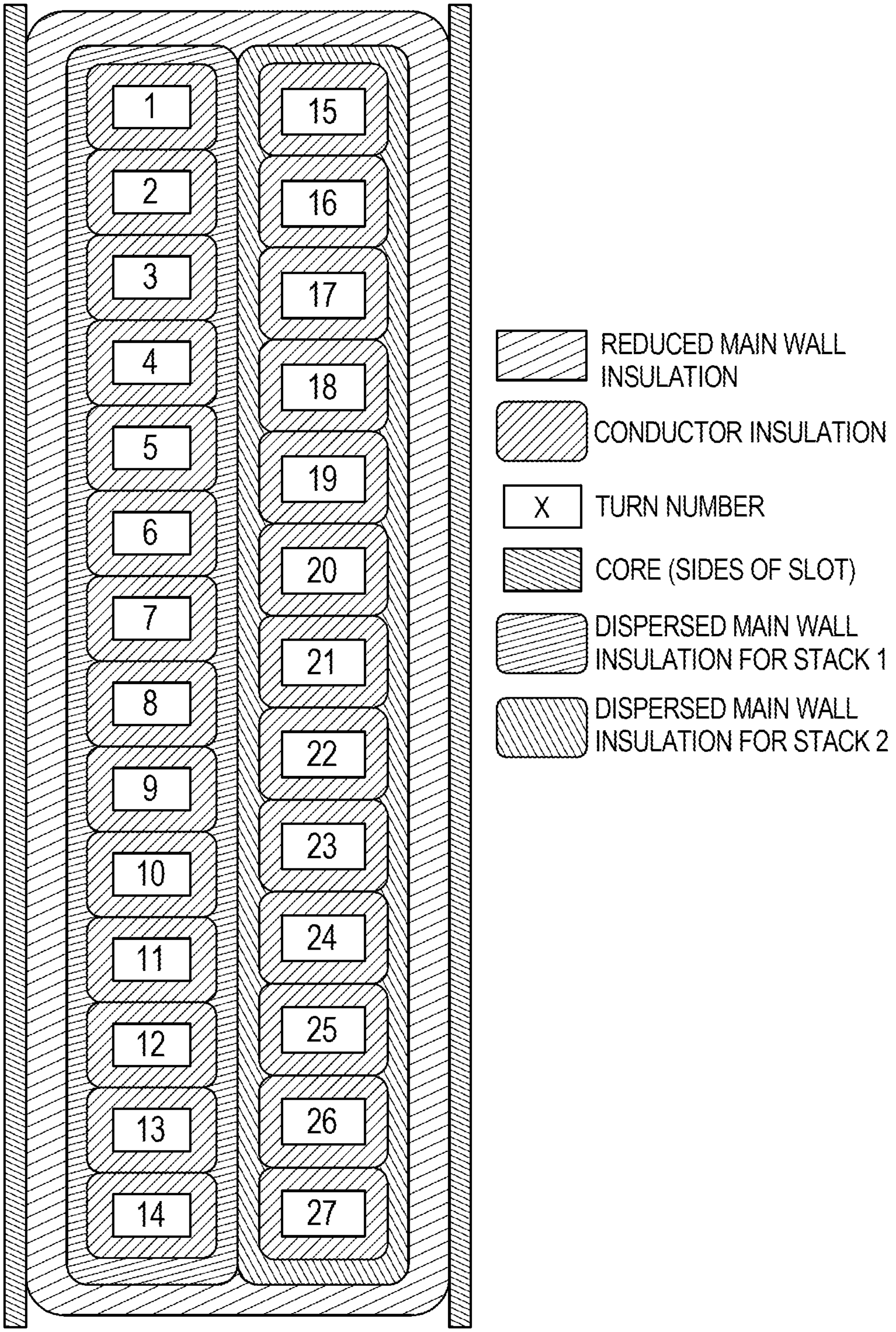
FIG. 67 illustrates a cross-sectional view of a twenty-seven turn coil, according to one embodiment.

Accordingly, the 28 turn design shown in FIG. 66 may instead be changed to 27 turns, shown in FIG. 67, using what is referred to as the Odd turns transposition winding method. Additionally, due to the increase in volt per turn, dispersed main wall insulation may also be implemented. The examples of FIG. 66 and FIG. 67 include the plurality of turns arranged in two stacks.

Accordingly, for the Zig-Zag-Then-Step and ƐS-Then-Step-Zig-Zag manufacturing methods, the number of stacks are limited to two. However, for the Double-series-stack-top-to-bottom-bridge, the Reverse-wound-double-series-stack, and the Overhang-knuckle-series-bridge manufacturing methods, it may be possible to have more than two stacks (referred to as a multi-stack transposition winding). However, practical limits to the size of conductors limit the maximum number of turns, as shown by Equations 27, 28 and 29.

$$\frac{w}{h} \leq 4 \quad \text{[Equation 27]}$$

Where:

w=Width of conductor; and h=Height (or thickness) of conductor.

$$w \leq 10 \text{ mm} \quad \text{[Equation 28]}$$

Where:

w=Width of conductor.

$$h \geq 0.5 \text{ mm} \quad \text{[Equation 29]}$$

Where:

h=Height (or thickness) of conductor.

These limitations may limit the maximum number of turns in a stack. Utilizing the Double-series-stack-top-to-bottom-bridge, the Reverse-wound-double-series-stack, and the Overhang-knuckle-series-bridge manufacturing methods, however, may allow for more than two stacks. These manufacturing methods may be combined with the Odd turns transposition winding method.

Figure 68:
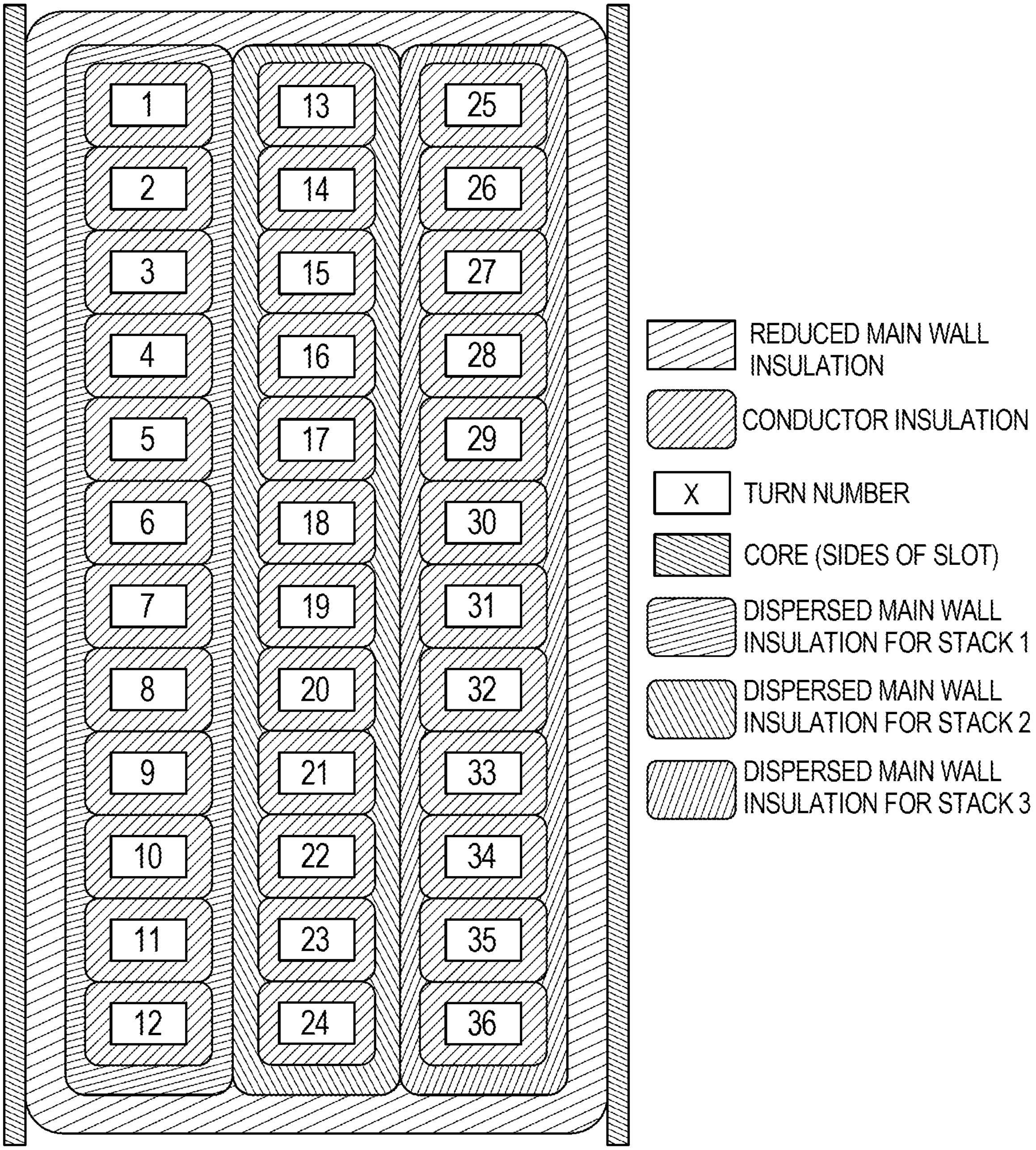
FIG. 68 illustrates a cross-sectional view of a thirty-six turn coil, according to one embodiment.
Figure 69:
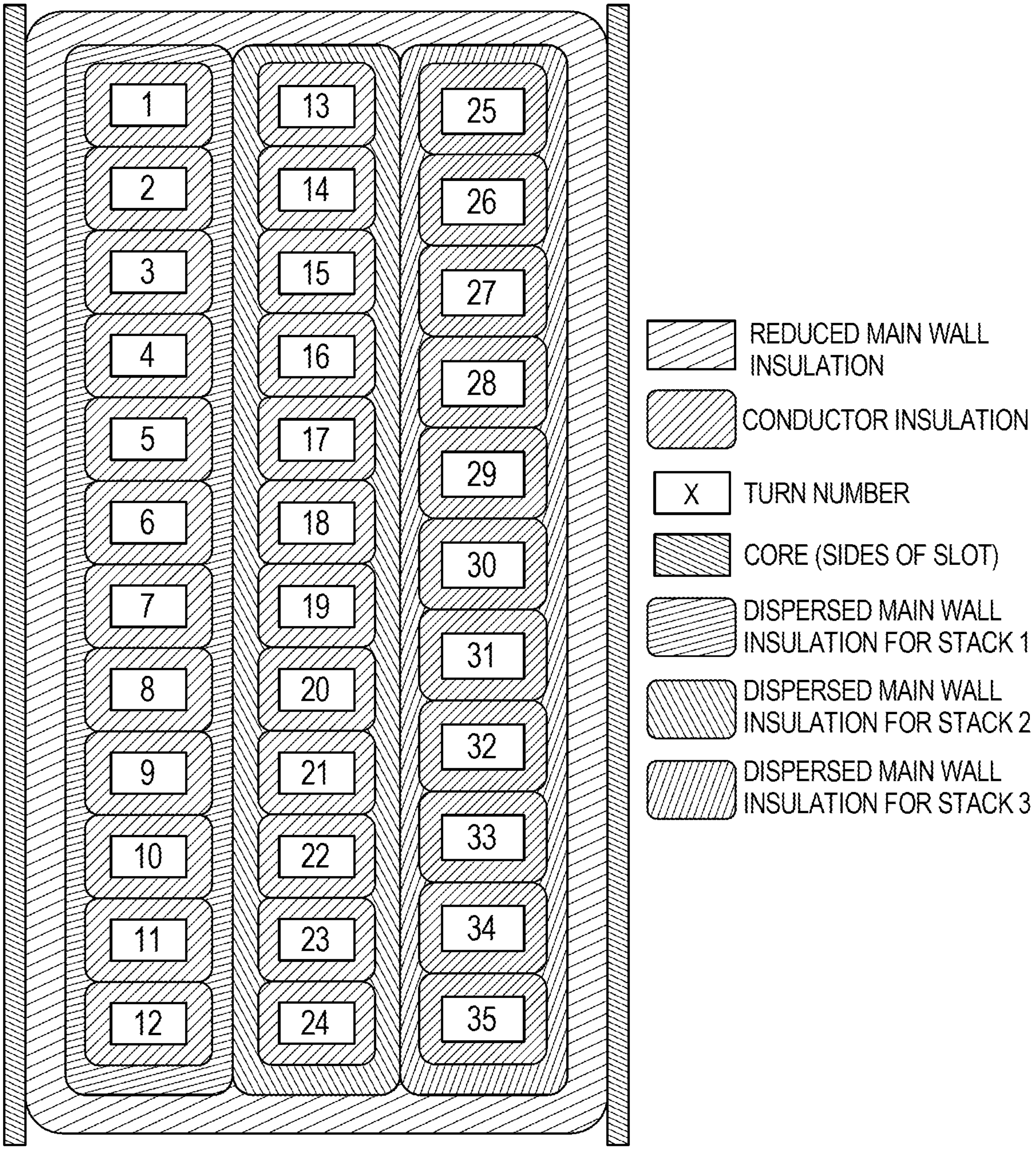
FIG. 69 illustrates a cross-sectional view of a thirty-five turn coil, according to one embodiment.
Figure 70:
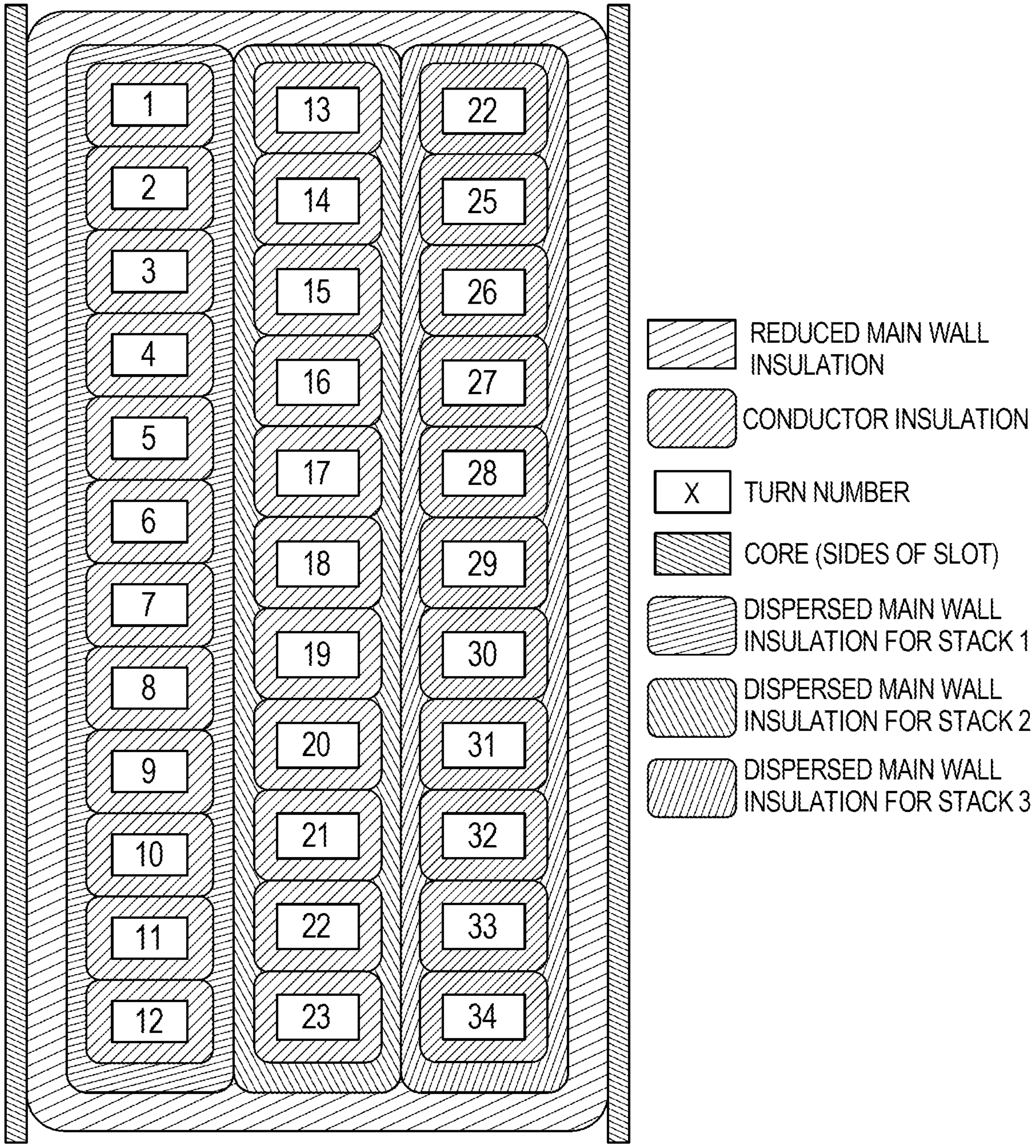
FIG. 70 illustrates a cross-sectional view of a thirty-four turn coil, according to one embodiment.

For example, for a motor where it is impractical to fit sufficient number of turns into a 2-stack coils, as shown in the example above where a total of 34, 35, or 36 turns may be needed. Utilizing the Double-series-stack-top-to-bottom-bridge, the Reverse-wound-double-series-stack, and the Overhang-knuckle-series-bridge manufacturing method, combined with the odd turns transposition winding method, provides for these coil configurations, shown in FIGS. 68-70. Particularly, FIG. 68 illustrates a cross-sectional view of a 36 turn coil. FIG. 69 illustrates a cross-sectional view of a 35 turn coil. FIG. 70 illustrates a cross-sectional view of a 34 turn coil. The examples of FIG. 68, FIG. 69, and FIG. 70 include the plurality of turns arranged into three stacks.

While FIGS. 68-70 illustrate a particular ordering of the number of turns in each stack, an un-equal number of turn stacks may instead be assembled and connected into the coil, given that the cross sectional area of each stack's individual turns are approximately equal and the overall stack height are approximately equal.

As one example implementation of embodiments described herein, a 300 hp synchronous hydro generator may be redesigned from 11000 V to 13800 V, eliminating the need for a step-up transformer. Table 8 provides the original 11000 V generator.

TABLE 8

| Example 11000 V generator | | |
|---|---|---|
| Winding design | | |
| Turns per coil | 28 | |
| Performance values | | |
| Description | Value | Unit |
| Power Output | 402.3 | hp |
| Voltage | 11000 | V |
| Efficiency | 92.08% | |
| Frequency | 60 | Hz |

Increasing the output voltage to 13800 V, while maintaining the flux density, requires 35 turns. In this example, an overhang-knuckle-series-bridge manufacturing method is implemented with dispersed main wall insulation, odd turns transposition winding, and multi-stack transposition winding methods to manufacture 35 turns, as shown in Table 9.

TABLE 9

| Example 13800 V generator | | |
|---|---|---|
| Winding design | | |
| Turns per coil | 35 | |
| Performance values | | |
| Description | Value | Unit |
| Power Output | 402.3 | hp |
| Voltage | 13800 | V |
| Efficiency | 92.35% | |
| Frequency | 60 | Hz |

Additionally, the cross sectional area may be increased such that the output of the generator increases to 603.5 hp, 13800 V, as shown in Table 10.

TABLE 10

| Example 13800 V generator | | |
|---|---|---|
| Winding design | | |
| Turns per coil | 35 | |
| Performance values | | |
| Description | Value | Unit |
| Power Output | 603.5 | hp |
| Voltage | 13800 | V |
| Efficiency | 91.67% | |
| Frequency | 60 | Hz |

Accordingly, embodiments described herein provide transposition coils and manufacturing methods for transposition coils. Various features and advantages of the aspects described herein are set forth in the following claims.

What is claimed is:

1. A transposition coil comprising:

a plurality of conductor turns arranged in at least two separate stacks, wherein each of the at least two separate stacks is provided with dedicated main wall insulation that encircles exactly one of the at least two separate stacks; and outer main wall insulation that encircles the at least two separate stacks, wherein the at least two separate stacks include a first stack having n number of turns and a second stack having n+1 number of turns or n−1 number of turns.

2. The transposition coil of claim 1, wherein the plurality of conductor turns are arranged in exactly two stacks, and wherein the total number of conductor turns is odd.

3. The transposition coil of claim 2, wherein the total number of conductor turns is 27.

4. The transposition coil of claim 1, wherein the total number of conductor turns is 35.

5. The transposition coil of claim 1, wherein a width of each conductor of the plurality of conductors is less than or equal to approximately 10 millimeters, and wherein a height of each conductor of the plurality of conductors is greater than or equal to approximately 0.5 millimeters.

6. The transposition coil of claim 1, wherein each conductor turn of the plurality of conductor turns is independently insulated.

7. The transposition coil of claim 1, wherein the plurality of conductor turns are arranged in exactly three separate stacks.

8. The transposition coil of claim 7, wherein the exactly three separate stacks includes a first stack having n number of turns, a second stack having n number of turns, and a third stack having n−1 number of turns or n+1 number of turns.

9. The transposition coil of claim 8, wherein the total number of conductor turns is 35.

10. The transposition coil of claim 7, wherein the total number of conductor turns is 34.

11. The transposition coil of claim 7, wherein the total number of conductor turns is 36.

12. A transposition coil comprising:

a plurality of conductor turns arranged in three or more separately-insulated stacks, wherein the three or more stacks are cooperatively insulated with an outer main wall insulation that encircles the three or more separate stacks, wherein the number of turns per stack is different among the three or more separate stacks.

13. The transposition coil of claim 1, wherein the three or more separate stacks includes a first stack having n number of turns, a second stack having n number of turns, and a third stack having n−1 number of turns or n+1 number of turns.

14. The transposition coil of claim 12, wherein the plurality of conductor turns are arranged in exactly three stacks, and wherein the total number of conductor turns is odd.

15. The transposition coil of claim 14, wherein the total number of conductor turns is 35.

16. The transposition coil of claim 12, wherein the total number of conductor turns is 34.

17. The transposition coil of claim 12, wherein the total number of conductor turns is 36.

18. The transposition coil of claim 12, wherein a width of each conductor of the plurality of conductors is less than or equal to approximately 10 millimeters, and wherein a height of each conductor of the plurality of conductors is greater than or equal to approximately 0.5 millimeters.

19. A transposition coil comprising:

a plurality of conductor turns arranged in at least two separate stacks, wherein each of the at least two separate stacks is provided with dedicated main wall insulation that encircles exactly one of the at least two separate stacks; and outer main wall insulation that encircles the at least two separate stacks, wherein the plurality of conductor turns are arranged in exactly three separate stacks.

20. The transposition coil of claim 19, wherein the exactly three separate stacks includes a first stack having n number of turns, a second stack having n number of turns, and a third stack having n−1 number of turns or n+1 number of turns.

* * * * *